United States Patent
Glusker et al.

(10) Patent No.: US 11,396,266 B1
(45) Date of Patent: Jul. 26, 2022

(54) AUTONOMOUS MOBILE DEVICE WITH EXTENSIBLE MAST

(71) Applicant: AMAZON TECHNOLOGIES, INC., Seattle, WA (US)

(72) Inventors: Mark John Glusker, San Francisco, CA (US); Christine Leonore Fuller, Mountain View, CA (US); Mark Greggory Edstrom, Saratoga, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/302,962

(22) Filed: May 17, 2021

Related U.S. Application Data

(63) Continuation-in-part of application No. 16/427,134, filed on May 30, 2019, now Pat. No. 11,226,067.
(Continued)

(51) Int. Cl.
*B25J 18/02* (2006.01)
*B60R 11/02* (2006.01)
(Continued)

(52) U.S. Cl.
CPC .......... *B60R 11/0235* (2013.01); *B25J 9/102* (2013.01); *B25J 18/025* (2013.01); *B60K 35/00* (2013.01);
(Continued)

(58) Field of Classification Search
CPC .......... B25J 18/025; B25J 18/02; B25J 18/04; B25J 19/023; B25J 19/021; B25J 11/008;
(Continued)

(56) References Cited

U.S. PATENT DOCUMENTS

| 4,647,941 A * | 3/1987 | Myer ...................... H01Q 1/10 |
| | | 343/792 |
| 4,658,260 A * | 4/1987 | Myer ...................... H01Q 1/10 |
| | | 343/730 |
| 5,102,375 A * | 4/1992 | Featherstone ............ B66F 3/06 |
| | | 227/99 |

(Continued)

FOREIGN PATENT DOCUMENTS

| CN | 111173816 A | * | 5/2020 | |
| EP | 0192094 A1 | * | 8/1986 | ............. F16B 7/105 |
| JP | 11120814 A | * | 4/1999 | ........... E04H 12/182 |

OTHER PUBLICATIONS

Machine Translation of JP H11-120814, obtained Dec. 14, 2021.*
(Continued)

*Primary Examiner* — Richard W Ridley
*Assistant Examiner* — Brian J McGovern
(74) *Attorney, Agent, or Firm* — Lindauer Law, PLLC

(57) ABSTRACT

An autonomous mobile device (AMD) includes a telescoping mast with sensors on top that are connected to a cable running through the mast. An inner section of the mast includes a bobbin that secures cables. The bobbin has a shaft and features that guide cables to helically wind around the shaft. The bobbin reduces stress on the cable as the mast moves. The mast is lifted by a rack that includes a portion with teeth and a portion without. The portion with teeth is driven by a motor. The portion without teeth connects the rack to a spool. The toothless section reduces stress on the toothed portion of the rack as it spools or unspools. The AMD includes a hinge to tilt a display. To securely position the hinge on a shaft, the shaft is spun after assembly so that a push nut cuts a retention groove in the shaft.

20 Claims, 36 Drawing Sheets

Related U.S. Application Data which is a continuation-in-part of application No. 16/216,603, filed on Dec. 11, 2018.

(51) Int. Cl.

| | | |
|---|---|---|
| *B60K 35/00* | (2006.01) | |
| *G05D 1/00* | (2006.01) | |
| *E04H 12/18* | (2006.01) | |
| *F16M 11/28* | (2006.01) | |
| *F16B 7/10* | (2006.01) | |
| *F16M 11/26* | (2006.01) | |
| *B25J 9/10* | (2006.01) | |
| *B60R 16/027* | (2006.01) | |
| *F16H 19/04* | (2006.01) | |
| *F16H 19/06* | (2006.01) | |
| *B60R 11/00* | (2006.01) | |
| *F16C 3/03* | (2006.01) | |
| *B25J 9/00* | (2006.01) | |

(52) U.S. Cl.
CPC ............ *E04H 12/182* (2013.01); *F16B 7/10* (2013.01); *F16M 11/26* (2013.01); *F16M 11/28* (2013.01); *G05D 1/0088* (2013.01); *B25J 9/0003* (2013.01); *B60K 2370/143* (2019.05); *B60K 2370/152* (2019.05); *B60K 2370/73* (2019.05); *B60R 16/027* (2013.01); *B60R 2011/004* (2013.01); *B60R 2011/0084* (2013.01); *B60R 2011/0092* (2013.01); *F16C 3/03* (2013.01); *F16H 19/04* (2013.01); *F16H 19/0663* (2013.01); *Y10T 403/32467* (2015.01)

(58) Field of Classification Search
CPC ............ B25J 5/007; B25J 9/003; B25J 9/104; B25J 9/126; F16H 25/18; F16H 19/0663; A61G 7/1019; A61G 7/1015; A61G 7/1048; F16M 11/28; F16M 11/26; F16B 7/10; E04H 12/182; Y10T 403/32467; F16C 3/03
See application file for complete search history.

(56) References Cited

U.S. PATENT DOCUMENTS

| | | | | |
|---|---|---|---|---|
| 5,189,435 | A * | 2/1993 | Yarsunas | H01Q 1/10 343/903 |
| 5,203,746 | A * | 4/1993 | Lehnert | E04H 12/185 474/206 |
| 6,152,638 | A * | 11/2000 | Lindsay | F16M 11/32 403/104 |
| 6,412,737 | B1 * | 7/2002 | Minagawa | F16B 7/14 248/125.8 |
| 8,936,498 | B1 * | 1/2015 | Lee | B63H 20/007 440/6 |
| 9,243,741 | B1 * | 1/2016 | Chu | G02B 26/0816 |
| 2003/0095411 | A1 * | 5/2003 | Blackwelder | B60Q 1/2611 362/385 |
| 2008/0231698 | A1 * | 9/2008 | Kaplan | G08C 17/02 348/118 |
| 2012/0079778 | A1 * | 4/2012 | Wasson | H01Q 1/1235 52/115 |
| 2014/0259534 | A1 * | 9/2014 | Shields | B25G 1/04 16/429 |
| 2016/0131279 | A1 * | 5/2016 | Kemp | F16L 3/1226 248/55 |
| 2016/0171303 | A1 * | 6/2016 | Moore | G06T 7/70 382/153 |
| 2016/0236867 | A1 * | 8/2016 | Brazeau | B65G 1/1378 |
| 2017/0052542 | A1 * | 2/2017 | Etoh | F16M 11/18 |
| 2019/0162359 | B1 * | 5/2019 | Kundu | F16M 13/04 |
| 2021/0129358 | A1 * | 5/2021 | Amemiya | B25J 9/10 |
| 2021/0173381 | A1 * | 6/2021 | Edsinger | B25J 9/1615 |

OTHER PUBLICATIONS

Machine Translation of CN 111173816, obtained Dec. 14, 2021.*
Machine Translation of EP 0,192,094, obtained Sep. 8, 2020.*
McGovern, Brian J., "Advisory Action dated Aug. 19, 2021", U.S. Appl. No. 16/427,134, The United States Patent and Trademark Office, dated Aug. 19, 2021.
McGovern, Brian J., "Notice of Allowance dated Sep. 17, 2021", U.S. Appl. No. 16/427,134, The United States Patent and Trademark Office, dated Sep. 17, 2021.
McGovern, Brian J., "Final Office Action dated Jul. 9, 2021", U.S. Appl. No. 16/427,134, The United States Patent and Trademark Office, dated Jul. 9, 2021.

* cited by examiner

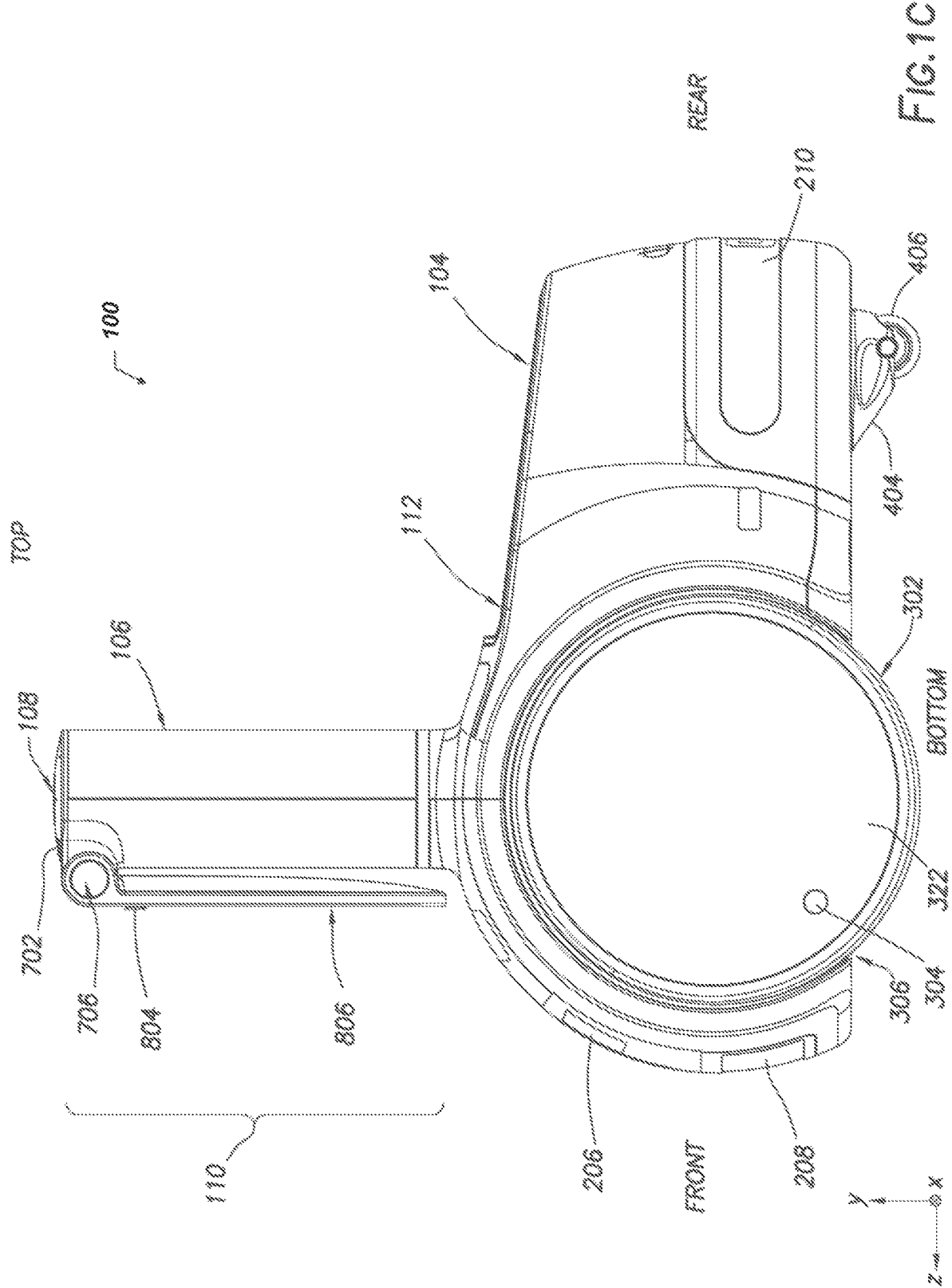

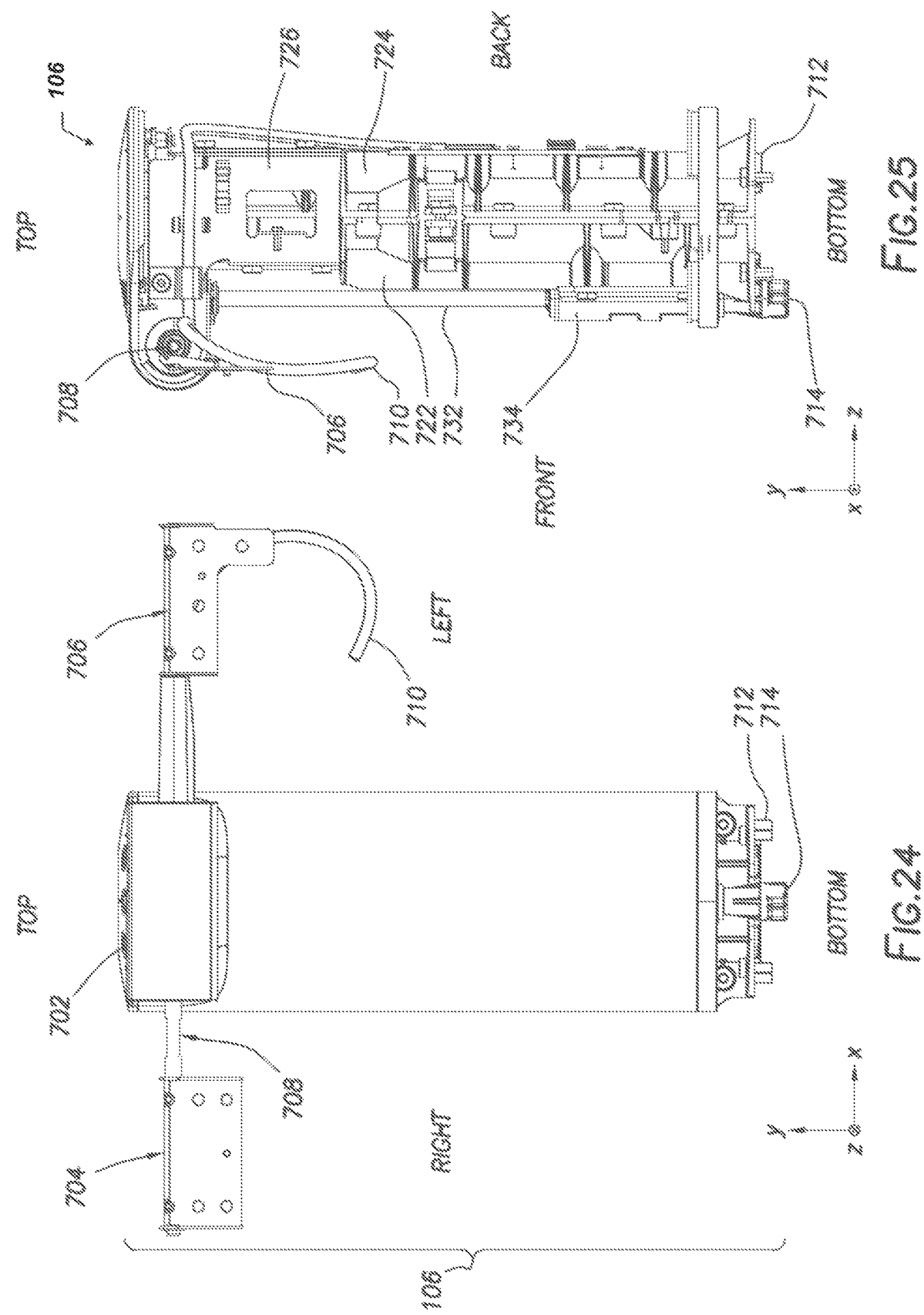

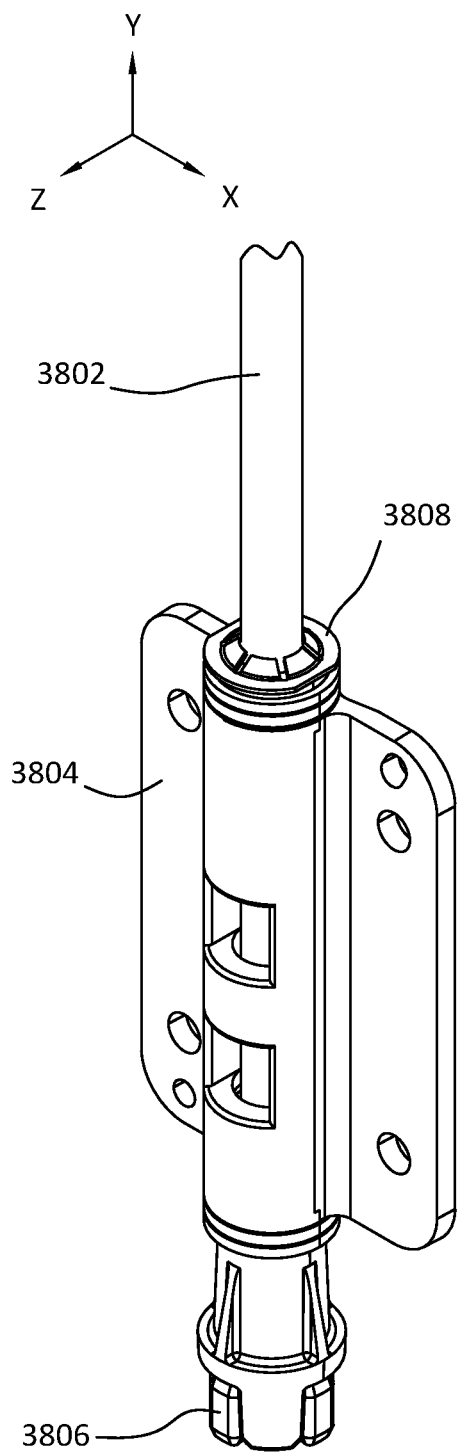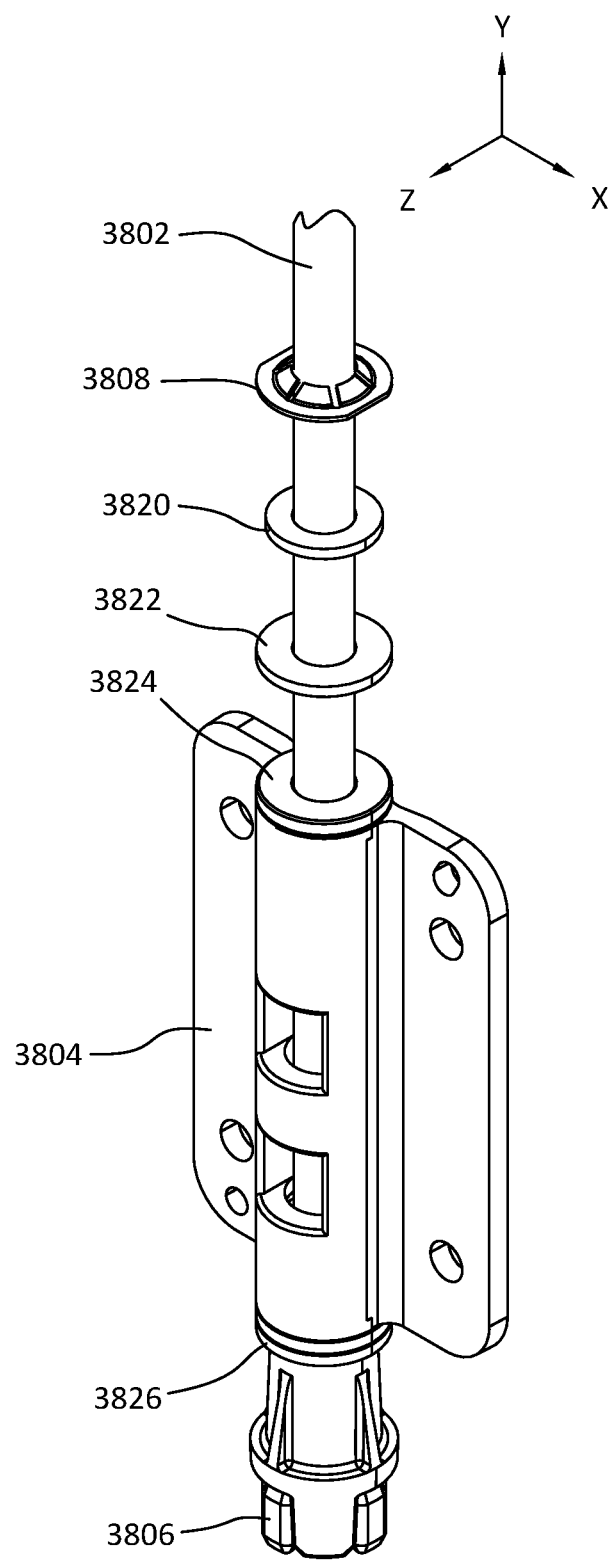
FIG.38A
FIG.38B

AUTONOMOUS MOBILE DEVICE WITH EXTENSIBLE MAST

CROSS-REFERENCE TO RELATED APPLICATION

This application is a continuation-in-part of, and claims priority to, U.S. patent application Ser. No. 16/427,134 filed on May 30, 2019, titled "MECHANISM FOR SEQUENCED DEPLOYMENT OF A MAST", now U.S. Pat. No. 11,226,067, the contents of which are incorporated by reference into the present disclosure.

U.S. patent application Ser. No. 16/427,134 is a continuation-in-part of, and claims priority to, U.S. patent application Ser. No. 16/216,603 filed on Dec. 11, 2018, titled "EXTENSIBLE MAST FOR AN AUTONOMOUS MOBILE DEVICE", the contents of which are incorporated by reference into the present disclosure.

BACKGROUND

Every day users face a variety of personal and professional tasks. These tasks may include helping in the care of others such as children or the elderly, taking care of a home, or staying in contact with others. Devices that assist in these tasks may help the user perform the tasks better or may free up the user to do other things.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

FIGS. 1A-1C illustrate various views of an autonomous mobile device, such as a robot, which includes wheels for mobility, a tower with a mast, and a display assembly, according to some implementations.

FIGS. 24-27 illustrate views of the tower, the hinges that join the tower and the display assembly, and the tilt mechanism, according to some implementations.

FIGS. 38A and 38B illustrate a push nut retained in a groove that is cut by the push nut to retain parts to a shaft, according to one implementation.

Figure 1A:
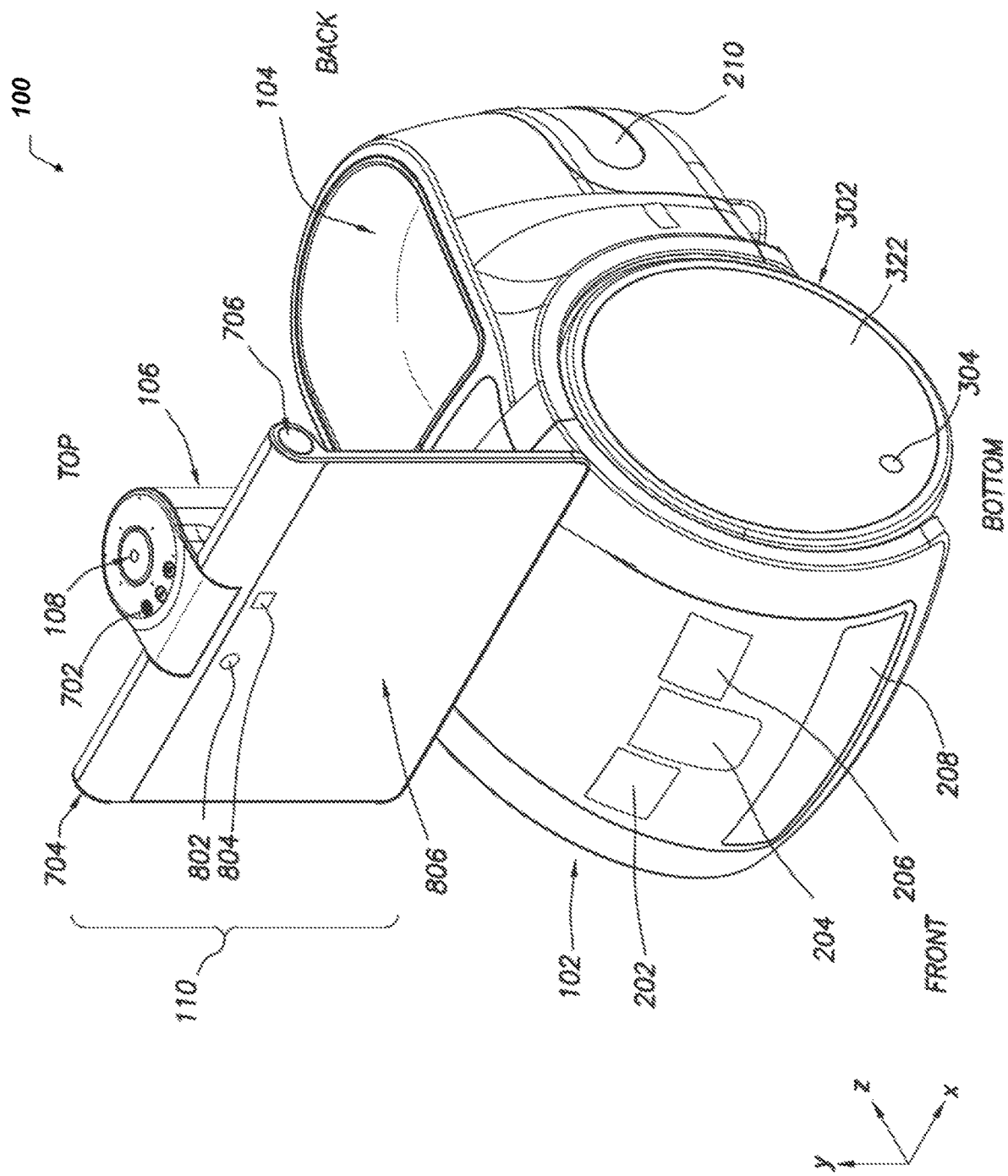

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device, such as a robot, may perform various tasks. The robot is capable of autonomous movement, allowing it to move from one location in the environment to another without being "driven" or remotely controlled by the user or other human. Some of the tasks the robot performs may involve the robot moving about an environment. Tasks may be initiated at user request, may be preprogrammed, or may be determined to be performed autonomously.

Mobility may be provided using a pair of main wheels and a caster wheel, arranged in a triangular layout. Each main wheel may be driven by a motor. This arrangement allows the robot to change direction, move forward, backward, and so forth.

Traditionally this arrangement involving a caster wheel exhibits several drawbacks. For example, traditional caster assemblies are relatively tall and either increase the overall height of the device or use a large volume if they are contained within the device. The increased height also raises the height of the center of mass of the device, which may reduce stability in some situations. The relatively large volume prevents the use of that volume for other devices, such as batteries that would increase run time, or other devices that would improve operation, and so forth. Other drawbacks include fouling of a caster wheel, in which fibers or other debris prevents the caster wheel from freely rotating about an axle. In this situation, the caster wheel may rotate too slowly or seize altogether, resulting in the caster wheel being dragged across the floor. This dragging may damage the flooring surface as well as the caster wheel.

Described in this disclosure is a low-profile caster assembly that minimizes overall height while minimizing the use of internal volume within of the device. The caster wheel itself also incorporates features that prevent fouling by limiting the ability of fibers or other debris to reach the axle.

The caster wheel may also include a target element, such as a metallic piece that encompasses less than the full circumference of the wheel's hub. This target element may be detected by an inductive sensor during operation. By using the inductive sensor to detect the presence or absence of the target element, data indicative of the rotation of the wheel may be determined. For example, a decrease in the rate of rotation of the caster wheel relative to the main wheels may be used to determine that the wheel is dragging. As a result, the robot may stop moving.

In many situations, it is advantageous to position a payload such as sensors, output devices, or both, at various heights. For example, it may be useful for the cameras of a robot to be able to see what is on a table or look out a window. Traditionally, such a capability involved a fixed structure, articulated arm, and so forth to hold these devices. However, this results in a device that is more expensive, heavier, and bulkier. As a result, such devices may be less affordable to potential users, may require more power to operate, and so forth.

Also described in this disclosure is an extensible mast device that may be utilized to position a payload at a desired height with respect to a chassis of a robotic assistant, remotely operated vehicle, autonomous vehicle, fixed structure, and so forth. The payload may include, but is not limited to, one or more of sensors such as cameras, output devices such as lights, and so forth. The extensible mast is able to retract into a compact volume, allowing use in smaller devices, or minimizing the volume used within a larger device. The extensible mast and associated mechanism are relatively lightweight, allowing for use in mobile devices. One or more cables, such as coaxial cables, may be used to provide electrical connectivity between the payload at one end of the extensible mast and electronics at the other.

The extensible mast may comprise a set of telescoping sections which incorporate mechanisms to control the sequence in which the telescoping sections are deployed. In the implementation described the mast may comprise three telescoping sections, an inner mast section, a middle mast section, and an outer mast section. The inner mast section may comprise a first exterior surface and a first interior surface. The middle mast section may comprise a second exterior surface and a second interior surface. The second interior surface may be proximate to the first exterior surface. The outer mast section may comprise a third exterior surface and a third interior surface. The third interior surface may be proximate to the second exterior surface.

The inner mast section may comprise a bobbin that retains and reduces stress on the cable. The bobbin has features that guide a cable entering at a first end of the inner mast section to helically wind around a shaft before exiting at a second end. The helical wind of the cable reduces stress on the cable as the mast moves up or down. This reduction in stress increases the lifespan of the cable and improves overall reliability of the cable.

The bobbin may have a first end and a second end. The first end may include a feature with an opening that fits a cable. The second end may also include a feature with an opening that fits the cable. Based on a relative orientation between the first opening and the second opening, the cable passing through the first feature helically winds around the shaft to pass through the second feature. The second end may comprise a third feature that includes a third opening. A result of the cable passing through the second opening and the third opening is that the cable bends sufficiently to retain the cable.

The mechanisms to control the sequence may include a first channel within a first section such as the inner mast section, a lever mechanism that may comprise a moveable engagement structure, such as an engagement pin on a second section such as the middle mast section, and a second channel in a third section such as the outer mast section. In one implementation, the engagement structure may extend from a lever arm that is biased (such as with a spring) to maintain a first position. The engagement structure may comprise a pin, ball bearing, pawl, dog, and so forth. These and other features may be formed during fabrication, machined into, or attached to the respective sections.

The engagement structure, such as an engagement pin, engages the walls of the second channel and also, at some times, the walls of the first channel. The movement of the engagement pin between the first position and the second position either locks or frees the sections to move relative to one another. For example, during extension, when the first section has moved and the walls of the first channel no longer constrain the motion of the engagement pin, the spring pushes the engagement pin towards one wall of the second channel. As the second section moves relative to the third section, the engagement pin moves along this wall of the second channel until it reaches an engagement feature, such as a notch. The engagement pin then enters the notch under the influence of the spring. The second and third sections are now locked relative to one another, as the engagement pin prevents motion. During retraction, the process reverses. The first channel in the first section includes a ramp which moves the engagement pin out of the notch, and back into alignment with the second channel. The second and third sections are now unlocked and the second section may move relative to the third section.

The mechanisms for sequencing may be incorporated into additional sections. This enables the telescoping mast to include more than three sections.

Each section in the mast may comprise two or more pieces that are joined during assembly. For example, each section of the mast may have two halves of injection molded plastic that are snapped together during assembly. By assembling the sections of the extensible mast from separate pieces, ease of assembly is significantly improved. For example, when the extensible mast comprises single-piece sections, threading a flexible rack and cable through the extensible mast is time consuming and prone to failure. As described in this disclosure, assembly is improved by allowing half of the telescoping sections to sit on a surface, and the flexible rack having the cable arranged within. A corresponding other half of each telescoping section is assembled, starting with the smallest section first, next smallest section next, and so forth until the largest section is assembled. The production of the sections in pieces also reduces overall fabrication costs and allows for the inclusion of various features on the interior of the mast. As a result, the extensible mast may be less expensively manufactured and more easily assembled. Likewise, in some implementations, maintenance is facilitated as the sections may be separated allowing for inspection, replacement, or other maintenance on the flexible rack, cable, or other components within the extensible mast.

A motor moves the flexible rack between a first spool and the extensible mast. As more of the flexible rack is dispensed from the first spool to the extensible mast, a force is exerted longitudinally along the flexible rack and to an upper portion of an uppermost section of the telescoping sections. This force pushes the sections of the extensible mast upwards. To lower the mast, the process is reversed and the flexible rack is returned to the first spool. In one implementation, the flexible rack may have teeth along one side. A motor-driven pinion engages the teeth on the flexible rack, moving the flexible rack. In another implementation, the motor may turn a friction wheel that engages the flexible rack.

The cable transfers one or more of data or power between the main body and the payload. For example, the cable(s) may comprise one or more coaxial cables.

A sensor may be mounted along the path of the flexible rack or cable as it passes from an outlet of the spool and an entry to a base of the extensible mast. The sensor may detect features on the flexible rack or cable and provide information that is used to determine what length of flexible rack or cable has moved between the spools and the mast. For example, marks may be printed on a surface of the flexible rack that are detectable by an optical sensor. Continuing the example, movement of these marks may be used to determine that 10 centimeters (cm) of flexible rack has passed from the first spool to the extensible mast. This data may be used to determine that the extensible mast has been raised 10 cm.

In a second implementation the cable may be retained by the rack and stowed therewith in the first spool. This implementation avoids the need for a second spool, reducing cost, complexity, and volume used. The flexible rack may include engagement features to retain the cable with respect to the flexible rack. The engagement features may be arranged along a first cable path that runs along a length of the flexible rack. The first cable path may run proximate to a first long edge of the flexible rack. One or more of engagement features provide one or more of mechanical interference fit or friction with the cable to retain the cable in place with respect to the flexible rack. One or more of the engagement features may provide for a second cable path that extends away from the first long edge. The second cable path may introduce a bend in the path of the cable. The second cable path may include an engagement feature such as a protrusion to maintain the bend. The bend in the second cable path adds additional friction between the cable and the engagement features of the flexible rack. The added friction improves the retention of the cable on the flexible rack and prevents the cable from slipping.

The flexible rack may comprise a first piece with teeth and a second piece without teeth. A motor may drive the flexible rack to move the mast up and down as the flexible rack spools and unspools around a spool. The first piece may have an end that is held in place by a retention feature in the mast and an end that is joined to the second piece. The second piece may have an end that is joined to the first piece and an end that is attached to a spool. The spool may include a mandrel. A first end of the second piece of the flexible rack is attached to the spool, with the second piece passing proximate to the mandrel along a mandrel path. Because the second piece omits teeth, stress on the flexible rack along the mandrel path is reduced relative to a piece of the flexible rack with teeth along the mandrel path. The flexible rack may comprise two pieces that are joined, or a unitary component with the toothed and toothless portions fabricated therein.

Also described in this disclosure is a pan and tilt assembly for the autonomous mobile device. A tower may extend from a main body of the autonomous mobile device. The extensible mast may pass through the tower. A display assembly may be attached with a hinge to the tower. The display assembly may include a touchscreen, camera, and so forth. The display assembly may be tilted with respect to the tower. The pan and tilt assembly includes two motors. A first motor provides the panning motion of the tower and the mast while a second motor drives a tilt mechanism in the tower to change the tilt of the display assembly. The pan and tilt assembly provides a compact and robust system to provide the pan and tilt motion, while minimizing overall volume and mechanical complexity. The pan and tilt motions may be performed independently of one another, allowing the display assembly to be tilted while the tower and mast remain stationary, or vice versa.

The tilt mechanism of the display assembly also improves reliability and compatibility with user interactions by allowing an external force to change the tilt without damage to the tilt mechanism. A friction hinge joins the display assembly to a shaft that extends from the tower. An external force, such as a user pushing the display assembly to manually change the tilt causes the portion of the friction hinge to slip and rotate relative to the shaft. The autonomous mobile device may change the tilt of the display assembly by operating a motor in the pan and tilt assembly. The shaft is coupled to a worm gear. The worm gear is driven by a worm that is turned by a worm shaft. The worm shaft is driven by the tilt motor in the pan and tilt assembly. In some implementations the worm may be biased toward the worm gear using one or more springs, maintaining constant contact between the two. This facilitates maintaining constant torque and may also reduce unwanted effects such as chatter.

The friction hinge on the shaft may be secured in place using a push nut that cuts a retention groove in the shaft. The push nut has teeth of a hardness that is greater than a hardness of the shaft. Because of the difference in hardness of materials, rotation of the push nut relative to the shaft results in the teeth of the push nut cutting the retention groove in the shaft. The retention groove keeps the push nut from moving laterally along the shaft. Because the push nut is prevented from moving outside the retention groove, if the push nut is retained adjacent to the friction hinge, then the friction hinge is also prevented from moving in the direction of the push nut. One or more push nuts may be installed along the shaft to retain one or more features of the tilt mechanism at various locations along the shaft.

The devices described in this disclosure allow for an autonomous mobile device to be constructed at relatively low cost which is able to move nimbly, provide an extensible mast to support a payload, pan the display assembly and the extensible mast while allowing for the display assembly to be tilted independently of the panning. The assemblies in the device may be constructed and tested independently, such as by different vendors, and then integrated during final assembly, further reducing the overall cost.

Illustrative System

Figure 1B:
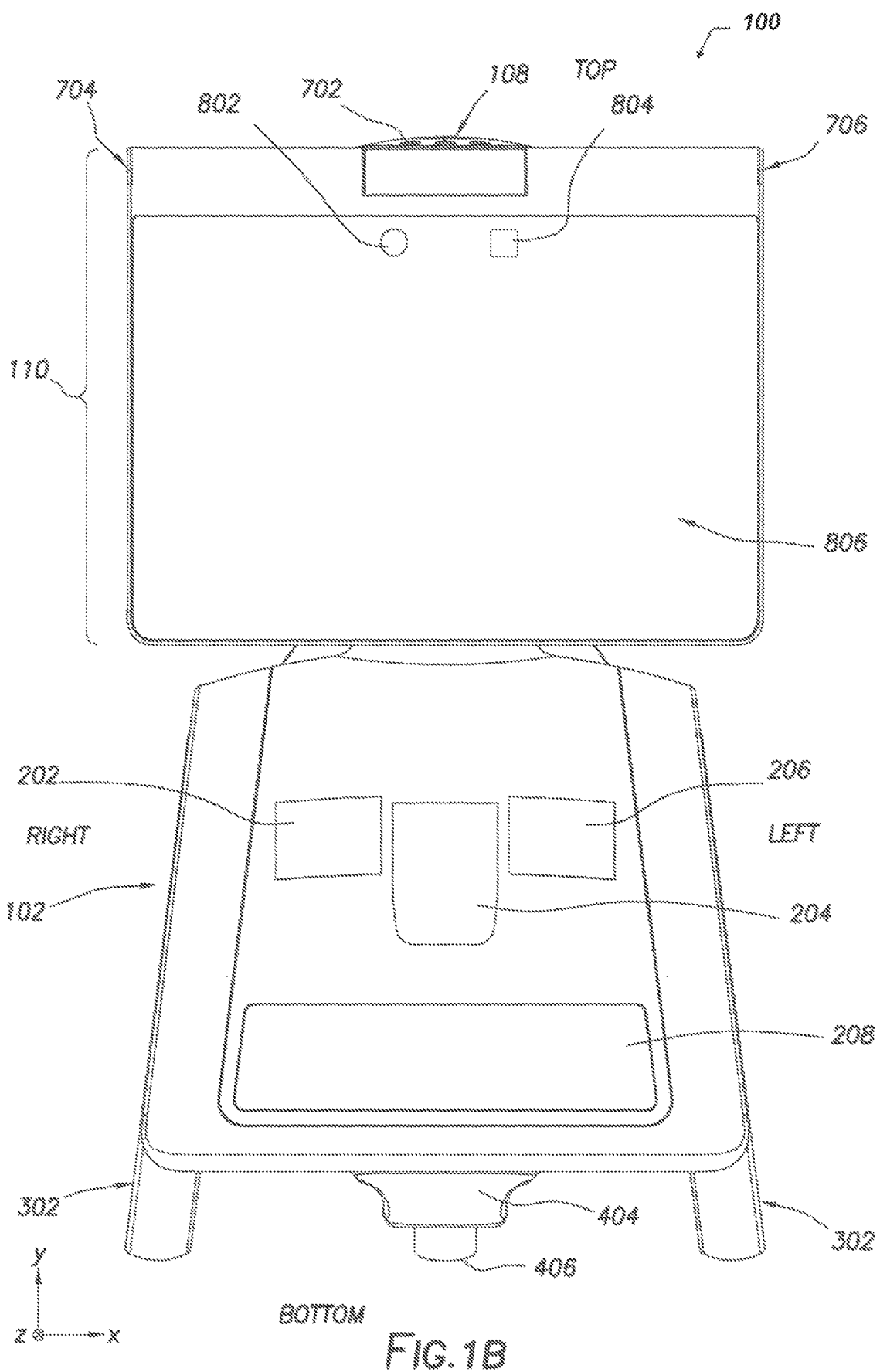

FIGS. 1A-1C illustrate various views of an autonomous mobile device 100 (device), such as a robot, according to some implementations. FIG. 1A shows a perspective view, FIG. 1B shows a front view and FIG. 1C shows a view of the left side of the device 100.

The device 100 includes a main body 102. During operation, the device 100 may perform various functions such as moving about the environment, interacting with users, performing tasks, and so forth. The main body 102 may house various components such as batteries, processors, and so forth to support these functions. These components are discussed in more detail below with regard to FIGS. 29 and 30.

The main body 102 may include various components. A front of the device 100 includes sensor windows 202, 204, 206, and 208 while a back of the device 100 may include a sensor window 210. These sensor windows 202-210 facilitate operation of various sensors. For example, if the sensor is a camera, the sensor window for that sensor is transparent to the wavelengths of light detected by the camera. In another example, if the sensor is an ultrasonic rangefinder, the sensor window may comprise a mesh that permits ultrasonic sound and corresponding echoes to pass through.

Mobility for the device 100 may be provided by wheels. In the implementation shown, two main wheels 302 are depicted with a trailing caster assembly 402 (shown in FIGS. 4-11) having a caster wheel 406. The two main wheels 302 and the caster wheel 406 provide a tricycle or three-point support system. The main wheels 302 may be driven independently, allowing the device 100 to turn within a relatively small turn radius. Each of the main wheels 302 may have a wheel cover 322 that conceals a portion of the main wheel 302. In some implementations, the wheel cover 322 may include a release button 304. A user may press the release button 304 and separate the wheel cover 322 from the main wheel 302. This allows the wheel cover 322 to be removed for cleaning, replacement, and so forth. The wheel cover 322 may include a visual indicator, such as a printed pattern, feature, and so forth that provides a visual indicator as to when the main wheel 302 is rotating. In some implementations the release button 304 may also serve as a visual indicator.

The main wheel 302 may be sized to provide a relatively small gap 306 between an outer edge of a tire and a portion of the main body 102. For example, the gap 306 may be less than 3 millimeters (mm). By using a relatively small gap 306, fouling with foreign objects may be minimized.

The main body 102 may include a modular payload bay 104. The modular payload bay 104 provides one or more of mechanical or electrical connectivity with the device 100. For example, the modular payload bay 104 may include one or more engagement features such as slots, cams, ridges, magnets, bolts, and so forth that are used to mechanically secure an accessory within the modular payload bay 104. In one implementation, the modular payload bay 104 may comprise walls within which the accessory may sit. In another implementation, the modular payload bay 104 may include other mechanical engagement features such as slots into which the accessory may be slid and engaged.

The modular payload bay 104 may include one or more electrical connections. For example, the electrical connections may comprise a universal serial bus (USB) connection that allows for the transfer of data, electrical power, and so forth between the device 100 and the accessory.

A tower 106 extends upwards from the main body 102. An extensible mast 108 (mast) that is able to extend upwards is stowed at least partially within the tower 106 and may extend into the main body 102. The mast 108 may be used to elevate a payload relative to the main body 102. The payload is discussed in more detail with regard to FIG. 13.

The tower 106 may pan left and right relative to the main body 102. In some implementations the mast 108 may pan in unison with the tower 106. The tower 106 is described in more detail with regard to FIGS. 13-17 and the mast 108 in FIGS. 18-21, 33-34, and so forth.

A top surface of the tower 106 may include one or more input devices, such as buttons 702. These buttons 702 may allow a user to perform functions such as turning the device 100 on or off, changing volume of sound produced by speakers on the device 100, and so forth.

A display assembly 110 is affixed to an upper portion of the tower 106. For example, an upper edge of the display assembly 110 is joined to the tower 106 by one or more hinges. The one or more hinges permit the display assembly 110 to tilt relative to the tower 106. For example, a right hinge 704 and a left hinge 706 are used to join the display assembly 110 to a shaft (not shown) that extends from the tower 106. FIGS. 24-28 discuss how the display assembly 110 is joined to the upper portion of the tower 106.

The display assembly 110 may include one or more components. For example, the display assembly 110 may include a frame that supports a first camera 802, a second camera 804, a display 806, and so forth. For example, the first camera 802 may comprise of a visible light camera while the second camera 804 comprises a depth camera. Continuing the example, the display 806 may comprise a touchscreen display that is able to present an image and accept input.

Figure 22:
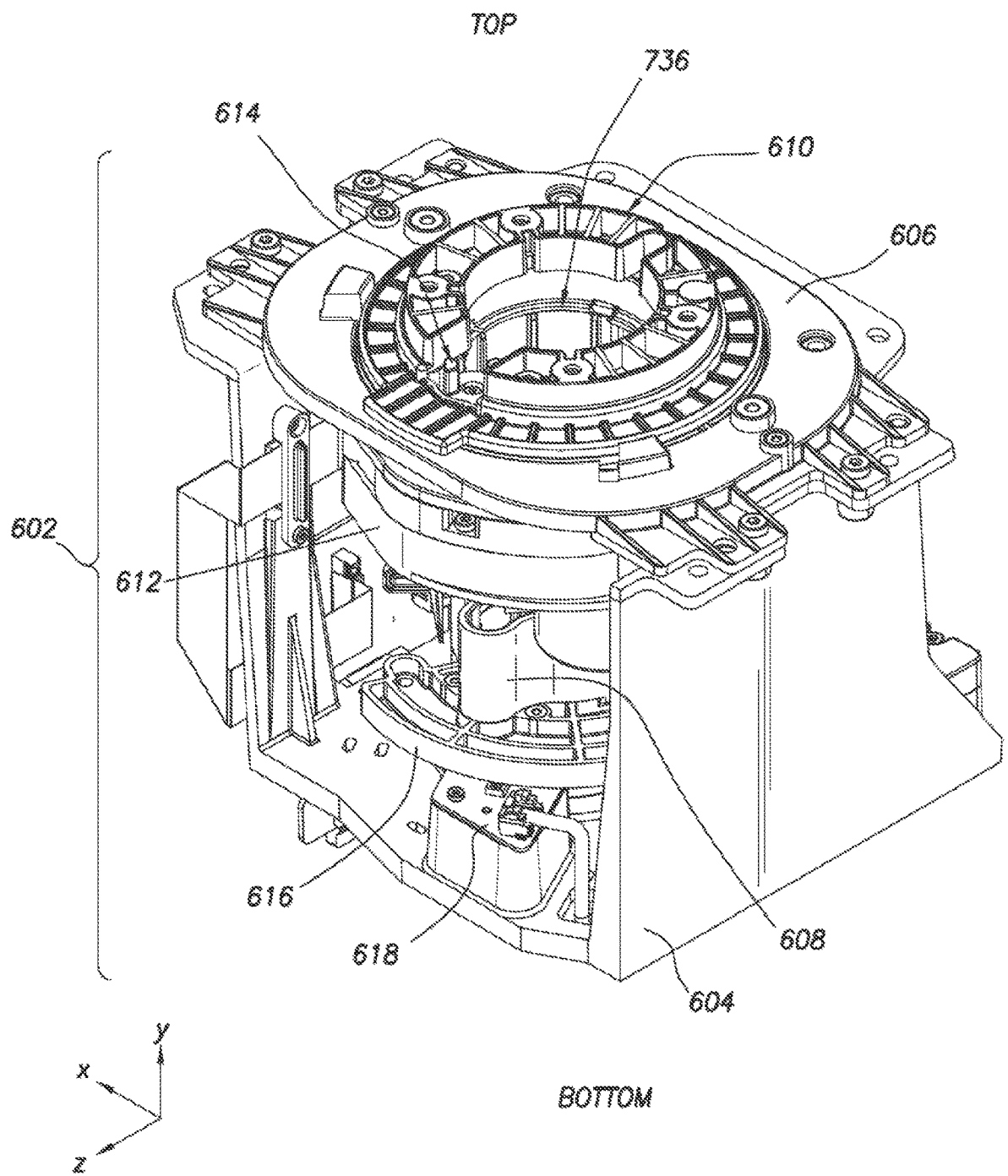
FIGS. 22-23 illustrate views of a pan and tilt assembly that pans the mast and tower and drives a tilt mechanism of the display assembly, according to some implementations.
Figure 23:
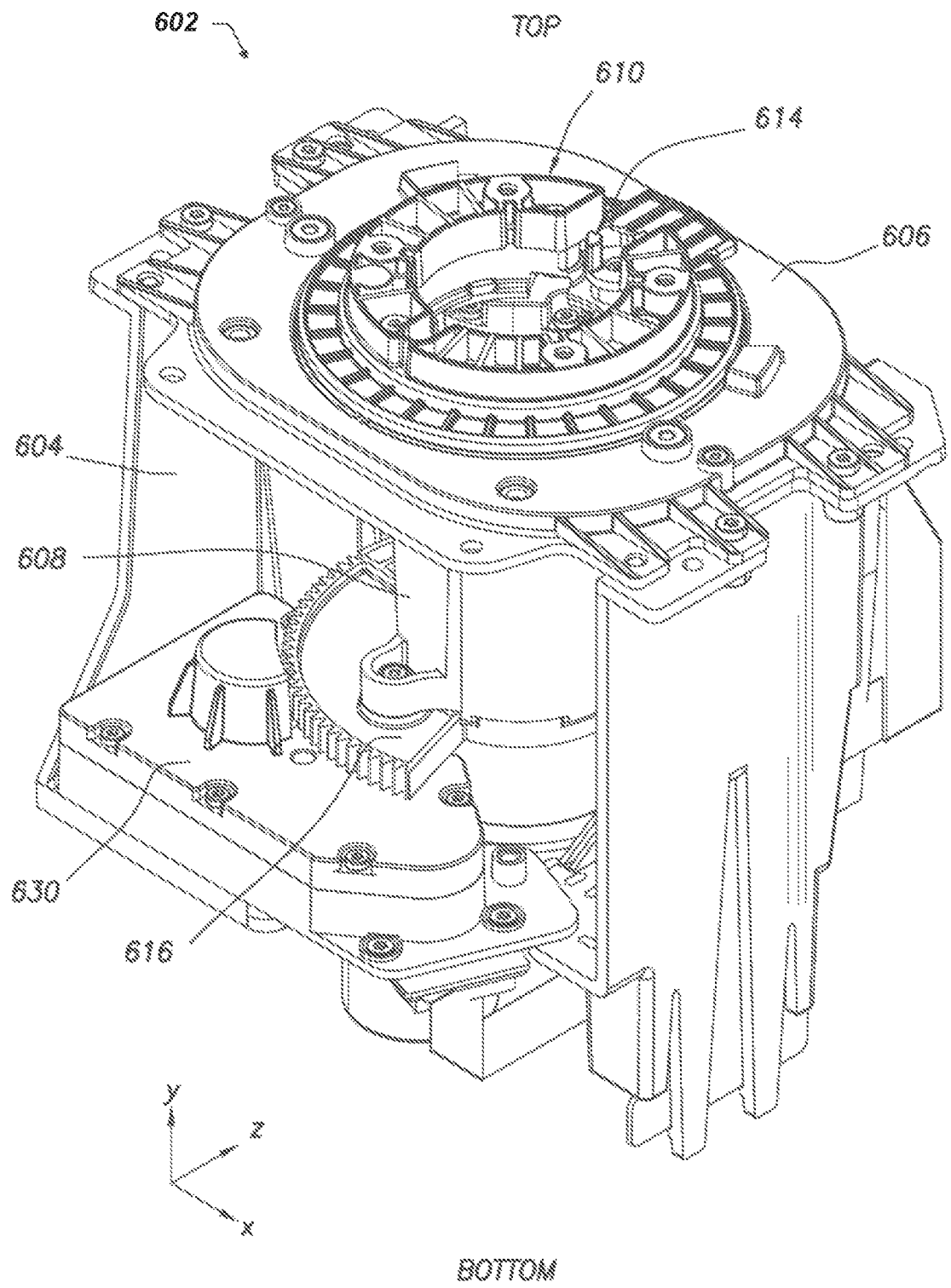

A pan and tilt assembly 602 (not visible) is within the main body 102 and is discussed in more detail with regard to FIGS. 22-23. The pan and tilt assembly 602 comprises a first motor that rotates or pans the tower 106 and the mast 108. The pan and tilt assembly 602 also includes a second motor that tilts the display assembly 110.

A carrying handle 112 may be provided that is proximate to a center of gravity of the device 100. For example, the carrying handle 112 may comprise a recess that has an opening within the modular payload bay 104 and extends into the main body 102. A user may use the carrying handle 112 to lift the device 100.

Figure 2:
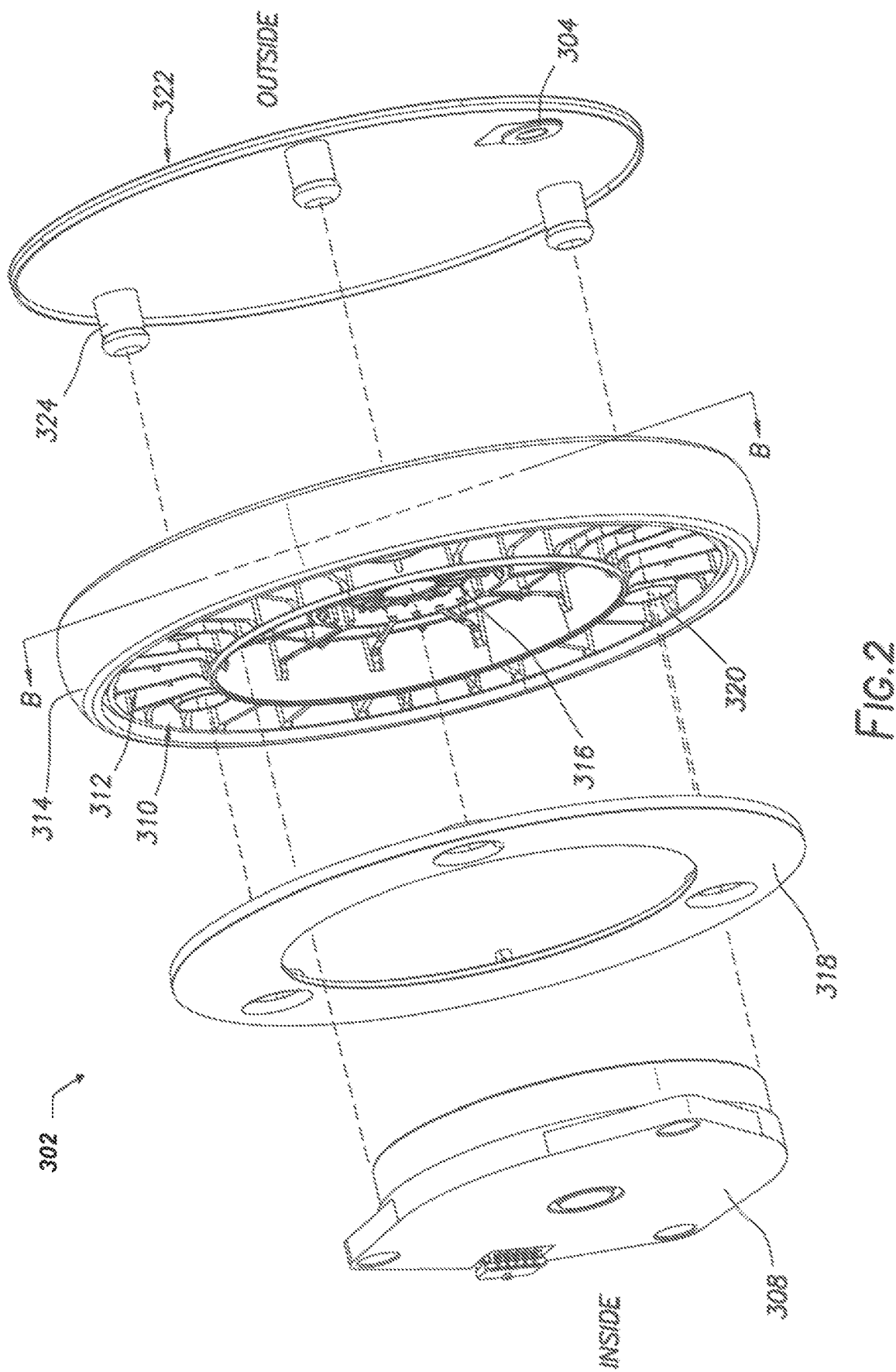
FIG. 2 illustrates an exploded view of a main wheel and associated motor, according to some implementations.

FIG. 2 illustrates an exploded view of a main wheel 302, according to some implementations. In this illustration a motor 308 is depicted. The motor 308 may comprise a brushless direct current motor. The main wheel 302 may comprise a hub 310. The hub 310 may include one or more ribs 312 to provide structural rigidity. In another implementation, the hub 310 may be solid. The main wheel 302 may include a tire 314 around an outer circumference of the hub 310.

The tire 314 may comprise an elastomeric material. In some implementations the tire 314 and other portions of the main wheel 302 may provide an electrically conductive path for electrostatic discharge. This allows the device 100 to dissipate accumulated static charge to the surface upon which the device 100 is resting. In some implementations the tire 314 may be molded or formed onto the hub 310 during manufacture.

The hub 310 may include a hub gear 316. For example, the hub gear 316 may comprise teeth that are arranged radially around a central bore in the hub 310. The hub gear 316 may engage teeth on an output shaft of the motor 308, transferring rotation of an output of the motor 308 to the hub 310. In other implementations, a direct drive motor arrangement may be used. For example, the hub 310 may incorporate a rotor that operates in conjunction with a stator that is affixed to a chassis of the main body 102.

An inner cover 318 may be affixed to an inner surface of the hub 310. For example, bolts or screws may be used to join the inner cover 318 to the hub 310. The inner cover 318 may provide a smooth surface that, during rotation of the main wheel 302 reduces fouling by avoiding the presentation of surface features which could catch on loose objects that are underneath the device 100.

The hub 310 may include one or more retention holes 320. The retention hole 320 has an opening on the outside surface of the hub 310. In some implementations the retention hole 320 may pass completely through the hub 310. The retention hole 320 has a profile that changes with respect to the distance from the outside surface of the hub 310. For example, the diameter of the retention hole 320 at the outside surface of the hub 310 may be 5 mm. Farther inside, the retention hole 320 may widen to 8 mm.

Figure 3:
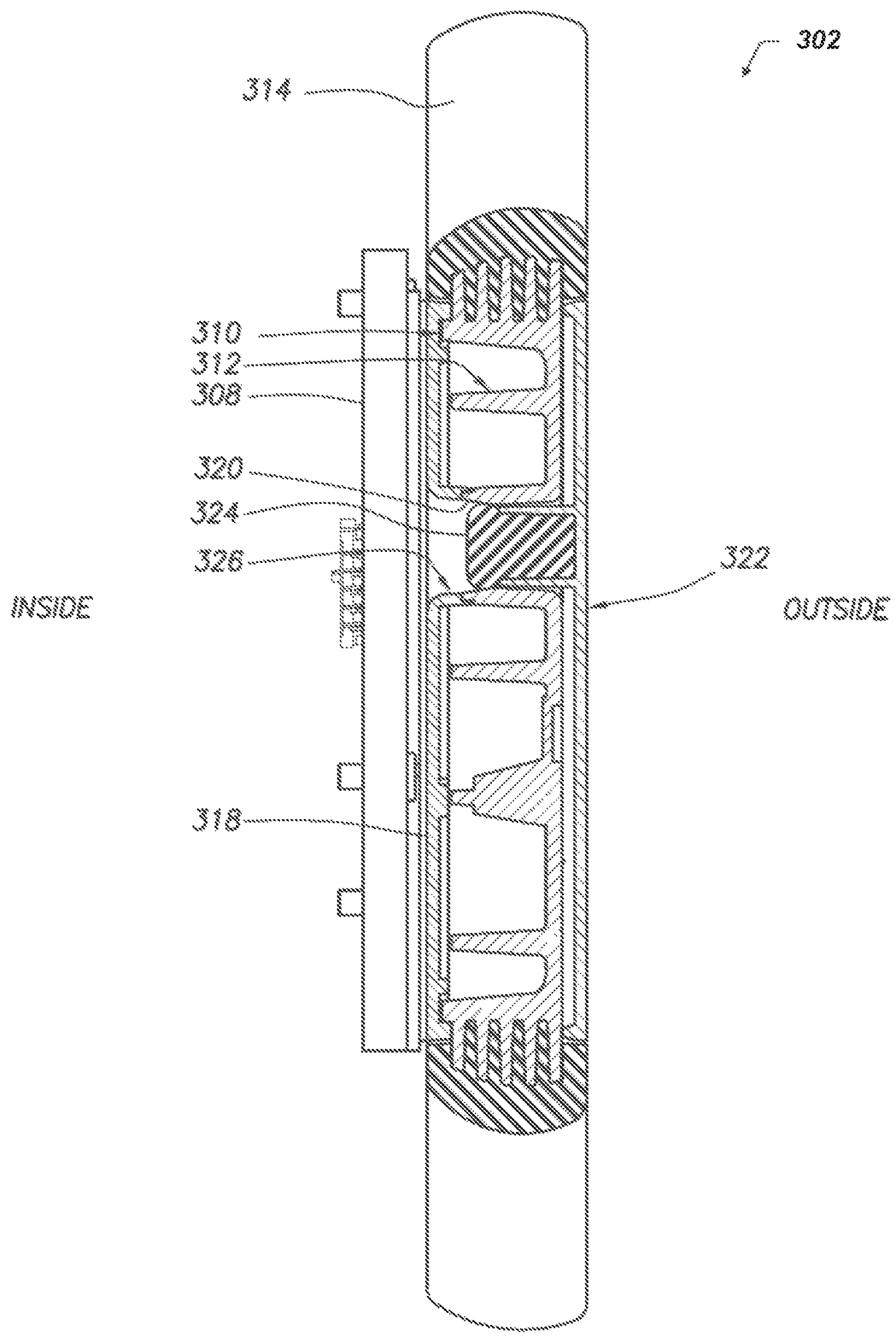
FIG. 3 illustrates a cross-sectional view of the main wheel, according to some implementations.

A wheel cover 322 may be removably affixed to an outer surface of the hub 310 using one or more retention posts 324. The retention post 324 may be affixed to, or integral with, the inside surface of the wheel cover 322. The retention post 324 may comprise an elastomeric material. For example, the retention post 324 may comprise silicone rubber that has been affixed to a feature on the inside surface of the wheel cover 322. The retention post 324 may be joined to the wheel cover 322 using one or more of adhesive, mechanical interference fit, ultrasonic welding, overmolding, and so forth. The retention post 324 may have an enlarged or bulbous tip. For example, a base of the retention post 324 that is proximate to the inside surface of the wheel cover 322 may have a first width. A top of the retention post 324 that is distal to the inside surface of the wheel cover 322 may have a second width that is greater than the first width. To join the wheel cover 322 to the hub 310, the retention posts 324 are aligned with respective ones of the retention holes 320 and a force toward the hub 310 is applied to the outside surface of the wheel cover 322. The force causes a temporary deformation of the tip of the retention posts 324, allowing them to pass into their respective retention holes 320. Once within the respective retention hole 320, the tip expands. This is illustrated in FIG. 3. The expansion of the retention post 324 exerts a force on the walls of the retention holes 320, pulling the retention post 324 and the portion of the wheel cover 322 to which it is attached towards the hub 310.

In another implementation the retention post 324 may comprise a non-elastomeric material. For example, the retention tip of the retention post 324 may comprise a plurality of segments, separate from one another, that are resilient. Continuing the example, the wheel cover 322 and the retention post 324 may comprise a single type of material, with the tip of the retention post 324 having a plurality of separate members that may temporarily deform during insertion or removal from the retention hole 320.

A release button 304 is also shown. To remove the wheel cover 322, the release button 304 may be pressed, forcing part of the wheel cover 322 away from the hub 310. The edge of the wheel cover 322 may then be grasped and then pulled away from the hub 310.

FIG. 3 illustrates a cross-sectional view of the main wheel 302, according to some implementations. In this view, the wheel cover 322 is shown in place on the hub 310. The retention post 324 is inside the retention hole 320. The wall 326 of the retention hole 320 may vary along the length of the retention hole 320. For example, the portion of the retention hole 320 that is proximate to the outside edge of the hub 310 has a first diameter that is narrower than a second diameter of the retention hole 320 that is proximate to the inside edge of the hub 310. The transition between these widths may be provided by a sloped surface. As the tip of the retention post 324 enters a wider portion of the retention hole 320, the tip expands and applies a pressure on the sloped surface, producing a force that pulls the retention post 324 towards the inside of the hub 310.

Mobility

Figure 4:
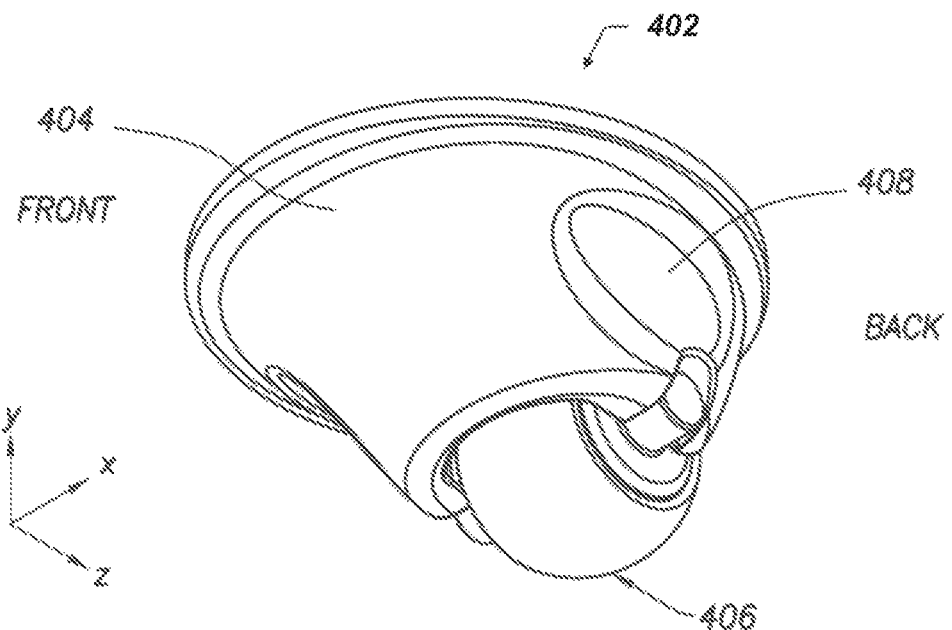
FIGS. 4-11 illustrate various views of a caster assembly, according to some implementations.

FIGS. 4-11 illustrate various views of a caster assembly 402, according to some implementations. FIG. 4 shows a lower perspective view of the caster assembly 402 including the caster body 404, the caster wheel 406, and a grip feature 408. During operation, the entire caster assembly 402 rotates with respect to the main body 102 of the device 100 while the caster wheel 406 rolls along the floor or other surface that the device 100 is supported by. Portions of the caster assembly 402 may comprise metals, plastics, ceramics, composite materials, and so forth. For example, the caster body 404 may comprise plastic.

Figure 5:
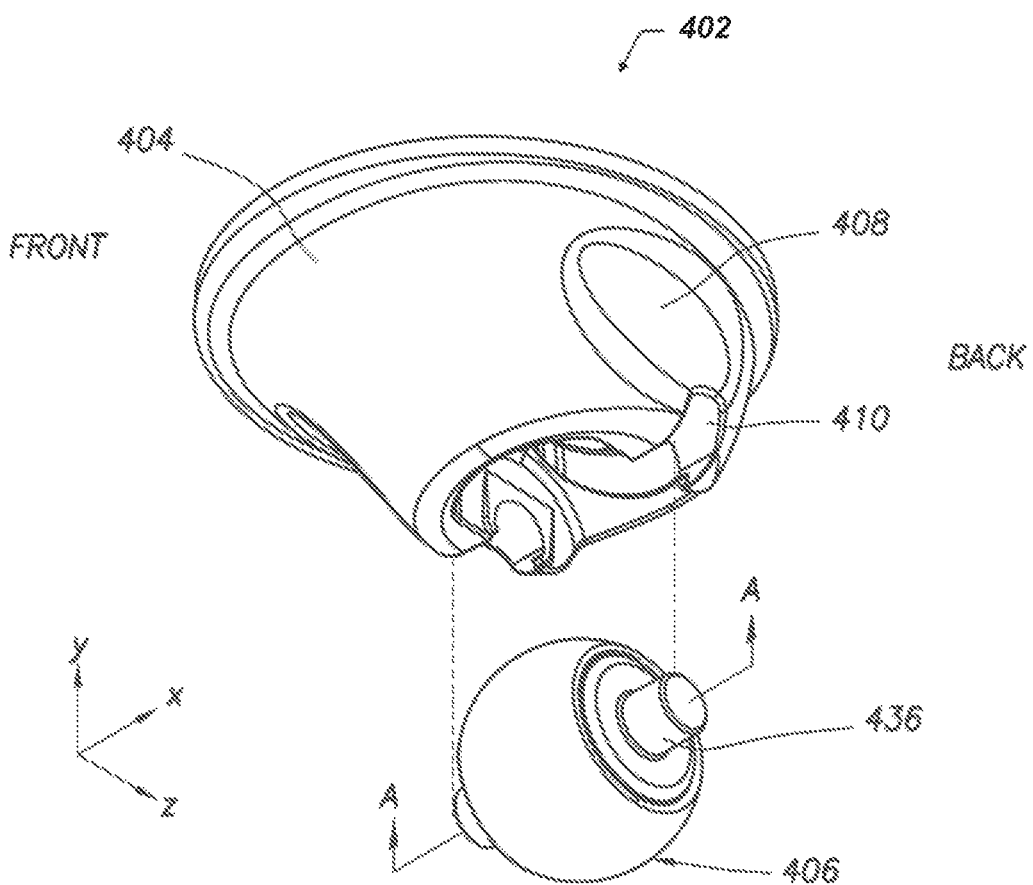

FIG. 5 shows the lower perspective view of the caster assembly 402 with the caster wheel 406 removed. The caster wheel 406 may be removed to facilitate maintenance or replacement. For example, as the caster wheel 406 wears down, the user may remove the caster wheel 406 and install a new replacement. To facilitate removal, the caster body 404 may include the grip features 408. The grip features 408 may comprise indents on either side of the caster body 404. In other implementations, other features may be provided, such as protrusions, ridges, and so forth. During assembly or maintenance, the user may grasp the caster body 404 using the grip features 408 with one hand while inserting or removing the caster wheel 406 with the other.

The caster body 404 includes one or more engagement slots 410. For example, the engagement slots 410 may provide a mechanical interference fit that retains a portion of the caster wheel 406, such as a caster wheel endcap 436. In this illustration, a first engagement slot 410 on a first side of the caster body 404 and a second engagement slot 410 on a second side of the caster body 404 engage respective caster wheel endcaps 436 on the caster wheel 406.

Figure 6:
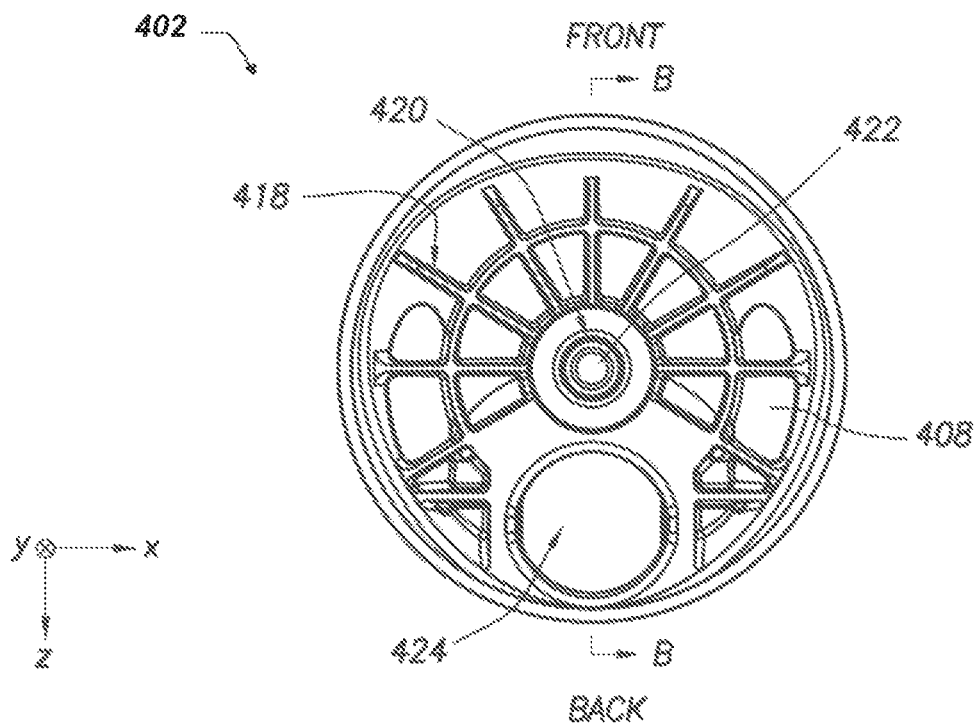

FIG. 6 shows a top view of the caster assembly 402 with the caster wheel 406 installed. The caster body 404 may include one or more ribs 418 or other structural elements. These structural elements provide structural strength to the caster body 404. The ribs 418 may extend to, or be integral with, a stem well 420 in the caster body 404. For example, the ribs 418 may extend radially from the walls of the stem well 420 to the edges of the caster body 404. Also shown is a wheel hole 424. The wheel hole 424 provides a cutout or a cavity into which an upper portion of the caster wheel 406 may extend.

Figure 7:
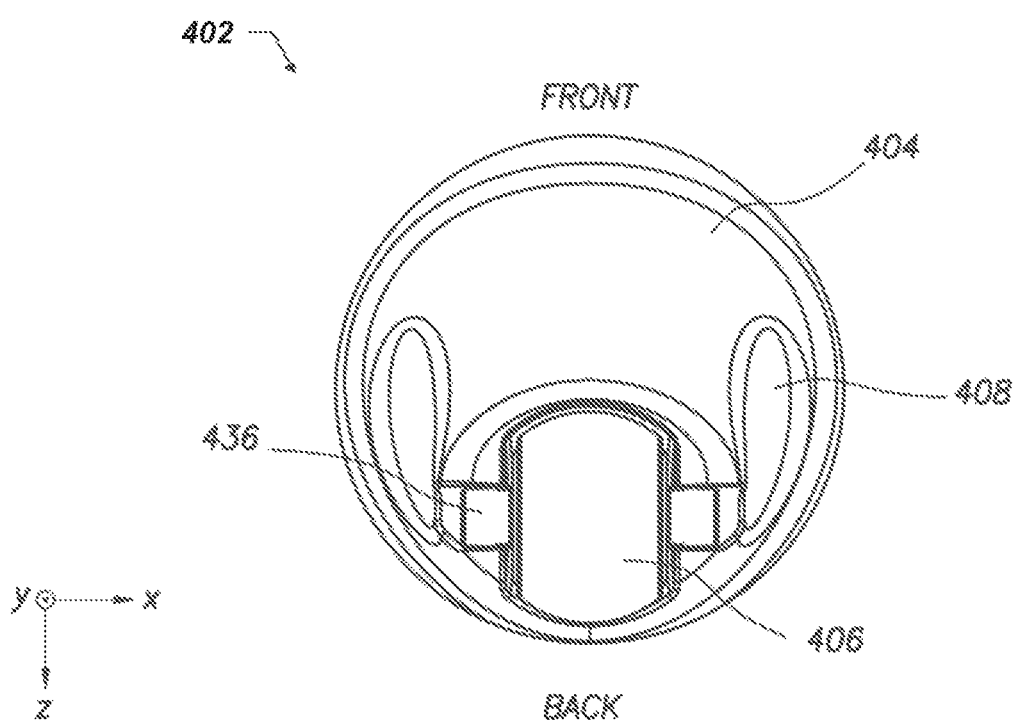

FIG. 7 shows a bottom view of the caster assembly 402 with the caster wheel 406 installed. The grip features 408 are visible on the left and right side of the caster body 404. The caster wheel endcaps 436 are also shown engaged within the wheel engagement slots 410.

Figure 8:
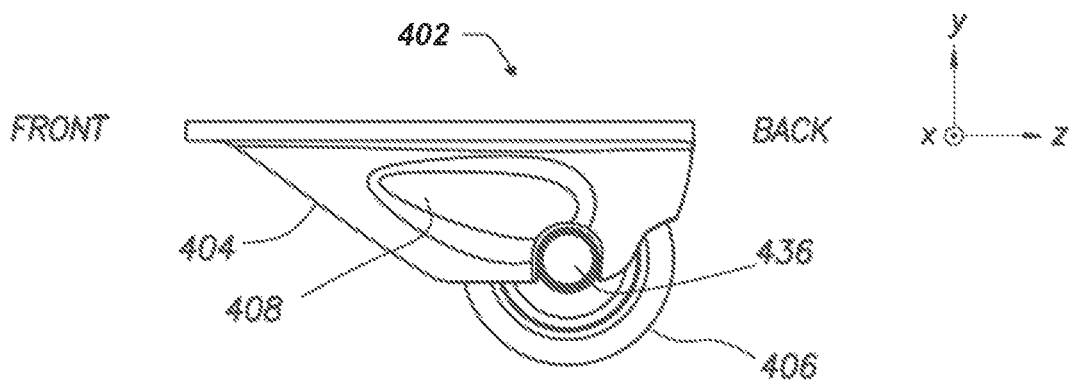

FIG. 8 shows a side view of the caster wheel assembly 402 with the caster wheel 406 installed. A front of the caster body 404 may be sloped or curved downwards toward the caster wheel 406. This feature allows the caster assembly 402 to more easily pass over an obstacle. Also visible is a grip feature 408 and one of the caster wheel endcaps 436.

Figure 9:
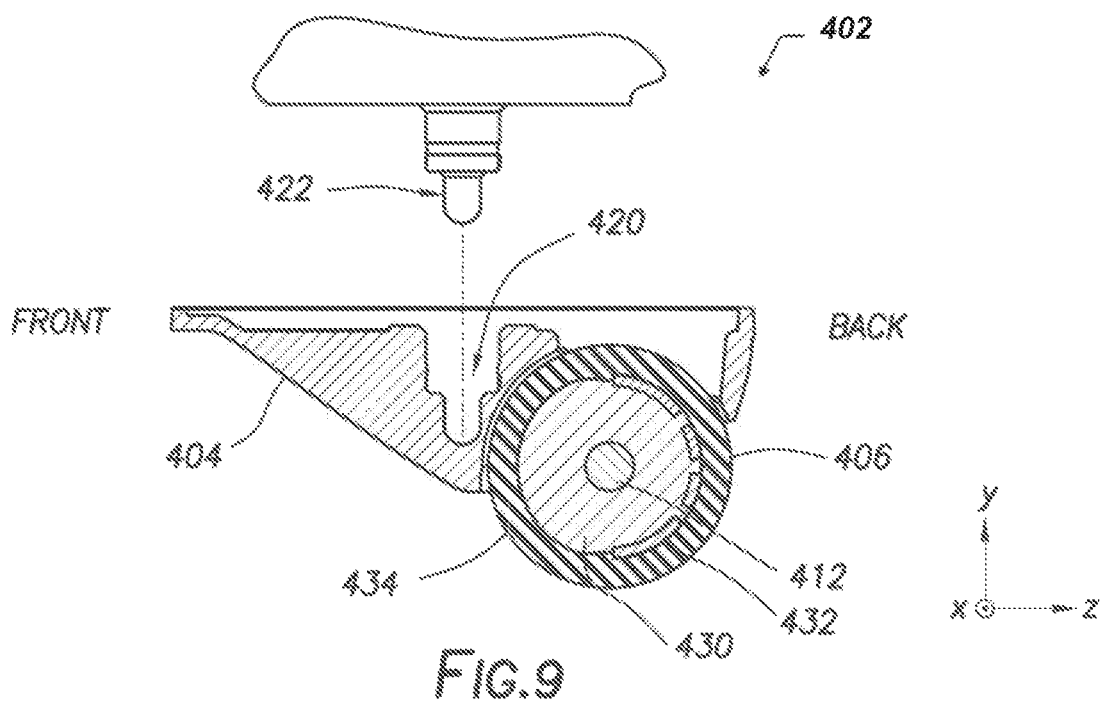

FIG. 9 depicts a cross-sectional view of the caster assembly 402 along line A-A shown in FIG. 5. The stem well 420 within the caster body 404 is visible. The stem well 420 may have a stepped cross section, with a first portion that has a first width and a second portion that has a second width. For example, as shown here, the innermost portion of the stem well 420 is narrower than the outermost portion of the stem well 420. Also shown is a stem 422 that extends from the main body 102. The stem 422 has a corresponding change in width of the portions. When the caster assembly 402 is installed onto the device 100, the stem 422 or other member extends down into the stem well 420. One or more engagement features, elastomeric features, and so forth may retain the caster assembly 402 on the stem 422 during use.

The stepped cross section of the stem well 420 increases the contact area between the stem well 420 and the stem 422. This increased contact area and corresponding structural elements such as the ribs 418 improve the physical strength of the caster assembly 402. For example, if the device 100 were to fall and the caster assembly 402 impacts the floor, the increased strength resulting from the stepped cross section may prevent cracking or other failures.

Also shown in this cross section is the caster wheel 406 and some of the associated structures, such as an axle 412, a caster wheel hub 430, a target element 432, and a tire 434.

Figure 10:
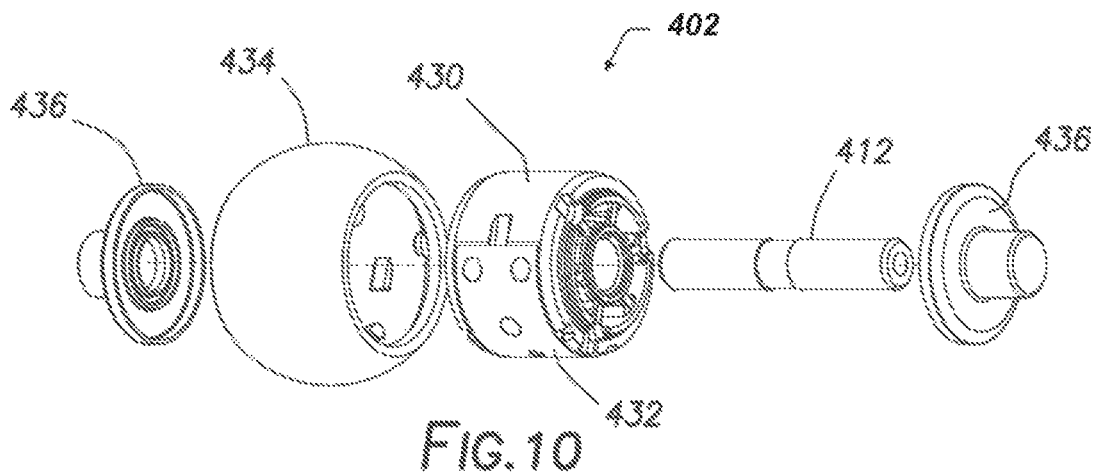

FIG. 10 shows an exploded view of the caster wheel 406. The caster wheel 406 may comprise an axle 412 which extends through a center bore of the caster wheel hub 430. The caster wheel hub 430 has a first outer surface proximate to a first opening of the center bore and a second outer surface that is proximate to a second opening of the center bore. A first end of the axle 412 may extend beyond the first outer surface and a second end may extend beyond the second outer surface.

The target element 432 may extend around at least a portion of the outer circumference of the caster wheel hub 430. The target element 432 is a conductive element that may comprise one or more pieces of a conductive material. In one implementation, the target element 432 may be arranged around at most one half the circumferential surface of the caster wheel hub 430. The target element 432 may comprise a strip, bar, sheet, film, or other arrangement of metal. For example, the target element 432 may comprise a layer of aluminum that has been deposited onto or otherwise affixed to at most one half the circumferential surface. In another implementation the target element 432 may comprise an electrically conductive polymer. In one implementation, the electrically conductive material may comprise a non-ferrous metal to prevent magnetic debris from being attracted to the caster wheel 406. For example, the target element 432 may comprise one or more of aluminum or copper.

The device 100 may include a sensor within the main body 102 that is able to detect the presence or change in position of the target element 432 during operation. For example, the sensor may comprise an inductive proximity sensor that determines the presence of a metal within a field of view based on a change in inductance. The sensor may provide data that is indicative of whether the caster wheel 406 is rotating, speed of rotation, and so forth. For example, if the caster wheel 406 is operating normally, when the main wheels 302 are operating to move the device 100, the caster wheel 406 should rotate, changing the location of the target element 432 with respect to the main body 102, caster body 404, and so forth. As the target element 432 moves with respect to the proximity sensor, the sensor produces an output signal that varies at least in part due to the presence and absence of the target element 432. As a result, the device 100 may determine rate of rotation, determine if the caster wheel 406 has fouled and is dragging, and so forth.

In other implementations other types of sensor may be used. For example, a capacitive sensor may be used to detect a change in capacitance due to the presence or absence of the target element 432.

In some implementations the inductive proximity sensor may be used to detect other objects. For example, the inductive proximity sensor may be used to detect a target element in a docking station for the device 100.

The tire 434 is arranged around the caster wheel hub 430 and the target element 432. The tire 434 may comprise an elastomeric material. In some implementations the tire 434 and other portions of the caster assembly 402 may provide an electrically conductive path for electrostatic discharge. For example, the conductive path may extend between the tire 434 and at least a portion of the stem well 420. This allows the device 100 to dissipate accumulated static charge to the surface upon which the device 100 is resting. In some implementations the tire 434 may be molded or formed onto the caster wheel hub 430 during manufacture.

A first caster wheel endcap 436 and a second caster wheel endcap 436 engage the ends of the axle 412. For example, one end of the axle 412 is placed within a center receptacle or feature in the caster wheel endcap 436. The axle 412 may rotate with respect to the caster wheel endcaps 436. For example, the caster wheel endcaps 436 and the axle 412 may be held stationary with respect to the caster body 404 while the caster wheel hub 430, target element 432, and tire 434 rotate.

While an axle 412 is shown, in other implementations the axle 412 may be omitted. For example, the caster wheel hub 430 may have a feature that engages a portion of the caster body 404 to provide rotation.

Figure 11:
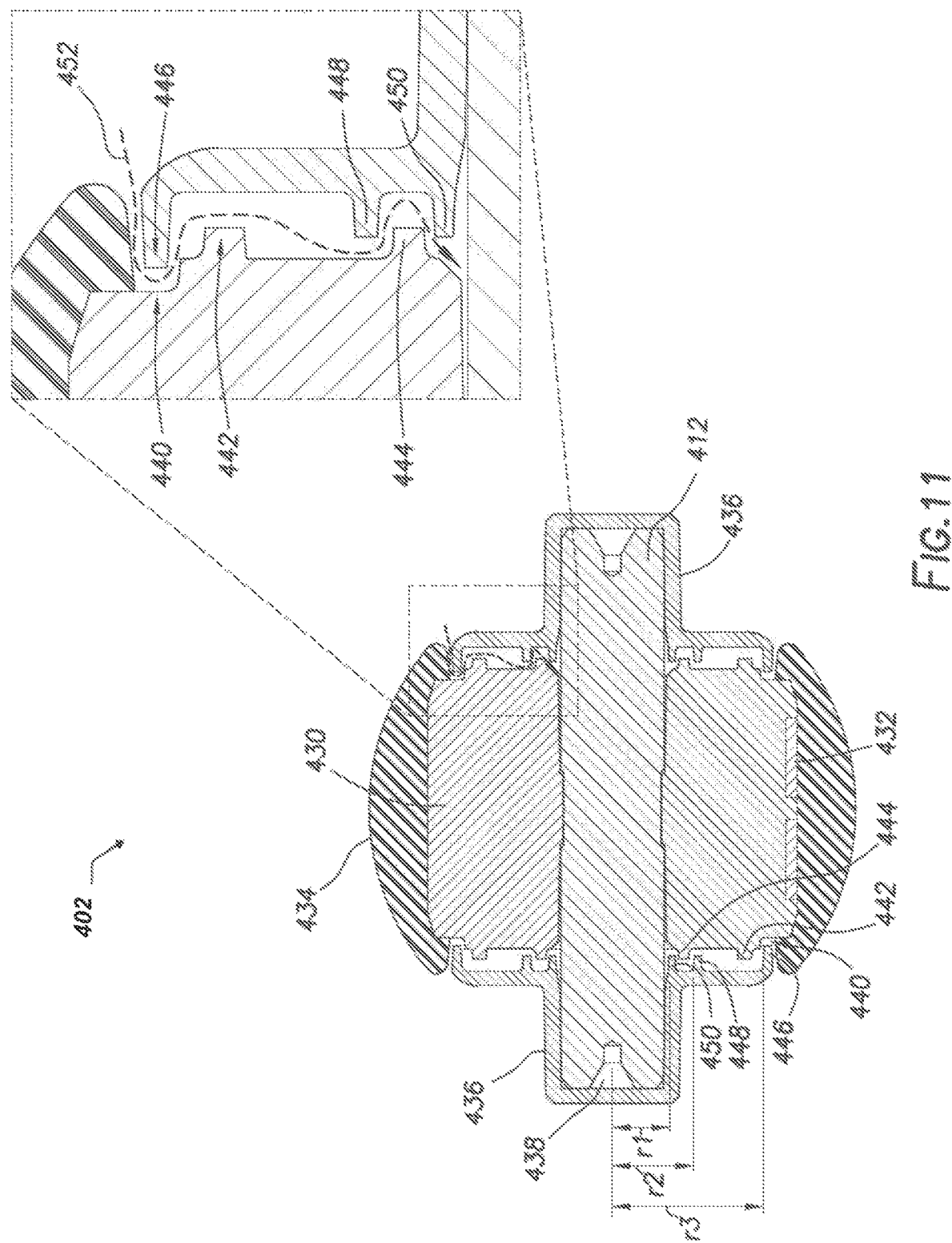

FIG. 11 depicts a cross section of the caster wheel 406 with an enlarged view showing a labyrinth seal between the caster wheel endcap 436. Visible in this view is the axle 412, the caster wheel hub 430, a bearing 438, the tire 434, and a portion of the target element 432. The bearing 438 joins the axle 412 and the caster wheel hub 430, allowing the axle 412 to rotate with respect to the caster wheel hub 430.

The caster wheel hub 430 has two outer surfaces on the ends, a circumferential surface, and a center bore. The outer surfaces each include one or more features that, in conjunction with features on the corresponding caster wheel endcap 436 form a labyrinth seal that reduces fouling of the caster wheel 406 by preventing relatively long fibers or other contaminants from reaching the interface between the axle 412 and the caster wheel endcap 436. The labyrinth seal introduces a tortuous path between the exterior environment and the axle 412.

As shown here, the caster wheel hub 430 may comprise a plurality of features including a hub feature 440, a first annular hub ridge 442, and a second annular hub ridge 444. The hub feature 440 may comprise a portion of the caster wheel hub 430 that is proximate to the perimeter of the caster wheel hub 430 that is narrower. The hub feature 440 and a portion of the tire 434 form a first groove.

The first annular hub ridge 442 and the second annular hub ridge 444 extend away from an outer surface of the caster wheel hub 430. The first annular hub ridge 442 is at a first radial distance from the center bore of the caster wheel hub 430. The second annular hub ridge 444 is at a second radial distance from the center bore of the caster wheel hub 430. In this illustration, the first radial distance is greater than the second radial distance.

Each of the caster wheel endcaps 436 include one or more features. A first annular cap ridge 446 extends from the inner surface of the caster wheel endcap 436. When installed on the caster wheel 406, the first annular cap ridge 446 extends past an outermost edge of the first annular hub ridge 442 and into the first groove formed by the first annular hub ridge 442 and the tire 434.

A second annular cap ridge 448 extends from the inner surface of the caster wheel endcap 436 past an outermost edge of the second annular hub ridge 444. A third annular cap ridge 450 extends from the inner surface of the caster wheel endcap 436 past an outermost edge of the second annular hub ridge 444. The second annular cap ridge 448 and the third annular cap ridge 450 form a second groove, into which the second annular hub ridge 444 extends.

The various ridges are at different radial distances from the center bore. For example, the third annular cap ridge 450 is at radius r1, the second annular cap ridge 448 is at radius r2, and the first annular cap ridge 446 is at radius r1 as shown here. In other implementations different numbers of ridges may be used. For example, the caster wheel hub 430 may have three annular hub ridges.

The various ridges produce a tortuous path 452 through which a potential contaminant would have to pass to foul the axle 412. Fouling that would prevent rotation of the caster wheel hub 430 with respect to the axle 412 is reduced, improving operation of the device 100.

Tower, Mast, Pan and Tilt, and Display

Figure 12:
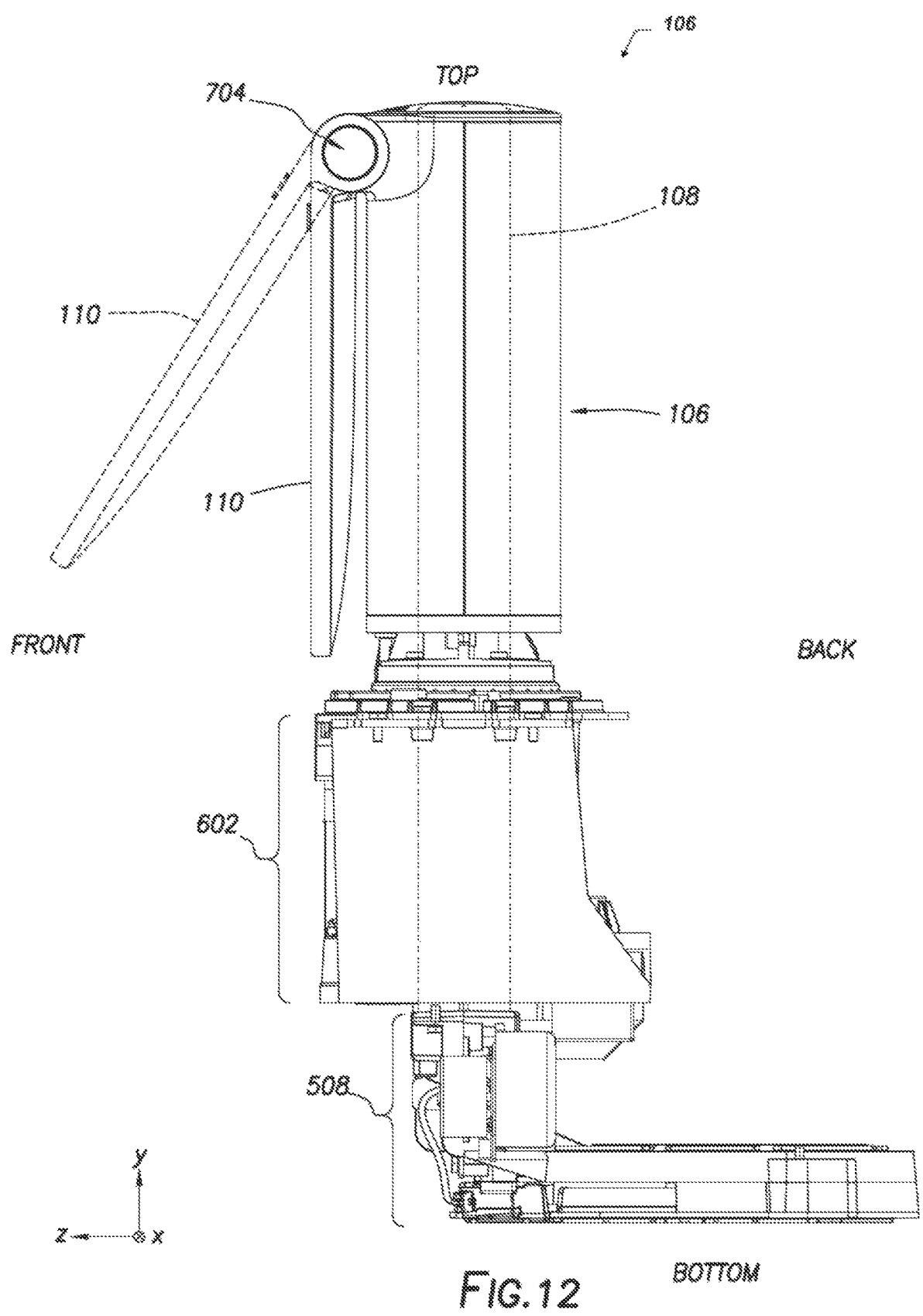
FIG. 12 illustrates a side view of the tower, the mast, a pan and tilt assembly, and the display assembly, according to some implementations.

FIG. 12 illustrates a side view of the tower 106, the mast 108, the pan and tilt assembly 602, and the display assembly 110, according to some implementations. This figure shows the relative arrangement with the device 100, while subsequent figures provide additional detail.

The tower 106 is affixed to a top slipring 610 (not visible) on an upper portion of the pan and tilt assembly 602. A lift assembly 508 is located below the pan and tilt assembly 602. The mast 108 extends from the lift assembly 508, up through the pan and tilt assembly 602, and up and through the tower 106. The lift assembly 508 operates to raise or lower the mast 108.

A first motor within the pan and tilt assembly 602 pans the tower 106 and the mast 108. For example, a base of the mast 108 may engage a portion of the top slipring 610 such that when the upper portion of the pan and tilt assembly 602 rotates the mast 108 rotates in unison.

As shown, the display assembly 110 tilts with respect to the tower 106. The tilt motion is driven by a second motor within the pan and tilt assembly 602.

Mast Lift Assembly

FIGS. 13-17 illustrate various views of the mast 108 and the lift assembly 508 that raises and lowers the mast 108, according to some implementations.

Figure 13:
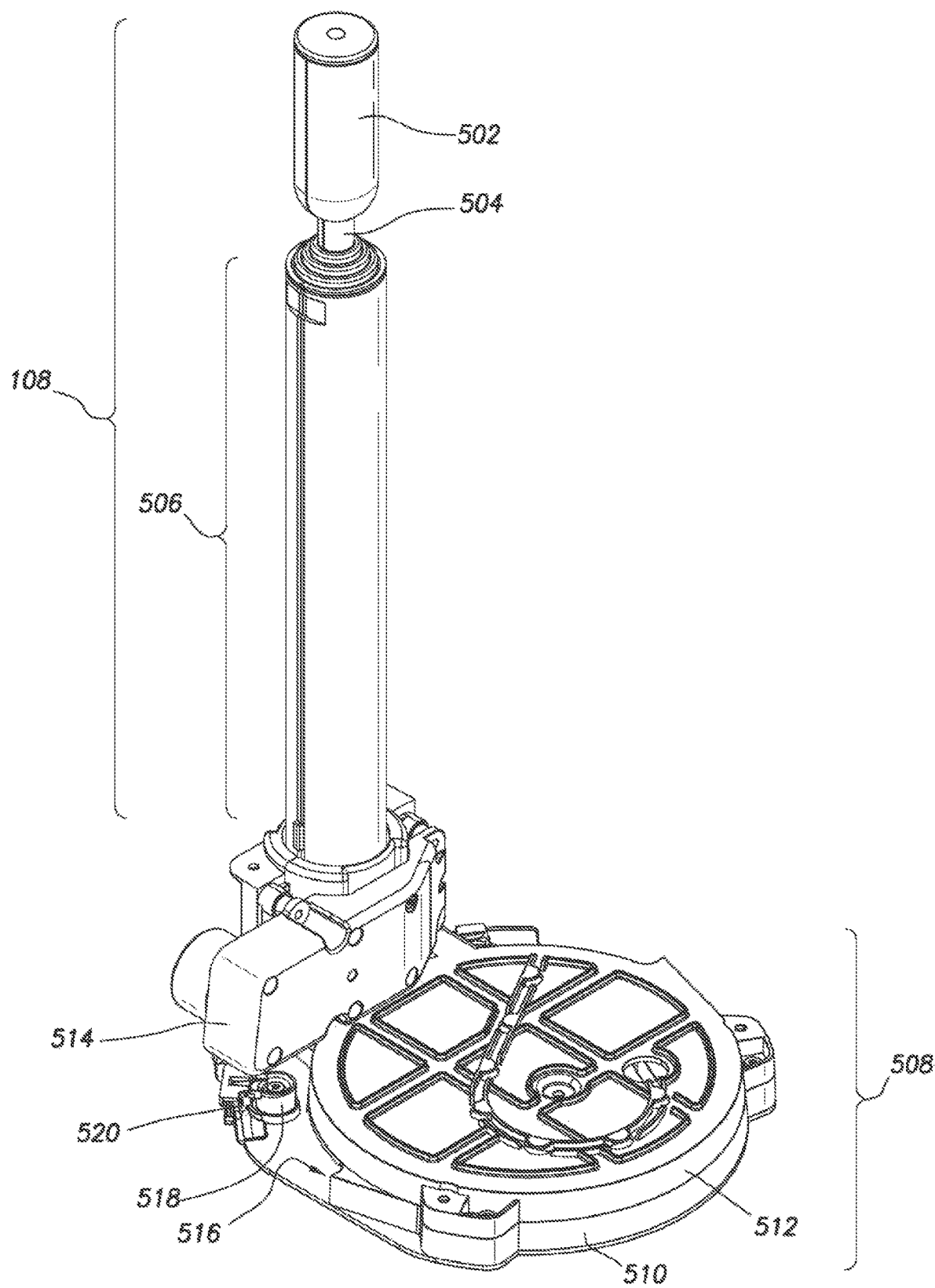
FIGS. 13-17 illustrate various views of the mast and a lift assembly that raises and lowers the mast, according to some implementations.

FIG. 13 shows a perspective view of the mast 108 and the lift assembly 508. The mast 108 is extensible and can be raised and lowered by operating the lift assembly 508. The mast 108 and the lift assembly 508 may be able to rotate with respect to one another. For example, the mast 108 may pan or rotate relative to the lift assembly 508.

The mast 108 comprises a plurality of telescoping sections 506. An innermost section of the telescoping sections 506 is attached to a payload 502 via an upper mast interface 504. The payload 502 may comprise sensors such as a camera, microphone, or output devices such as a light, speaker, and so forth. In some implementations the payload 502 may comprise connectors to allow for changing or adding other components. For example, the payload 502 may include a physical engagement feature such as a shoe, cam, ridge, threaded bolt, and so forth. Continuing the example, the payload 502 may include an electrical connector such as contacts, pogo pins, jumpers, and so forth. The electrical connector may be electrically connected to a conductor of a cable 534 (shown in FIG. 15).

The lift assembly 508 includes a lower spool 510, an upper spool 512, a lift motor assembly 514, a lower spool egress 516, a rack guide 518, and a rack sensor 520. The lower spool 510 and the upper spool 512 may be oriented with their respective planes perpendicular relative to a long axis of the mast 108. In other implementations other orientations of the planes of the spools may be used.

Additional details on the mechanism for sequencing deployment of the mast 108 are presented below with regards to FIGS. 30A-32.

Figure 14:
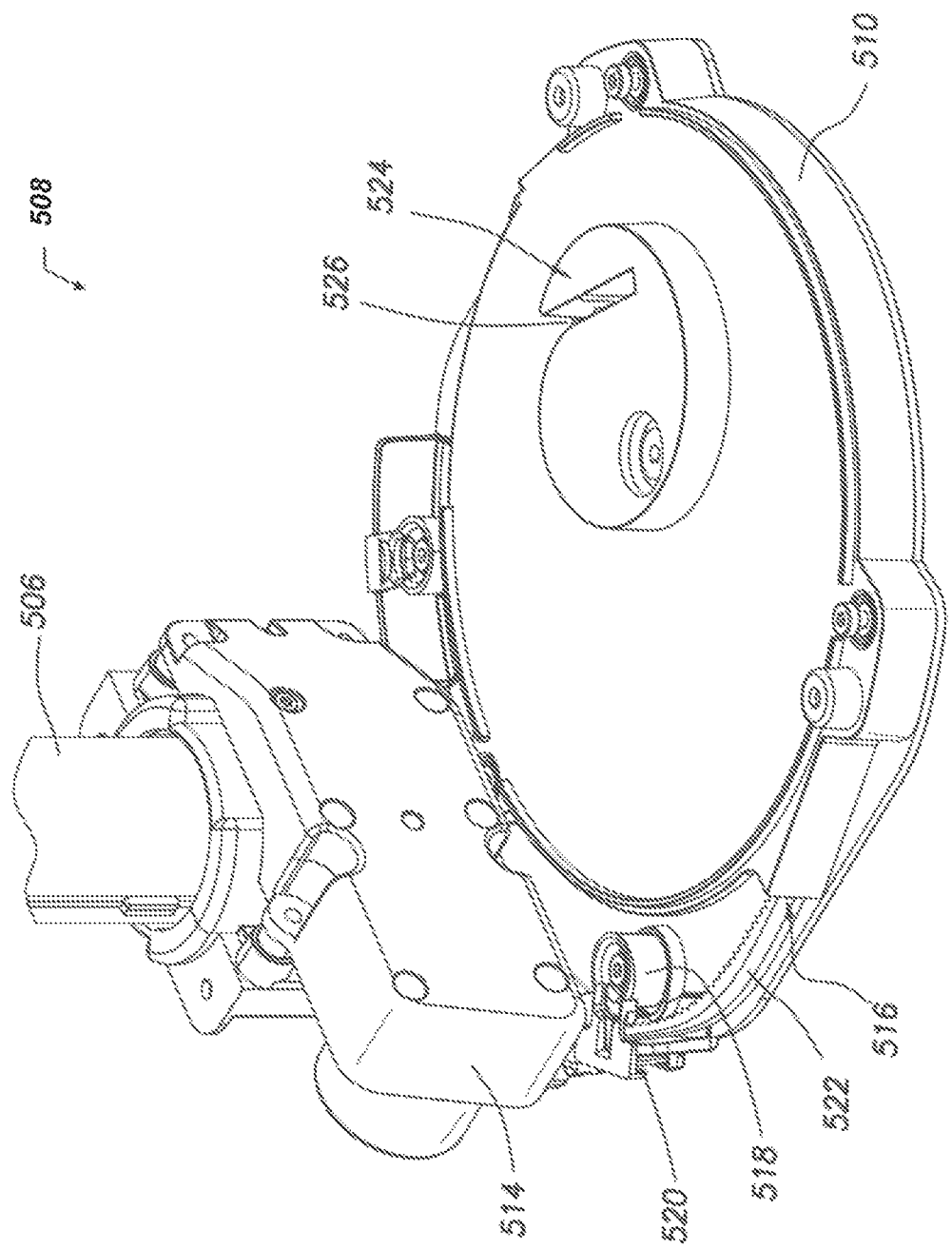

FIG. 14 shows an enlarged view of the lift assembly 508 in which a cover of the upper spool 512 has been removed to show the interior of the upper spool 512. Each of the spools includes a mandrel 524. The mandrel 524 may be fixed with regard to the structure of the spool, remaining stationary during operation. In some implementations, the mandrel 524 may be formed into or from a portion of the structure of the spool.

In the implementation shown here, the upper spool 512 has a mandrel 524 that is off center with respect to the interior of the upper spool 512. The lower spool 510 may also have a mandrel 524 that is off center with respect to the interior of the lower spool 510. The mandrel 524 may be circular, elliptical, or irregular in cross section. The mandrel 524 for the upper spool 512 may have a first width while the mandrel 524 for the lower spool 510 may have a second width. In some implementations the first width and the second width may be the same.

A flexible member, such as a flexible rack 522 is stowed at least in part within the lower spool 510. For example, one end of the flexible rack 522 may be disposed within the lower spool 510. The mandrel 524 within the lower spool 510 prevents the flexible rack 522 from fouling during deployment or retrieval of the flexible rack 522.

One end of the flexible rack 522 may be held, affixed, or joined to a portion of the mandrel 524 in the lower spool 510. For example, the end of the flexible rack 522 that is inside the lower spool 510 may be retained by a feature of the mandrel 524.

The size of the mandrel 524 may be selected to maintain a minimum bend radius. The minimum bend radius may be selected to minimize or avoid damage to the flexible rack 522 or cable 534 (shown in FIG. 15) due to bending.

The flexible rack 522 may comprise a semi-rigid member which comprises a rack having a plurality of teeth on one side of the member. For example, the flexible rack 522 may comprise plastic. In some implementations at least a portion of the flexible rack 522 may comprise a compliant material, such as an elastomeric material. During operation, this compliance reduces noise due to interaction between the teeth and the corresponding teeth in the lift motor assembly 514 that engage the flexible rack 522. In other implementations, the flexible rack 522 may omit the plurality of teeth.

Figure 16:
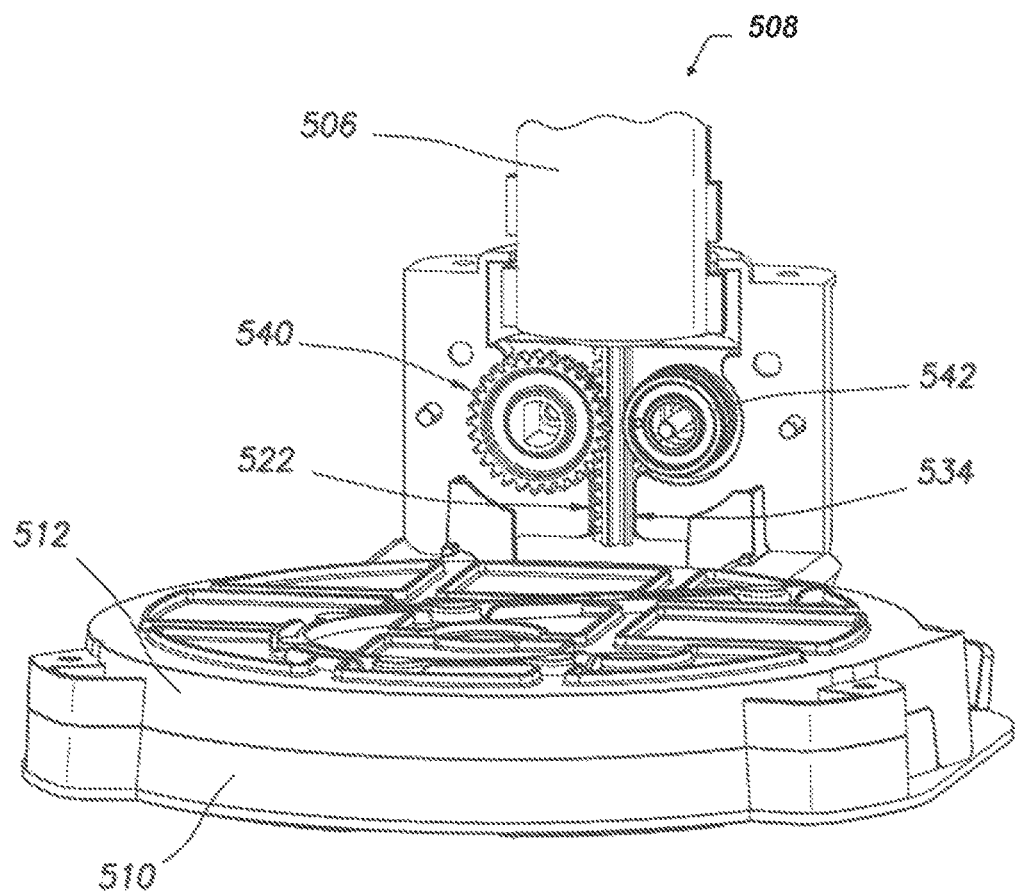

The flexible rack 522 is stowed in the lower spool 510, and a portion passes from within the lower spool 510, out the lower spool egress 516, through the rack guide 518, and into the lift motor assembly 514. FIG. 16 depicts in more detail how the flexible rack 522 is engaged by the lift motor assembly 514. To raise the mast 108, the lift motor assembly 514 pulls the flexible rack 522 from the lower spool 510 and pushes the flexible rack 522, applying a force along the flexible rack 522 that extends the telescoping sections 506. To lower the mast 108, the lift motor assembly 514 pulls the flexible rack 522 from the mast 108 and pushes the flexible rack 522 back into the lower spool 510.

When stowed, the walls of the lower spool 510 contain the flexible rack 522 and may serve as a hard stop when the mast 108 is retracted and may also prevent rattling of the flexible rack 522 when the mast 108 is retracted.

The rack sensor 520 is present along some portion of the path traversed by the flexible rack 522. For example, the rack sensor 520 may be mounted to the rack guide 518. The rack sensor 520 generates data indicative of one or more of how much flexible rack 522 has passed the rack sensor 520, an absolute value as to the position on the flexible rack 522, and so forth. For example, the rack sensor 520 may comprise an optoelectronic sensor that acquires successive images of the flexible rack 522 that are within a field of view. Features on the flexible rack 522 may be detected by the rack sensor 520 and used to provide information indicative of the movement of the flexible rack 522. These features may be inherent, such as a result of production, or may be applied. For example, applied markings may be embossed, etched, printed, and so forth onto the flexible rack 522. In another example, the markings on the flexible rack 522 may be used to provide an absolute position, such as the portion at the rack sensor 520 is at distance 25.3 centimeters (cm) from a first end of the flexible rack 522. Data from the rack sensor 520 may be used to determine height of the mast 108, whether there is a malfunction such as a broken or jammed flexible rack 522, and so forth. In other implementations, other types of rack sensors 520 may be used.

In some implementations the motor within the lift motor assembly 514 may provide output data indicative of rotation of the motor. For example, the motor may include a rotation encoder. This output data may be used to determine a length of flexible rack 522 that has been raised or lowered. Data from the motor encoder may be used to determine height of the mast 108, whether there is a malfunction such as a broken or jammed flexible rack 522, and so forth. For example, a discrepancy between the motor encoder and the rack sensor 520 may indicate a failure.

Figure 15:
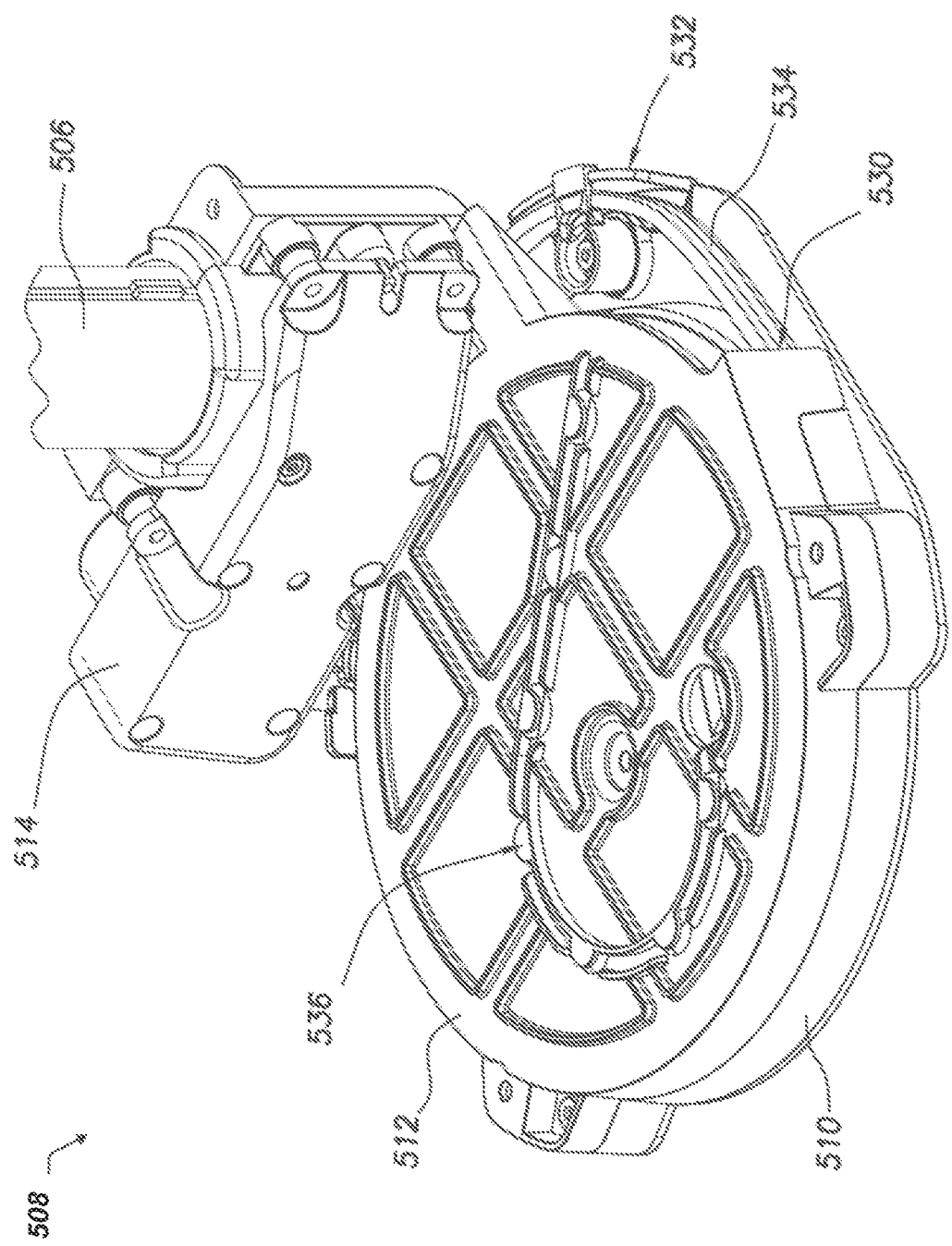

The upper spool 512 stows a cable 534 (shown in FIG. 15). The cable 534 includes conductors that provide power from the main body 102 to the payload 502. The cable 534 may include conductors, optical fibers, or other components that may be used to transfer signals between the payload 502 and the main body 102. For example, the cable 534 may comprise a pair of coaxial cables that provide power to operate a camera in the payload 502, convey control signals to the camera, and convey data back to circuitry within the main body 102. The pair of coaxial cables may be enclosed within a flexible plastic extrusion.

As described above, the upper spool 512 may also comprise a mandrel 524 as shown in FIG. 14. The mandrel 524 may prevent fouling of the cable 534 (omitted for clarity), maintain a minimum bend radius of the cable 534, and so forth. A portion of the cable 534 is disposed within the upper spool 512. The mandrel 524 in the upper spool 512 may include a mandrel ramp 526 that provides a path for a first end of the cable 534 to exit the interior of the upper spool 512. A first end of the cable 534 may exit the upper spool 512 and connect to circuitry elsewhere within the main body 102. This connection may be accomplished without the need for rotary contacts or other type of rotating interface. The cable 534 may be arranged around the mandrel 524 with a second end exiting through an upper spool egress 530, as shown in FIG. 15.

FIG. 15 shows the cable 534 that is stowed in the upper spool 512, a portion of which passes through the upper spool egress 530, through the cable guide 532, and into the lift motor assembly 514.

In FIG. 15, a cable routing feature 536 is shown on the top of the housing for the upper spool 512. The cable routing feature 536 may be used to retain and direct a portion of the cable 534 to another location within the main body 102. For example, the cable routing feature 536 may comprise a groove with retention features that maintain the cable 534 within the groove.

FIG. 16 depicts a view of the lift assembly 508 in which a portion of the lift motor assembly 514 has been removed. In this view, a bottom portion of the telescoping sections 506 is visible. A portion of the flexible rack 522 and the cable 534 are shown extending up into the telescoping sections 506 of the mast 108. A rack drive gear 540 is depicted which has a plurality of teeth that engage the teeth on the flexible rack 522. In this view, the rack drive gear 540 comprises a coaxial gear with an inner smaller diameter gear that has the plurality of teeth that engage the flexible rack 522 while an outer larger diameter gear is driven by a gear coupled to a shaft of a motor in the lift motor assembly 514 that is not shown. As the rack drive gear 540 rotates, a force is exerted on the flexible rack 522 that moves the flexible rack 522 into the mast 108 or into the lower spool 510.

The rack drive gear 540 and a friction wheel 542 are proximate to the base of the mast 108. The friction wheel 542 may be mechanically coupled to the motor in the lift motor assembly 514. For example, the friction wheel 542 may be driven by the motor in the lift motor assembly 514 to move in unison with the portion of the rack drive gear 540 that engages the flexible rack 522. While the rack drive gear 540 rotates in a first direction, the friction wheel 542 rotates in a second direction opposite the first direction. During operation, the friction wheel 542 is in contact with a first side of the cable 534 and biases a second side of the cable 534 towards the side of the flexible rack 522 that is opposite the side of the flexible rack 522 that includes the plurality of teeth.

In other implementations other techniques may be used to move the flexible member. For example, instead of a rack drive gear 540 and a friction wheel 542, two or more wheels or rollers may be used. One or both of the wheels may be mechanically coupled to a motor. During operation, the two wheels may rotate in directions opposite one another. The wheels may apply a force that biases the flexible member and the cable 534 together. The rotation of the wheels, as driven by the motor, moves the combined flexible member and cable 534 up or down.

The flexible rack 522 and the cable 524 may exhibit a "set" or preferential bend. This preferential bend may occur during manufacturing, storage within a spool, or a combination thereof. The flexible rack 522 and the cable 534 are coiled within the lower spool 510 and the upper spool 512, respectively, in opposite directions. For example, the flexible rack 522 may be coiled clockwise within the lower spool 510 while the cable 534 is coiled counterclockwise within the upper spool 512, or vice versa.

The flexible rack 522 and the cable 534 may be loosely coiled about their respective mandrels 524. For example, there may be some space or gap between the loops of the flexible rack 522 within the lower spool 510 when the mast 108 is in the lowest position.

After being dispensed from the respective spools, the flexible rack 522 and the cable 534 are brought together between the rack drive gear 540 and the friction wheel 542, or other mechanisms. The preferred bending direction of the flexible rack 522 is in one direction while the preferred bending direction of the cable 534 is in the opposite direction.

This arrangement results in increased stability during lift of the mast 108 or in the event pressure is applied to the mast 108. For example, if a user pushes down on the mast 108, the force will tend to drive the flexible rack 522 and cable 534 to bend in their preferred bending directions. Since those preferred bending directions are opposite, the pair resists the force more effectively than a single flexible rack 522 or cable 534 alone.

Figure 17:
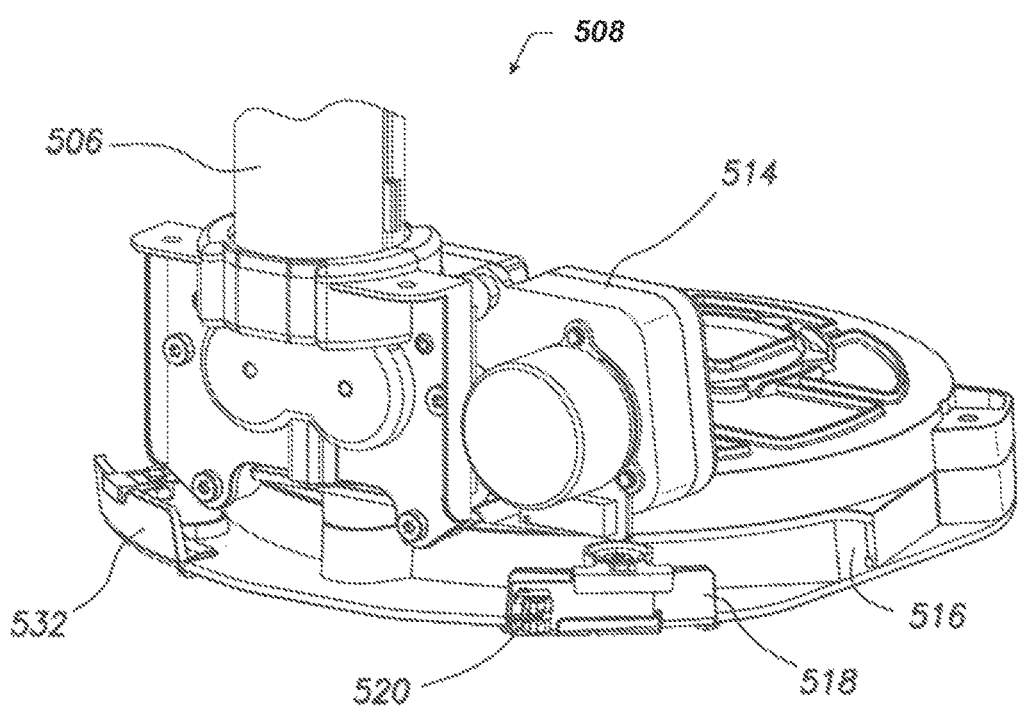

FIG. 17 depicts a view from another direction of the lift assembly 508. In this view the lower spool egress 516, the rack guide 518, the rack sensor 520, and the cable guide 532 are visible.

It is understood that in other implementations other mechanisms or techniques may be used to raise and lower the mast 108. For example, instead of the lift assembly 508 as described, linear motors, pneumatic, hydraulic, or other mechanisms may be used to raise and lower the mast 108.

Mast

Figure 18:
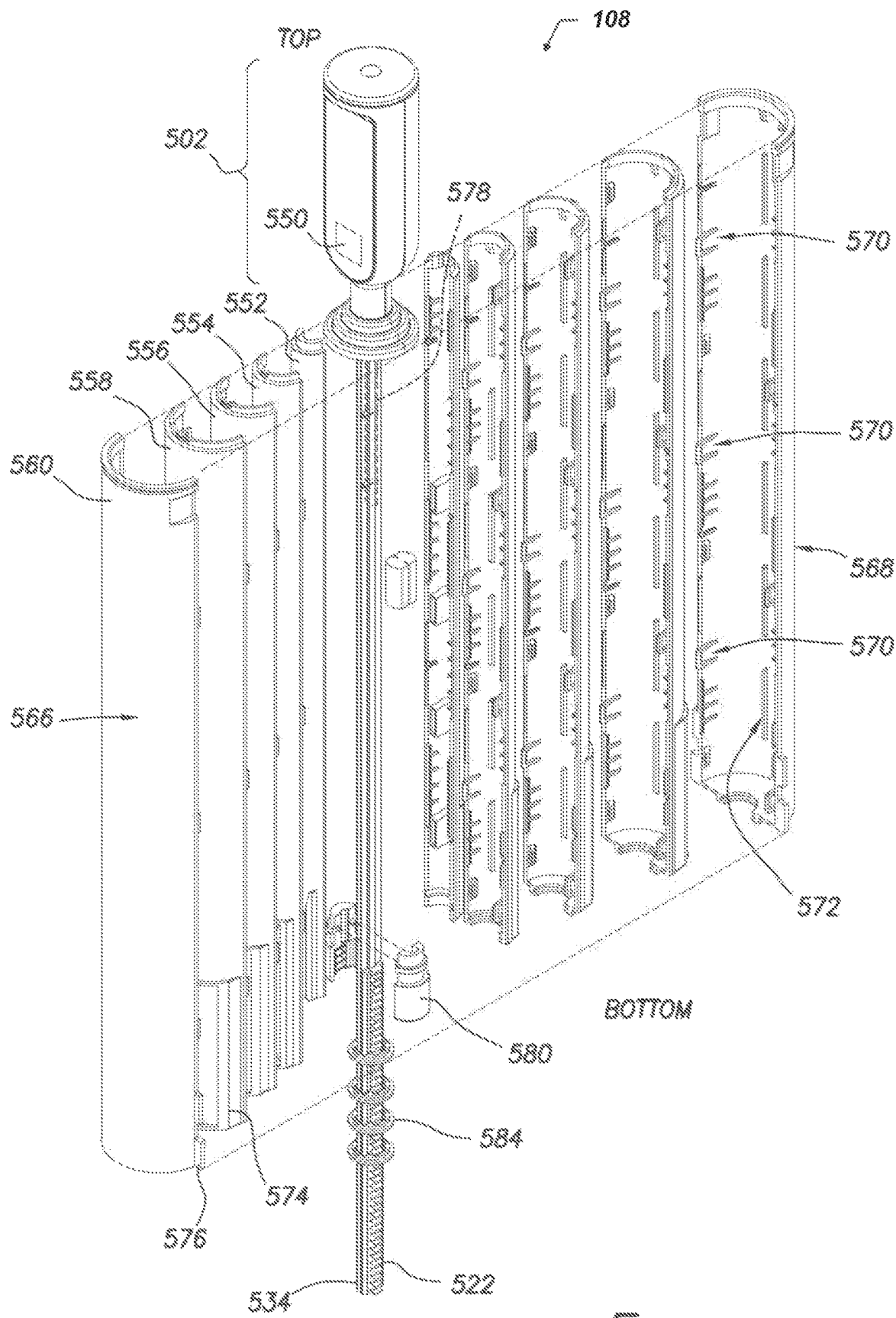
FIGS. 18-21 illustrate various views of the mast, according to some implementations.

FIG. 18 depicts an exploded view of the mast 108. Atop the mast 108 is the payload 502. For example, the payload 502 may include a sensor 550 such as a camera. As described above, the mast 108 may comprise a series of telescoping sections 506 that are nested at least partially within one another. In this illustration, the mast 108 has five sections: a first mast section 552 that is innermost, a second mast section 554, a third mast section 556, a fourth mast section 558, and a fifth mast section 560 that is outermost.

Each of the mast sections comprises two or more pieces. For example, as shown here each mast section comprises a first piece 566 and a second piece 568, each forming half of a mast section. The pieces may be joined together by one or more engagement features 570. For example, the first piece 566 may have tabs and the second piece 568 may have slots into which the tabs fit to join the two pieces. In other implementations, other techniques may be used to join the pieces of the mast sections. For example, pieces may be joined using adhesive, ultrasonic welding, mechanical fasteners, and so forth.

The pieces of the mast sections may be produced inexpensively. For example, the pieces may be injection molded. In some implementations the first piece 566 and the second piece 568 may be identical. For example, the first piece 566 and the second piece 568 of section 554 may be formed using the same injection mold.

The multi-piece construction facilitates assembly of the device 100. For example, during assembly the first piece 566 of all the mast sections may be laid out in nested order, and the cable 534 routed through the center. The mast sections may then be assembled, starting with assembling the innermost first mast section 552, then the second mast section 554, then the third mast section 556, then the fourth mast section 558, and then the fifth mast section 560. This assembly process is significantly simpler and less expensive than threading the cable 534 through the mast 108 if the mast sections were of single piece construction or previously assembled.

One or more of the mast sections may include inner guide features 572. These inner guide features 572 are positioned on an interior surface of the mast sections. The inner guide features 572 may include ridges, grooves, and so forth. The inner guide features 572 mechanically engage corresponding external guide features 574 that are present on the exterior surface of a nested mast section. The external guide features 574 may comprise ridges, grooves, and so forth. For example, the inner guide features 572 on the second mast section 554 may mechanically engage the external guide features 574 on the first mast section 552. The inner guide features 572 and the external guide features 574 operate in conjunction to maintain alignment of the mast sections during operation.

The outermost mast section 560 may omit the external guide features 574, but may include one or more rotation tabs 576 or other features. The rotation tab 576 engages at least a portion of the pan and tilt assembly 602. For example, as a portion of the pan and tilt assembly 602 rotates, a force may be applied to the rotation tab 576, rotating the mast 108 and all of the telescoping sections 506 in unison.

Also shown is a payload bracket 578. The payload bracket 578 provides a rigid interface between the innermost section 552 and a portion of the payload 502.

A flexible rack anchor 580 is shown. The flexible rack anchor 580 may comprise two pieces, as illustrated, or a single piece. The flexible rack anchor 580 mechanically engages one end of the flexible rack 522, with the other end of the flexible rack 522 within the lower spool 510. The cable 534 may pass through the flexible rack anchor 580 to the payload 502 atop the innermost section 552. The flexible rack anchor 580 is mounted to a bottom portion of the innermost section 552 and is able to rotate with respect to the innermost section 552. As force is applied to the flexible rack 522 by the motor in the lift motor assembly 514, the force is transferred to the flexible rack anchor 580 which in turn transfers the force to the innermost section 552, displacing it.

One or more aperture guides 584 are positioned at a lower aperture of one or more of the mast sections. The aperture guides 584 may maintain the flexible rack 522 and the cable 534 centered within the mast 108 as the mast 108 extends and retracts. The aperture guides 584 are able to rotate about a longitudinal axis of the mast 108.

Figure 19:
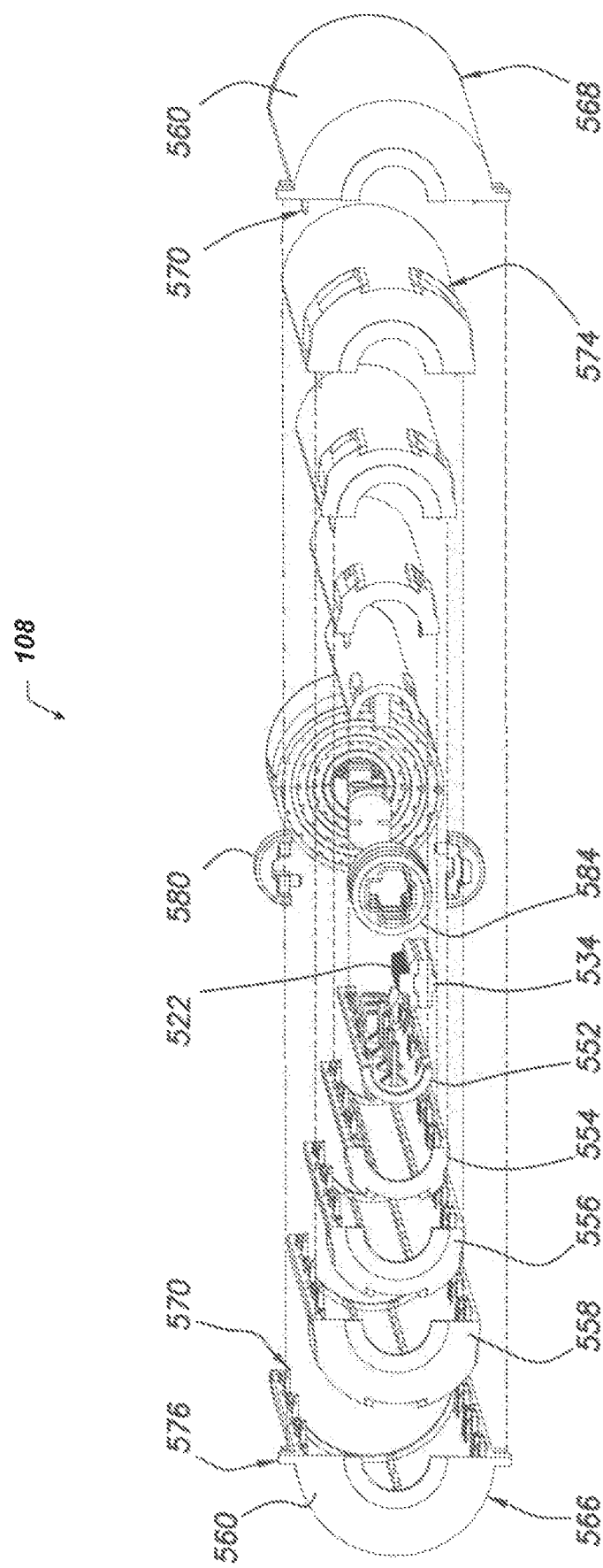

FIG. 19 illustrates another exploded view of the mast 108. In this view, the first piece 566 and second piece 568 for each of the mast sections 552, 554, 556, 558, and 560 are shown. While the mast 108 is depicted as having five mast sections, it is understood that other numbers of mast sections may be used.

Figure 20:
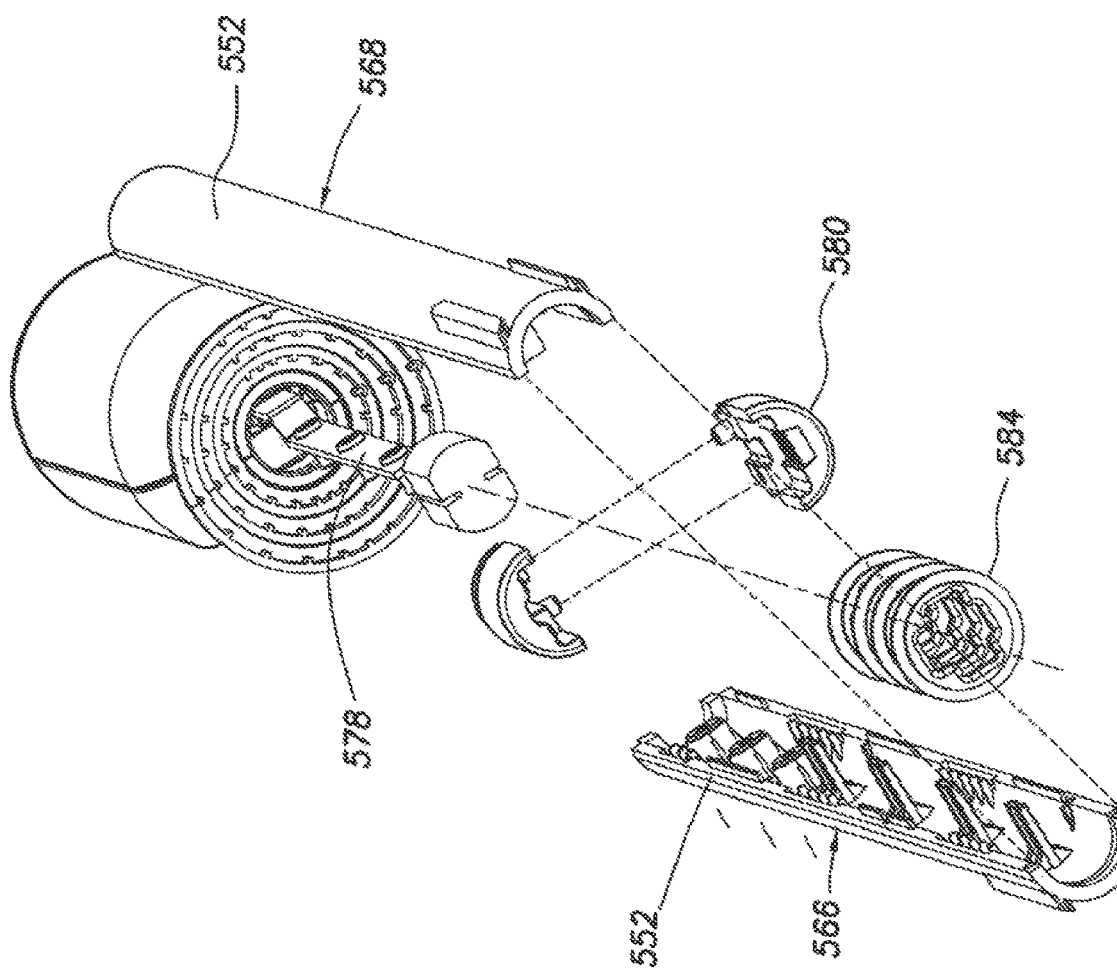

FIG. 20 illustrates another view of the innermost mast section 552.

Figure 21:
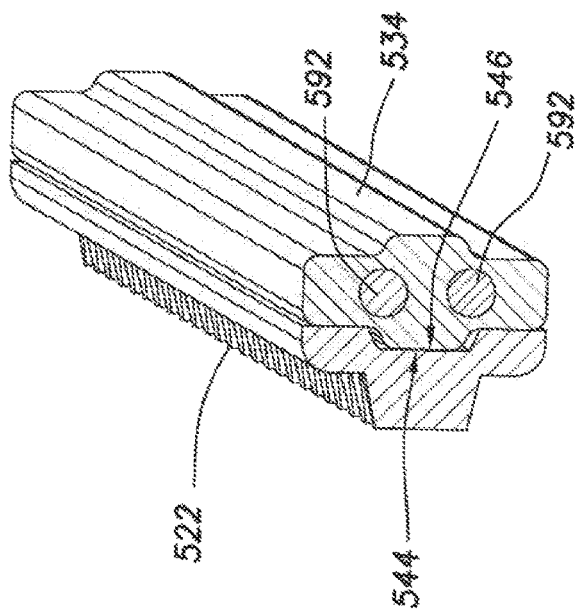

FIG. 21 illustrates a view of the flexible rack 522 and the cable 534 as mated by the lift assembly 508. A first side of the flexible rack 522 may comprise a plurality of teeth or other engagement features. A second side of the flexible rack 522 may comprise a feature 544 that extends longitudinally along the length of at least a portion of the flexible rack 522. For example, the feature 544 may comprise a trough that runs lengthwise along the flexible rack 522.

A first side of the cable 534 may have a shape that includes a feature 546 that is complementary to the feature 544 on the flexible rack 522. For example, the first side of the cable 534 may include a ridge feature 546 that extends longitudinally along the length of at least a portion of the cable 534 and mates to the trough feature 544 of the flexible rack 522. These features 544 and 546 may prevent the flexible rack 522 and the cable 534 from moving in a direction perpendicular to their length. Within the cable 534 are depicted a pair of coaxial cables 592. These coaxial cables 592 may be contained within a flexible plastic extrusion which forms the cable 534. In other implementations the cable 534 may comprise wires, optical fibers, hoses, and so forth.

Pan and Tilt Assembly

FIGS. 22-23 illustrate views of a pan and tilt assembly 602 that pans the mast 108 and tower 106 and drives a tilt mechanism of the display assembly 110, according to some implementations.

FIG. 22 shows a perspective view of the pan and tilt assembly 602. The pan and tilt assembly 602 may comprise a housing with one or more pieces. As shown here, the housing comprises two parts, a bottom housing 604 and a top housing 606 that are joined together. The bottom housing 604 and the top housing 606 remain stationary with respect to the main body 102. Within the housing is a center structure 608. The center structure 608 rotates with respect to the housing about a single axis. A top slipring 610 is at a top of the center structure 608. The top slipring 610 comprises one or more engagement features that mate with a bottom of the tower 106.

A tilt motor assembly 612 is affixed to the center structure 608. The tilt motor assembly 612 may be affixed proximate to the top of the center structure 608, as shown here. The tilt motor assembly 612 may comprise a first motor, gearbox, or other components. The tilt motor assembly 612 is connected to and drives a coupler 614 that is proximate to the top of the center structure 608. For example, the coupler 614 may be located on the top slipring 610.

As the first motor within the tilt motor assembly 612 operates, the coupler 614 rotates. The axis of rotation of the coupler 614 may be parallel to the axis of rotation of the center structure 608. In some implementations, the coupler 614 may comprise a jaw coupling, with two or more arms. An intermediate piece, such as an elastomeric "spider", may be placed between the coupler 614 and the tower coupler 714 (shown in FIG. 25). In some implementations one or more of the features of the coupler 614, the tower coupler 714, or both may be chamfered. In other implementations, other coupling types may be used.

A pan gear 616 is attached to the center structure 608. An outer edge of the pan gear 616 may be an arc. A first portion of that arc may have a plurality of teeth while a second portion of the arc has a plurality of markings. The second portion of the pan gear 616 is visible in FIG. 22 while the first portion is visible in FIG. 23.

A pan sensor assembly 618 may be affixed to the bottom housing 604. The pan sensor assembly 618 includes a sensor with a field of view that includes at least part of the second portion of the pan gear 616. In one implementation, the sensor may comprise an optoelectronic sensor. The sensor is able to detect the markings on the second portion of the pan gear 616 and provide data indicative of that output.

The markings on the pan gear 616 may be embossed, etched, printed, and so forth. The markings may be used to provide an absolute position, such as the angular position of the pan gear 616 with respect to the sensor. For example, the markings may implement at least a portion of a Gray code that provides information as to the absolute rotational position. In other implementations the markings may indicate specific intervals, such as indicative of a separate marking for every degree of rotation. In some implementations several different markings may be utilized. For example, a first mark may be indicative of a particular coarse angular position, such as "left of center" or "right of center" while a set of additional marks may designate individual degrees. The pan sensor assembly 618 may include one or more sensors that detect these marks. The first mark may be used to determine coarse position, such as the center structure 608 being "left of center", while the set of additional marks may be used to monitor and control actual rotation.

Continuing the example above, the first mark may comprise a black mark on the pan gear 616 that extends in an arc for the portion of the pan gear 616 that corresponds to a pan position that is left of center. A first sensor within the pan sensor assembly 618 may be configured to detect this first mark. The second mark may comprise a series of radial lines indicative of arc segments. A second sensor within the pan sensor assembly 618 may be configured to detect these second marks. Output from the first sensor is used to determine if the pan gear 616, and thus the center structure 608 is oriented within a particular portion of the arc, such as left of center. Based on the output, the pan motor assembly 630 may operate to drive the pan gear 616 and center structure 608 towards the center. When the first sensor determines a transition from black to not-black, the device 100 is able to determine that the center point has been reached and stop movement. The pan motor assembly 630 may then operate to drive the pan gear 616 back towards the center.

In another implementation, instead of or in addition to the use of an optoelectronic sensor, a magnet may be affixed to the center structure 608 or the pan gear 616. A magnetic sensor, such as a hall effect transistor, may provide information such as relative or absolute position of the center structure 608 with respect to the housing. For example, as the magnet moves, the relative orientation of the magnetic field and the magnetic field strength may be detected by a magnetometer and the output may be used to determine the absolute position of the center structure 608. Other arrangements of a magnet, magnetic sensor, and so forth may be used, as well as other types of sensors. For example, electrically conductive traces along a portion of an exterior of the center structure 608 may be in contact with spring contacts on the housing. The presence or absence of the trace may be used to determine the position of the center structure 608 with respect to the bottom housing 604.

FIG. 23 shows another view of the pan and tilt assembly 602 from a different direction. In this view the plurality of teeth on the first portion of the pan gear 616 is visible. Also shown is a pan motor assembly 630. The pan motor assembly 630 is affixed to the bottom housing 604. The pan motor assembly 630 may comprise a second motor that may drive a gear that is in contact with at least a portion of the plurality of teeth of the pan gear 616. As the second motor rotates, the pan gear 616 is moved, rotating the center structure 608.

Because the tilt motor assembly 612 that drives the tilt mechanism moves with the center structure 608, the pan and tilt motions may be performed independently of one another. For example, the device 100 may tilt the display assembly 110 without panning the tower 106, or pan the tower 106 without tilting the display assembly 110, or may tilt the display assembly 110 and pan the tower 106 simultaneously.

Display Assembly Tilt Mechanism

FIGS. 24-27 illustrate views of the tower 106 and the hinges that join the tower 106 to the display assembly 110, and the tilt mechanism, according to some implementations.

FIG. 24 shows a front view of the tower 106. The tower 106 has a top end and a bottom end. Proximate to the top end of the tower 106 are buttons 702. The right hinge 704 and the left hinge 706 are shown. Also shown is a display assembly shaft 708 that extends from a body of the tower 106. One or more of the right hinge 704 or the left hinge 706 may comprise friction hinges. Each friction hinge may include a first portion and a second portion. The first portion may be affixed to a frame of the display assembly 110 while the second portion engages the display assembly shaft 708. In some implementations one or more of the right hinge 704 or the left hinge 706 may comprise asymmetric friction hinges. The hinges may be asymmetric in that rotation between the first portion and the display assembly shaft 708 requires a first force in a first direction and a second force in a second direction, wherein the first force is greater than the second force. In one implementation the second portion of the friction hinge may comprise a piece of sheet metal that wraps around at least a portion of the display assembly shaft 708 when installed. While a pair of hinges are depicted, in other implementations a single hinge or more than two hinges may be used.

Also shown is a portion of a display assembly cable 710. The display assembly cable 710 provides one or more of electrical power, data transfer, signal transfer, and so forth between the electronics in the display assembly 110 and the electronics in the main body 102. For example, the display assembly cable 710 may comprise a coaxial cable, flexible printed circuit, and so forth.

The bottom end of the tower 106 may include one or more engagement features 712. These engagement features 712 mechanically engage the engagement features on the top of the top slipring 610 of the pan and tilt assembly 602. Once engaged, the tower 106 rotates in unison with the center structure 608 of the pan and tilt assembly 602.

The bottom end of the tower 106 also includes a coupler 714. The coupler 714 engages the coupler 614 on the top slipring 610 of the pan and tilt assembly 602.

FIG. 25 shows a side view of the tower 106 with the exterior cover removed, revealing the tower structure. The tower structure may comprise one or more pieces. For example, the tower structure may include a front structure 722, a rear structure 724, and an upper structure 726. These structures may be affixed to one another to form the tower structure.

A worm shaft 732 is mechanically engaged to, and extends from, the coupler 714 at the bottom of the tower structure up to a worm 742 (shown in FIG. 27) that is in a worm bracket 744 (shown in FIG. 27) located in the upper structure 726. A worm shaft support 734 is affixed to the front structure 722 and maintains alignment of the worm shaft 732. When assembled, as the tilt motor assembly 612 in the pan and tilt assembly 602 drives the coupler 614, the coupler 614 in turn drives the coupler 714 in the tower 106. The coupler 714 in turn drives the worm shaft 732, which rotates the worm 742 in the worm bracket 744.

Figure 26:
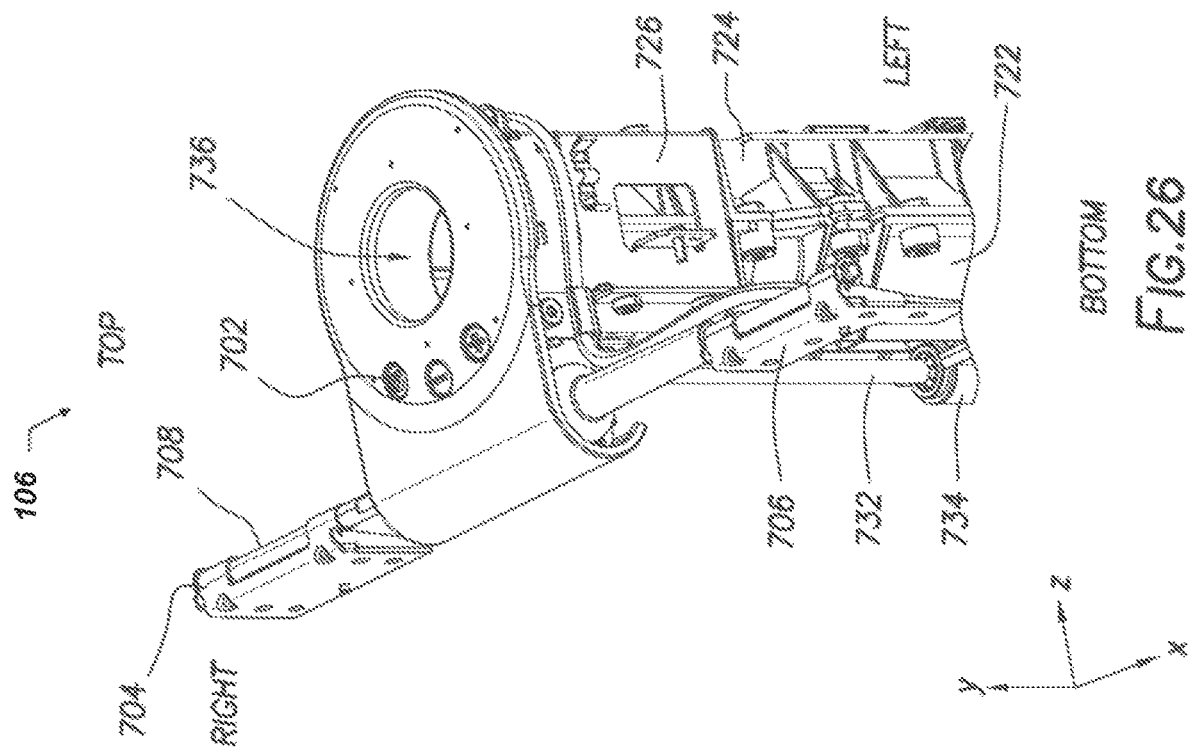

FIG. 26 shows a perspective view of the tower 106 with the outer cover of the shaft removed. In this view the worm shaft 732 and the worm shaft support 734 are visible. A mast bore 736 is shown within the tower 106. When the device 100 is assembled, at least a portion of the mast 108 extends through the mast bore 736.

Figure 27:
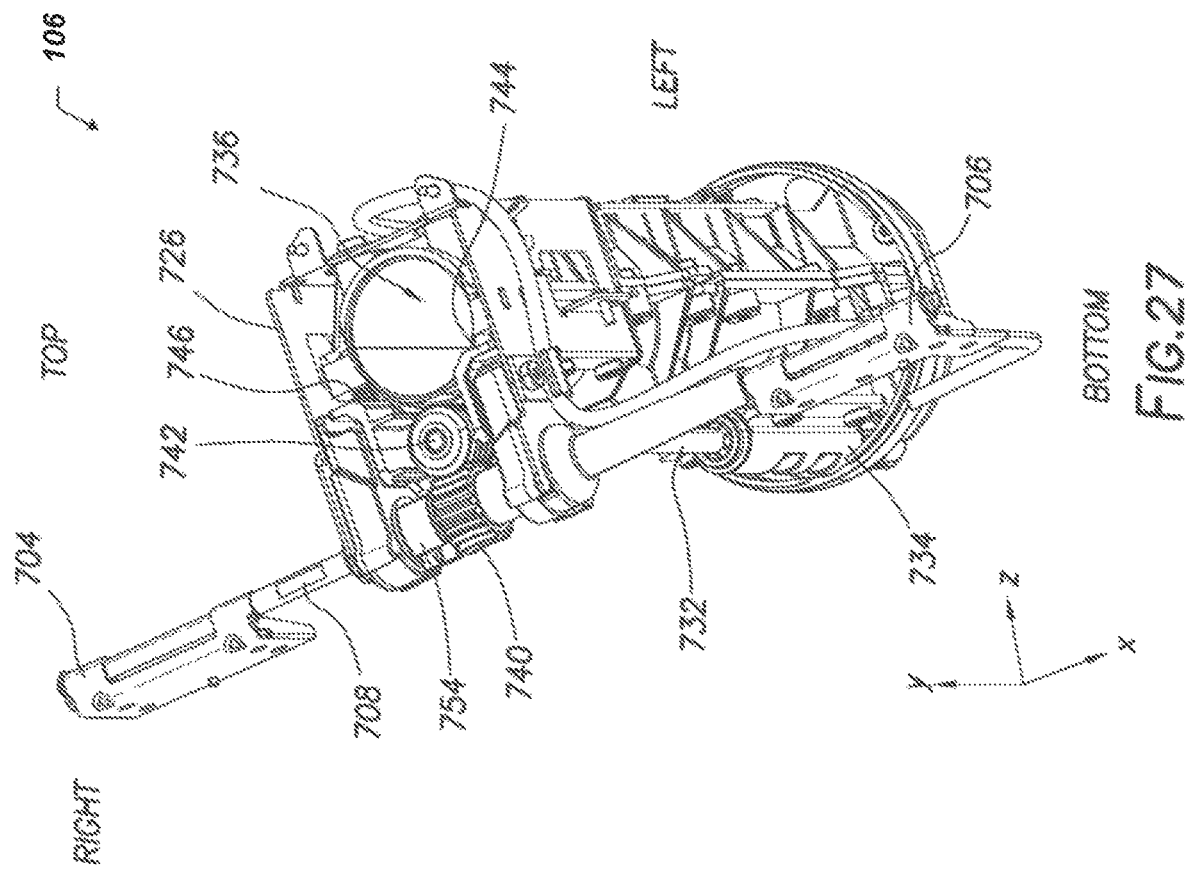

FIG. 27 shows a perspective view of the tower 106 with all outer covers removed. In this view the worm bracket 744 is visible. Retained within the worm bracket 744 is the worm 742 that is driven by rotation of the worm shaft 732. Engagement features, such as teeth or grooves on the worm 742 mechanically engage corresponding features on a worm gear 740.

The display assembly shaft 708 has a long axis that is perpendicular to a rotational axis of the worm 742. The worm gear 740 is affixed to the display assembly shaft 708, such that the two rotate in unison. As the worm 742 turns when driven ultimately by the tilt motor assembly 612 in the pan and tilt assembly 602, the worm gear 740 turns as well, rotating the display assembly shaft 708.

The worm bracket 744 may be configured to move perpendicularly with respect to the worm gear 740. One or more springs 746 may apply a force that biases the worm bracket 744 toward the worm gear 740. In some implementations one or more compound wave springs may be used to provide the force. This biasing may improve operation and increase usable life by maintaining engagement between the worm 742 and the worm gear 740 as one or both undergo wear. The biasing also assists in maintaining constant torque. Undesirable chatter may also be reduced. Use of the one or more springs 746 also allows the use of a less precise worm gear 740 and worm 742. This may reduce the overall cost to produce the device 100, while still providing the desired functionality and reliability.

In other implementations the biasing force may be provided by other mechanisms. For example, elastomeric members, magnets, and so forth may be used to provide the biasing force.

One or more rotation encoders may be used to determine the tilt of the display assembly 110 with respect to the upper structure 726. For example, an encoder magnet 754 may be affixed to a bushing that rotates around, but independently of, the display assembly shaft 708. The encoder magnet 754 may be rotated under the influence of one or more features that extend from the display assembly 110. A magnetic sensor on the upper structure 726 that is proximate to the display assembly shaft 708 may be used to detect the magnetic field from the encoder magnet 754 and provide data indicative of tilt of the display assembly 110 relative to upper structure 726. In other implementations other types of position sensing may be used instead of or in addition to the encoder magnet 754.

The arrangement used to drive the display assembly shaft 708 allows the user to manually re-position the display assembly 110 without damaging the worm gear 740, worm 742, worm shaft 732, tilt motor assembly 612, and so forth. The external force, such as provided by a user to tilt the display assembly 110, causes the friction hinges to slip and rotate with respect to the display assembly shaft 708 while applying minimal torque to the display assembly shaft 708, the worm gear 740, or the worm 742 that is engaged by the worm gear 740. By using this arrangement reliability and compatibility with user interactions is improved, and the potential for damage due to mechanical backdriving of the tilt mechanism is eliminated.

Additional Elements

Figure 28:
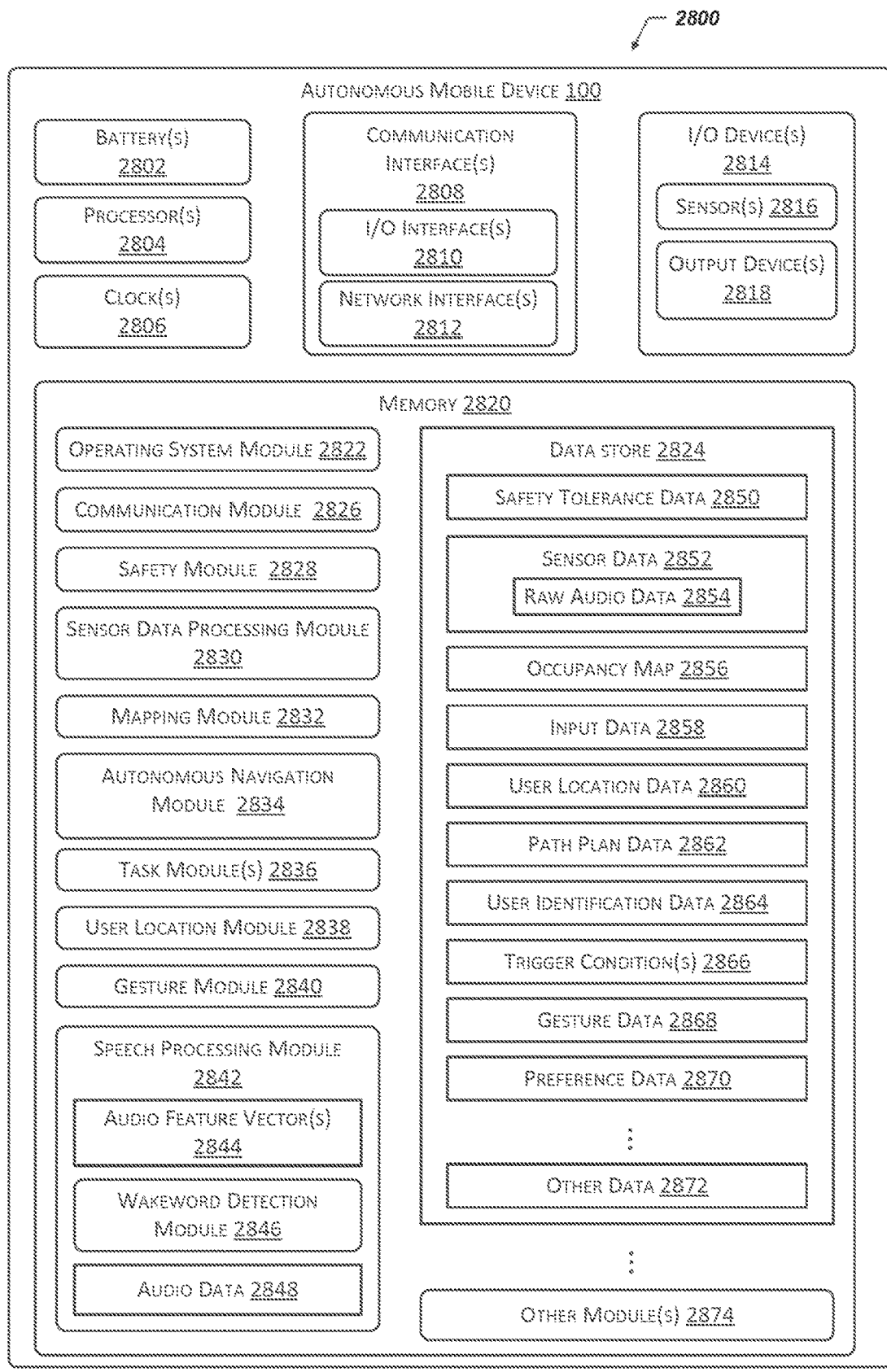
FIG. 28 is a block diagram of the components of the autonomous mobile device, according to some implementations.

FIG. 28 is a block diagram 2800 of the device 100, according to some implementations. The device 100 may include one or more batteries 2802 to provide electrical power suitable for operating the components in the device 100. In some implementations other devices may be used to provide electrical power to the device 100. For example, power may be provided by wireless power transfer, capacitors, fuel cells, storage flywheels, and so forth.

The device 100 may include one or more hardware processors 2804 (processors) configured to execute one or more stored instructions. The processors 2804 may comprise one or more cores. The processors 2804 may include microcontrollers, systems on a chip, field programmable gate arrays, digital signal processors, graphic processing units, general processing units, and so forth. One or more clocks 2806 may provide information indicative of date, time, ticks, and so forth. For example, the processor 2804 may use data from the clock 2806 to associate a particular interaction with a particular point in time.

The device 100 may include one or more communication interfaces 2808 such as input/output (I/O) interfaces 2810, network interfaces 2812, and so forth. The communication interfaces 2808 enable the device 100, or components thereof, to communicate with other devices or components. The communication interfaces 2808 may include one or more I/O interfaces 2810. The I/O interfaces 2810 may comprise Inter-Integrated Circuit (I2C), Serial Peripheral Interface (SPI), Universal Serial Bus (USB) as promulgated by the USB Implementers Forum, RS-232, and so forth.

The I/O interface(s) 2810 may couple to one or more I/O devices 2814. The I/O devices 2814 may include input devices such as one or more of a sensor 2816, keyboard, mouse, scanner, and so forth. The I/O devices 2814 may also include output devices 2818 such as one or more of a motor, light, speaker, display, projector, printer, and so forth. In some embodiments, the I/O devices 2814 may be physically incorporated with the device 100 or may be externally placed.

The network interfaces 2812 may be configured to provide communications between the device 100 and other devices such as other devices 100, a docking station, routers, access points, and so forth. The network interfaces 2812 may include devices configured to couple to personal area networks (PANS), local area networks (LANs), wireless local area networks (WLANS), wide area networks (WANs), and so forth. For example, the network interfaces 2812 may include devices compatible with Ethernet, Wi-Fi, Bluetooth, Bluetooth Low Energy, ZigBee, and so forth.

The device 100 may use the network interfaces 2812 to connect to a network. For example, the network may comprise a wireless local area network, that in turn is connected to a wide area network such as the Internet.

The device 100 may also include one or more buses or other internal communications hardware or software that allow for the transfer of data between the various modules and components of the device 100.

As shown in FIG. 28, the device 100 includes one or more memories 2820. The memory 2820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 2820 provides storage of computer-readable instructions, data structures, program modules, and other data for the operation of the device 100. A few example functional modules are shown stored in the memory 2820, although the same functionality may alternatively be implemented in hardware, firmware, or as a system on a chip (SoC).

The memory 2820 may include at least one operating system (OS) module 2822. The OS module 2822 is configured to manage hardware resource devices such as the I/O interfaces 2810, the I/O devices 2814, the communication interfaces 2808, and provide various services to applications or modules executing on the processors 2804. The OS module 2822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 2820 may be a data store 2824 and one or more of the following modules. These modules may be executed as foreground applications, background tasks, daemons, and so forth. The data store 2824 may use a flat file, database, linked list, tree, executable code, script, or other data structure to store information. In some implementations, the data store 2824 or a portion of the data store 2824 may be distributed across one or more other devices including other devices 100, servers, network attached storage devices, and so forth.

A communication module 2826 may be configured to establish communication with other devices 100, an external server, a docking station, and so forth. The communications may be authenticated, encrypted, and so forth.

Other modules within the memory 2820 may include a safety module 2828, a sensor data processing module 2830, a mapping module 2832, an autonomous navigation module 2834, a path planning module, one or more task modules 2836, a user location module 2838, a gesture module 2840, a speech processing module 2842, or other modules 2874. The modules may access data stored within the data store 2824, such as safety tolerance data 2850, sensor data 2852, or other data 2872.

The safety module 2828 may access safety tolerance data 2850 to determine within what tolerances the device 100 may operate safely within the physical environment. For example, the safety module 2828 may be configured to stop the device 100 from moving when the extensible mast 108 is extended. In another example, the safety tolerance data 2850 may specify a minimum sound threshold which, when exceeded, stops all movement of the device 100. Continuing this example, detection of sound such as a human yell would stop the device 100. In another example, the safety module 2828 may access safety tolerance data 2850 that specifies a minimum distance from an object that the device 100 is to maintain. Continuing this example, when a sensor 2816 detects an object has approached to less than the minimum distance, all movement of the device 100 may be stopped. Movement of the device 100 may be stopped by one or more of inhibiting operations of one or more of the motors, issuing a command to stop motor operation, disconnecting power from one or more of the motors, and so forth. The safety module 2828 may be implemented as hardware, software, or a combination thereof.

The safety module 2828 may control other factors, such as a maximum speed of the device 100 based on information obtained by the sensors 2816, precision and accuracy of the sensor data 2852, and so forth. For example, detection of an object by an optical sensor may include some error, such as when the distance to an object comprises a weighted average between an object and a background. As a result, the maximum speed permitted by the safety module 2828 may be based on one or more factors such as the weight of the device 100, nature of the floor, distance to the object, and so forth. In the event that the maximum permissible speed differs from the maximum speed permitted by the safety module 2828, the lesser speed may be utilized.

The sensor data processing module 2830 may access sensor data 2852 that is acquired from one or more the sensors 2816. The sensor data processing module 2830 may provide various processing functions such as de-noising, filtering, change detection, and so forth. Processing of sensor data 2852, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 2852. In still another implementation, functions such as those in the Machine Vision Toolbox (MVTB) available using MAT-LAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 2852 or other data 2872. For example, the ANN may be a trained using a supervised learning algorithm such that object identifiers are associated with images of particular objects within training images provided to the ANN. Once trained, the ANN may be provided with the sensor data 2852 and produce output indicative of the object identifier.

The autonomous navigation module 2834 provides the device 100 with the ability to navigate within the physical environment without real-time human interaction. The autonomous navigation module 2834 may implement, or operate in conjunction with, the mapping module 2832 to determine the occupancy map 2856 or other representation of the physical environment. In one implementation, the mapping module 2832 may use one or more simultaneous localization and mapping ("SLAM") techniques. The SLAM algorithms may utilize one or more of maps, algorithms, beacons, or other techniques to provide navigational data. The navigational data may then be used to determine the path plan data 2862 which is then subsequently used to determine a set of commands that drive the motors connected to the wheels 302. For example, the autonomous navigation module 2834 may determine a location within the environment, estimate a path to the destination, and so forth.

A path planning module may be part of, or operate in conjunction with, the autonomous navigation module 2834. During operation, the autonomous navigation module 2834 may use the occupancy map 2856, the user location data 2860, the gesture data 2868, preference data 2870, and so forth to determine path plan data 2862. For example, the autonomous navigation module 2834 may determine a current location of the device 100 and determine an overall course that the device 100 is to follow to perform a task, while the path planning module handles a portion of that course that is proximate to the device 100. Continuing the example, the path planning module may be used to determine a course from the device's 100 current location to a first waypoint elsewhere in the room that was determined by the autonomous navigation module 2834.

The path planning module may determine path plan data 2862 at specified intervals, upon receipt of data indicative of a change, and so forth. For example, the path planning module may determine path plan data 2862 at a specified interval, such as every 200 ms, or every meter. Appearance of an obstacle may result in determination of path plan data 2862 outside of the specified interval. A user trajectory module may also determine predicted trajectory data at specified intervals, upon a change in location of the user, and so forth.

In some implementations the path planning module may generate a plurality of possible paths to a waypoint, and then score or rank those paths. A highest scoring path, deemed to be most suitable, may then be selected and used as the path plan data 2862. For example, the ranking may be based on the sum of the combined values of obstacle cost values, and so forth for the areas or cells that are traversed by the possible path. In other implementations the ranking may be based on time to arrive.

The path plan data 2862 may be subsequently used to direct the movement of the device 100. For example, the path plan data 2862 may comprise a series of control instructions that are configured to be processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the device 100 at a rate of 10.0 radians per second (rad/s) for 5 seconds and a second motor on a right side of the device 100 at a rate of 9.7 rad/s for 5 seconds.

The autonomous navigation module 2834 may include an obstacle avoidance module. For example, if an obstacle is detected along a planned path, the obstacle avoidance module may re-route the device 100 to move around the obstacle or take an alternate path.

The occupancy map 2856 may be manually or automatically determined. For example, during a learning phase the user may take the device 100 on a tour of the environment, allowing the device 100 to generate the occupancy map 2856 and associated data, such as tags designating a particular room, such as "kitchen" or "bedroom". In another example, during subsequent operation the device 100 may generate the occupancy map 2856 that is indicative of locations of obstacles such as chairs, doors, stairwells, and so forth as it moves unattended through the environment.

In some implementations, the occupancy map 2856 may include floor characterization data. The floor characterization data is indicative of one or more attributes of the floor at a particular location within the physical environment. During operation of the device 100, floor characterization data may be obtained. The floor characterization data may be utilized by one or more of the safety module 2828, the autonomous navigation module 2834, the task module 2836, or other modules 2874. For example, the floor characterization data may be used to determine if an unsafe condition occurs such as a wet floor. In another example, the floor characterization data may be used by the autonomous navigation module 2834 to assist in the determination of the current location of the device 100 within the home. For example, if the autonomous navigation module 2834 determines that the device 100 is located in the dining room, but the floor characterization data indicates that the floor is consistent with the living room, an error condition may be generated in which other techniques are used to determine the location of the device 100 or otherwise resolve the difference. For example, the device 100 may attempt to return to the docking station and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user. For example, the device 100 may use speech synthesis to ask the user "what room is this?" during a training phase. The utterance of the user may be received by a microphone array and the audio data "this is the living room" may be processed and subsequently used to generate the location designator.

The autonomous navigation module 2834 may be used to move the device 100 from a first location to a second location within the physical environment. This movement may be responsive to a determination made by an onboard processor 2804, in response to a command received via one or more communication interfaces 2808 or a sensor 2816, and so forth. For example, an external server may send a command that is subsequently received using a network interface 2812. This command may direct the device 100 to proceed to a designated destination, such as "living room" or "dining room". The device 100 may then process this command, and use the autonomous navigation module 2834 to determine the directions and distances associated with reaching the specified destination.

The memory 2820 may store one or more task modules 2836. The task modules 2836 may comprise instructions that, when executed by the processor 2804 perform a task. For example, a video call module may be used to have the device 100 find a particular user and present a video call using the output devices 2818. In another example, a sentry task module 2836 may be used to have the device 100 travel throughout the environment and generate a report as to the presence of an unauthorized person. The task module 2836 comprises instructions that, when executed, provide one or more functions associated with a particular task. A task may have triggers with corresponding gestures.

Tasks may involve a single behavior. In one example, the task may comprise a security or sentry task in which the device 100 travels throughout the physical environment avoiding users and looking for events that exceed predetermined thresholds. In the sentry task, the trigger may be detection of a user within a threshold distance while the gesture comprises performing a "nodding" motion by tilting the display assembly 110 up and down. In another example, the task may comprise a "follow me" feature in which the device 100 follows a user using a follow behavior. For example, the user may participate in a video call using the device 100. A camera on the mast 108 may be used to acquire video for transmission while the display is used to present video that is received. The device 100 may use data from one or more sensors 2816 to determine a location of the user relative to the device 100, and track and follow the user. In one implementation, computer vision techniques may be used to locate the user within image data acquired by the cameras. In another implementation, the user's voice may be detected by an array of microphones, and a direction to the voice with respect to the device 100 may be established. Other techniques may be utilized either alone or in combination to allow the device 100 to track a user, follow a user, or track and follow a user. The path of the device 100 as it follows the user may be based at least in part on one or more of constraint cost values. For example, while the device 100 is following the user down the hallway, the device 100 may stay to the right side of the hallway. In some situations, while following a user the device 100 may disregard some rules or may disregard the speed values for a particular area. For example, while following the user the device 100 may not slow down while passing a doorway.

In yet another example, the task may allow for the device 100 to be summoned to a particular location. The user may utter a voice command that is heard by a microphone on the device 100, a microphone in a smart phone, or another device with a microphone such as a network enabled speaker or television. While performing this task, the device 100 may utilize an avoid behavior until it reaches the particular location.

Alternatively, the user may issue a command using an app on a smartphone, wearable device, tablet, or other computing device. Given that the location of the device at which the command was obtained is known, the device 100 may be dispatched to that location. If the location is unknown, the device 100 may search for the particular user, utilizing an avoid behavior with respect to other users and an approach behavior for the particular user.

The user location module 2838 may provide user location data 2860 indicative of a location of a user. The user location module 2838 may use the sensor data 2852 from sensors 2816 on the device 100 or other sensors in the environment. The user location module 2838 processes the data to determine user location data 2860 indicative of a user location in the environment. The user location data 2860 may be indicative of coordinates within the environment that are indicative of a point associated with the user. For example, the user location data 2860 may indicate a centroid of the area occupied by the user with respect to a fixed coordinate system used to represent locations within the environment.

In some implementations the user location module 2838 may also process the data to determine user orientation data indicative of a user orientation in the environment. The user orientation data is indicative of a direction with respect to a fixed reference. For example, the user orientation data may be indicative of a heading as measured with respect to magnetic north, or an angle with respect to an axis of the fixed coordinate system. In some implementations the user orientation data may be indicative of an angle that extends from a reference point with respect to the user along a direction that is specified with respect to one or more features of the user. For example, the user orientation data may be based on a position of one or more of the user's head, shoulders, skeleton, feet, eyes, and so forth. In another example, the user orientation data may be based at least in part on a gaze direction of the user, that is indicative of which direction the user is looking. In one implementation the user orientation data may indicate the line that is perpendicular from a line extending through the shoulders of the user, and extending away from the user in a ventral direction. For example, if the user is standing and facing East, the user orientation data may indicate 90 degrees. In another implementation, the user orientation data may indicate the line that is perpendicular to a line extending through both eyes of the user and starts at a midpoint between the eyes.

In some implementations the user location module 2838 or other modules may provide user identification data 2864. The user identification data 2864 provides information that is indicative of a particular user. The user identification data 2864 may be indicative of a login name, account name, serial number, and so forth. For example, the user identification data 2864 may indicate that a user has been identified as "Pat" or "User994481". Determination of the user identification data 2864 may be based on one or more of facial recognition, voice recognition, user input, biometric data, and so forth. For example, the user location module 2838 may utilize a facial recognition module that determines one or more features of a face that is present in an image acquired by a camera, and compares that information to previously stored enrollment data. If the features match within a threshold value, the user identification data 2864 may be determined. In another implementation the sound of the user's voice may be used to identify the user.

During operation, the device 100 may determine input data 2858. The input data 2858 may be based at least in part on sensor data 2852 provided by the sensors 2816 onboard the device 100. For example, the sensor data 2852 may comprise audio data indicative of an utterance by the user. The audio data may be processed to determine that the utterance is representative of a verbal command provided by the user. The input data 2858 may comprise information indicative of the command, parameters associated with it, and so forth. For example, the input data 2858 may indicate a command of a request for weather information while the parameter indicates the location about which the weather information is requested.

The gesture module 2840 is configured to determine the satisfaction of one or more trigger conditions 2866. When a trigger condition 2866 has been determined to be satisfied, gesture data 2868 may be used to generate specific instructions that, when executed, cause the device 100 to perform the gesture. The gesture module 2840 may use as input the sensor data 2852, input data 2858, data associated with operation of the device 100, and so forth. For example, the gesture module 2840 may receive user location data 2860 that is based on sensor data 2852 indicating the user is within a threshold distance, satisfying a trigger condition 2866. The corresponding gesture data 2868 may be retrieved, and the instructions executed to perform a nodding behavior with the display assembly 110. In another example, the gesture module 2840 may determine that no task is in progress and interaction with the user is concluded, satisfying a trigger condition 2866. The corresponding gesture data 2868 may be retrieved, directing the device 100 to move the display assembly 110 so it is directed away from the user and then after some interval of time, the device 100 moves away.

In some implementations, the gesture module 2840 may be configured to limit performance of gestures to situations in which a user is within a threshold distance or within line of sight of the device 100. For example, if the threshold distance is 3 meters and the user is 2.5 meters from the device 100, a gesture may be performed. In another example, if no user is determined to be present, the gesture module 2840 may discontinue presentation of gestures by the device 100.

The speech processing module 2842 may be used to process utterances of the user. Microphones may acquire audio in the presence of the device 100 and may send raw audio data 2854 to an acoustic front end (AFE). The AFE may transform the raw audio data 2854 (for example, a single-channel, 16-bit audio stream sampled at 16 kHz), captured by the microphone, into audio feature vectors 2844 that may ultimately be used for processing by various components, such as a wakeword detection module 2846, speech recognition engine, or other components. The AFE may reduce noise in the raw audio data 2854. The AFE may also perform acoustic echo cancellation (AEC) or other operations to account for output audio data that may be sent to a speaker of the device 100 for output. For example, the device 100 may be playing music or other audio that is being received from a network in the form of output audio data. To avoid the output audio interfering with the device's ability to detect and process input audio, the AFE or other component may perform echo cancellation to remove the output audio data from the input raw audio data 2854, or other operations.

The AFE may divide the audio data into frames representing time intervals for which the AFE determines a number of values (i.e., features) representing qualities of the raw audio data 2854, along with a set of those values (i.e., a feature vector or audio feature vector 2844) representing features/qualities of the raw audio data 2854 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 2854, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 2844 (or the raw audio data 2854) may be input into a wakeword detection module 2846 that is configured to detect keywords spoken in the audio. The wakeword detection module 2846 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other embodiments, the device 100 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in the audio data.

Once speech is detected in the audio received by the device 100 (or separately from speech detection), the device 100 may use the wakeword detection module 2846 to perform wakeword detection to determine when a user intends to speak a command to the device 100. This process may also be referred to as keyword detection, with the wakeword being a specific example of a keyword. Specifically, keyword detection is typically performed without performing linguistic analysis, textual analysis, or semantic analysis. Instead, incoming audio (or audio data 2848) is analyzed to determine if specific characteristics of the audio match preconfigured acoustic waveforms, audio signatures, or other data to determine if the incoming audio "matches" stored audio data corresponding to a keyword.

Thus, the wakeword detection module 2846 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local device 100 may "wake" and begin transmitting audio data 2848 (which may include one or more audio feature vectors 2844 or the raw audio data 2854) to one or more server(s) for speech processing. The audio data 2848 corresponding to audio obtained by the microphone may be sent to a server for routing to a recipient device or may be sent to the server for speech processing for interpretation of the included speech (either for purposes of enabling voice-communications and/or for purposes of executing a command in the speech). The audio data 2848 may include data corresponding to the wakeword, or the portion of the audio data 2848 corresponding to the wakeword may be removed by the local device 100 prior to sending.

The device 100 may connect to the network using one or more of the network interfaces 2812. One or more servers may provide various functions, such as ASR, natural language understanding (NLU), providing content such as audio or video to the device 100, and so forth.

The other modules 2874 may provide other functionality, such as object recognition, speech synthesis, user identification, and so forth. For example, an automated speech recognition (ASR) module may accept as input raw audio data 2854 or audio feature vectors 2844 and may produce as output a text string that is further processed and used to provide input, inform a task module 2836, and so forth. In one implementation, the text string may be sent via a network to a server for further processing. The device 100 may receive a response from the server and present output, perform an action, and so forth. For example, the raw audio data 2854 may include the user saying, "robot go to the dining room". The audio data 2848 representative of this utterance may be sent to the server that returns commands directing the device 100 to the dining room of the home associated with the device 100.

The utterance may result in a response from the server that directs operation of other devices or services. For example, the user may say "robot wake me at seven tomorrow morning". The audio data 2848 may be sent to the server that determines the intent and generates commands to instruct a device attached to the network to play an alarm at 7:00 am the next day.

The other modules 2874 may comprise a speech synthesis module that is able to convert text data to human speech. For example, the speech synthesis module may be used by the device 100 to provide speech that a user is able to understand.

During operation, the device 100 may access preference data 2870. The preference data 2870 may indicate preferences associated with a particular geographic region, physical address, user, and so forth. For example, a particular user may prefer a very slight change in the movement of the display assembly 110 while performing a nodding behavior, while another user may prefer a larger range of motion to improve visibility of the gesture. In other implementations, other preferences may be specified.

The data store 2824 may store other data 2872 such as localization settings, user identifier data, and so forth.

The device 100 may be configured to dock or connect to a docking station. The docking station may also be connected to the network. For example, the docking station may be configured to connect to the wireless local area network such that the docking station and the device 100 may communicate. The docking station may provide external power which the device 100 may use to charge the battery 2802.

The device 100 may access one or more servers via the network. For example, the device 100 may utilize a wakeword detection module 2846 to determine if the user is addressing a request to the device 100. The wakeword detection module 2846 may hear a specified word or phrase and transition the device 100 or portion thereof to the wake operating mode. Once in the wake mode, the device 100 may then transfer at least a portion of the audio spoken by the user to one or more servers for further processing. The servers may process the spoken audio and return to the device 100 data that may be subsequently used to operate the device 100.

The device 100 may also communicate with other devices. The other devices may include home automation controls, sensors, and so forth that are within the home or associated with operation of one or more devices in the home. For example, the other devices may include a doorbell camera, a garage door, a refrigerator, a washing machine, a network connected microphone, and so forth. In some implementations the other devices may include other devices 100, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 29:
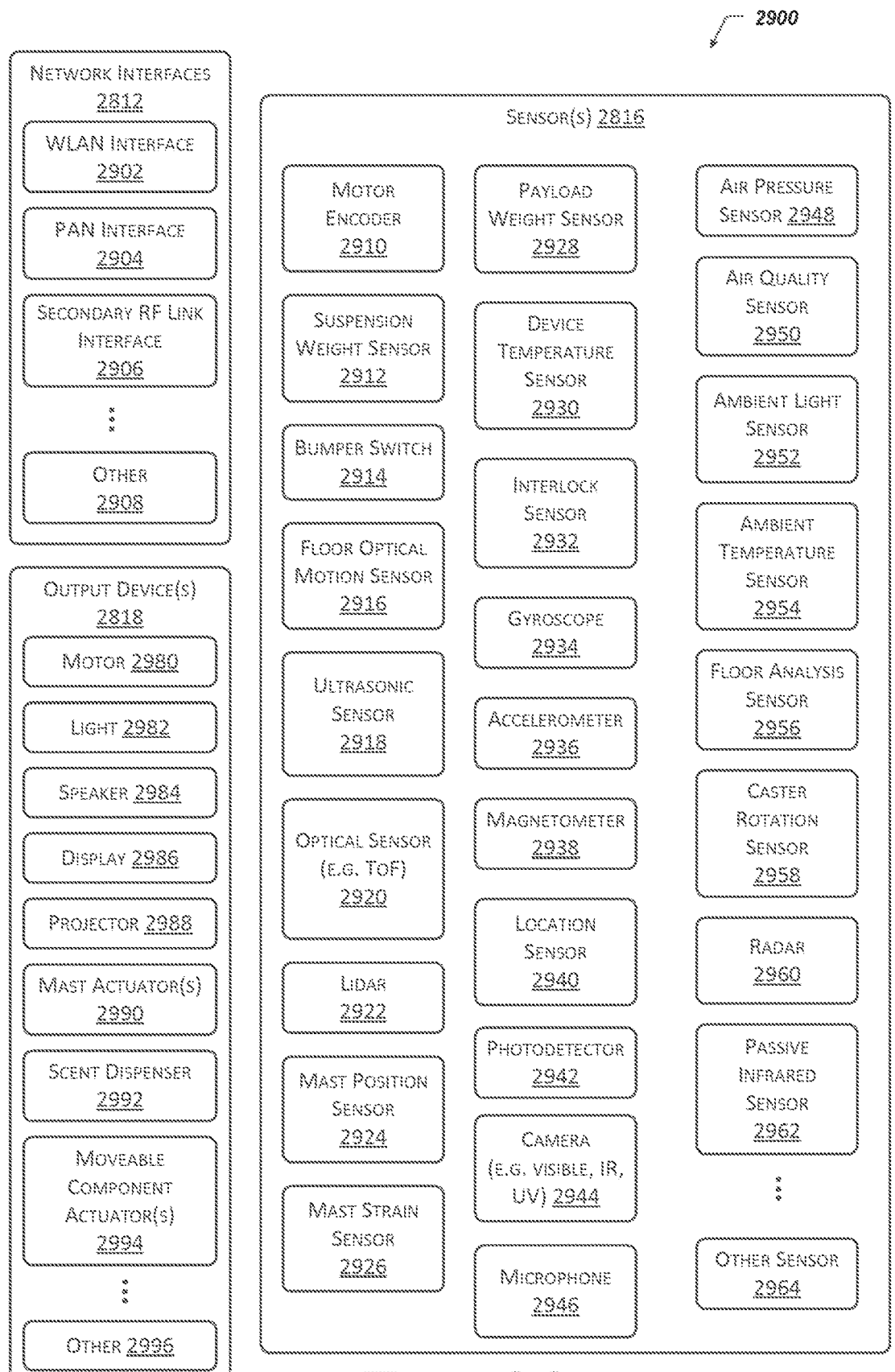
FIG. 29 is a block diagram of some components of the autonomous mobile device such as network interfaces, sensors, and output devices, according to some implementations.

FIG. 29 is a block diagram 2900 of some components of the device 100 such as network interfaces 2812, sensors 2816, and output devices 2818, according to some implementations. The components illustrated here are provided by way of illustration and not necessarily as a limitation. For example, the device 100 may utilize a subset of the particular network interfaces 2812, output devices 2818, or sensors 2816 depicted here, or may utilize components not pictured. One or more of the sensors 2816, output devices 2818, or a combination thereof may be included on a moveable component that may be panned, tilted, rotated, or any combination thereof with respect to a chassis of the device 100. The chassis of the device 100 has a front and a back. The moveable component may be attached to, and extend away from, the front of the chassis. For example, the moveable component may be attached via a support structure to a front or leading edge of the chassis or a portion thereof.

The network interfaces 2812 may include one or more of a WLAN interface 2902, PAN interface 2904, secondary radio frequency (RF) link interface 2906, or other interfaces 2908. The WLAN interface 2902 may be compliant with at least a portion of the Wi-Fi specification. For example, the WLAN interface 2902 may be compliant with at least a portion of the IEEE 802.11 specification as promulgated by the Institute of Electrical and Electronics Engineers (IEEE). The PAN interface 2904 may be compliant with at least a portion of one or more of the Bluetooth, wireless USB, Z-Wave, ZigBee, or other standards. For example, the PAN interface 2904 may be compliant with the Bluetooth Low Energy (BLE) specification.

The secondary RF link interface 2906 may comprise a radio transmitter and receiver that operate at frequencies different from or using modulation different from the other interfaces. For example, the WLAN interface 2902 may utilize frequencies in the 2.4 GHz and 5 GHz Industrial Scientific and Medicine (ISM) bands, while the PAN interface 2904 may utilize the 2.4 GHz ISM bands. The secondary RF link interface 2906 may comprise a radio transmitter that operates in the 900 MHz ISM band, within a licensed band at another frequency, and so forth. The secondary RF link interface 2906 may be utilized to provide backup communication between the device 100 and other devices in the event that communication fails using one or more of the WLAN interface 2902 or the PAN interface 2904. For example, in the event the device 100 travels to an area within the physical environment that does not have Wi-Fi coverage, the device 100 may use the secondary RF link interface 2906 to communicate with another device such as a specialized access point, docking station, or other device 100.

The other 2908 network interfaces may include other equipment to send or receive data using other wavelengths or phenomena. For example, the other 2908 network interface may include an ultrasonic transceiver used to send data as ultrasonic sounds, a visible light system that communicates by modulating a visible light source such as a light-emitting diode, and so forth. In another example, the other 2908 network interface may comprise a wireless wide area network (WWAN) interface or a wireless cellular data network interface. Continuing the example, the other 2908 network interface may be compliant with at least a portion of the 3G, 4G, 5G, LTE, or other standards.

The device 100 may include one or more of the following sensors 2816. The sensors 2816 depicted here are provided by way of illustration and not necessarily as a limitation. It is understood other sensors 2816 may be included or utilized by the device 100, while some sensors 2816 may be omitted in some configurations.

A motor encoder 2910 provides information indicative of the rotation or linear extension of a motor 2980. The motor may comprise a rotary motor, or a linear actuator. In some implementations, the motor encoder 2910 may comprise a separate assembly such as a photodiode and encoder wheel that is affixed to the motor 2980. In other implementations, the motor encoder 2910 may comprise circuitry configured to drive the motor 2980. For example, the autonomous navigation module 2834 may utilize the data from the motor encoder 2910 to estimate a distance traveled.

A suspension weight sensor 2912 provides information indicative of the weight of the device 100 on the suspension system for one or more of the main wheels 302 or the caster wheel 406. For example, the suspension weight sensor 2912 may comprise a switch, strain gauge, load cell, photodetector 2942, or other sensing element that is used to determine whether weight is applied to a particular wheel, or whether weight has been removed from the wheel. In some implementations, the suspension weight sensor 2912 may provide binary data such as a "1" value indicating that there is a weight applied to the main wheel 302, while a "0" value indicates that there is no weight applied to the main wheel 302. In other implementations, the suspension weight sensor 2912 may provide an indication such as so many kilograms of force or newtons of force. The suspension weight sensor 2912 may be affixed to one or more of the main wheels 302 or the caster wheel 406. In some situations, the safety module 2828 may use data from the suspension weight sensor 2912 to determine whether or not to inhibit operation of one or more of the motors 2980. For example, if the suspension weight sensor 2912 indicates no weight on the suspension, the implication is that the device 100 is no longer resting on its wheels, and thus operation of the motors 2980 may be inhibited. In another example, if the suspension weight sensor 2912 indicates weight that exceeds a threshold value, the implication is that something heavy is resting on the device 100 and thus operation of the motors 2980 may be inhibited.

One or more bumper switches 2914 provide an indication of physical contact between a bumper or other member that is in mechanical contact with the bumper switch 2914. The safety module 2828 utilizes sensor data 2852 obtained by the bumper switches 2914 to modify the operation of the device 100. For example, if the bumper switch 2914 associated with the front of the device 100 is triggered, the safety module 2828 may drive the device 100 backwards.

A floor optical motion sensor (FOMS) 2916 provides information indicative of motions of the device 100 relative to the floor or other surface underneath the device 100. In one implementation, the FOMS 2916 may comprise a light source such as a light-emitting diode (LED), an array of photodiodes, and so forth. In some implementations, the FOMS 2916 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 2916 may provide other information, such as data indicative of a pattern present on the floor, composition of the floor, color of the floor, and so forth. For example, the FOMS 2916 may utilize an optoelectronic sensor that may detect different colors or shades of gray, and this data may be used to generate floor characterization data.

An ultrasonic sensor 2918 utilizes sounds in excess of 20 kHz to determine a distance from the sensor 2816 to an object. The ultrasonic sensor 2918 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 2918 may provide information indicative of a presence of an object, distance to the object, and so forth. Two or more ultrasonic sensors 2918 may be utilized in conjunction with one another to determine a location within a two-dimensional plane of the object.

In some implementations, the ultrasonic sensor 2918 or portion thereof may be used to provide other functionality. For example, the emitter of the ultrasonic sensor 2918 may be used to transmit data and the detector may be used to receive data transmitted that is ultrasonic sound. In another example, the emitter of an ultrasonic sensor 2918 may be set to a particular frequency and used to generate a particular waveform such as a sawtooth pattern to provide a signal that is audible to an animal, such as a dog or a cat.

An optical sensor 2920 may provide sensor data 2852 indicative of one or more of a presence or absence of an object, a distance to the object, or characteristics of the object. The optical sensor 2920 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 2920 may utilize one or more sensing elements. For example, the optical sensor 2920 may comprise a 4×4 array of light sensing elements. Each individual sensing element may be associated with a field of view (FOV) that is directed in a different way. For example, the optical sensor 2920 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 2816 such as an image sensor or camera 2944. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 2920 may operate as a depth camera, providing a two-dimensional image of a scene, as well as data that indicates a distance to each pixel.

Data from the optical sensors 2920 may be utilized for collision avoidance. For example, the safety module 2828 and the autonomous navigation module 2834 may utilize the sensor data 2852 indicative of the distance to an object in order to prevent a collision with that object.

Multiple optical sensors 2920 may be operated such that their FOV overlap at least partially. To minimize or eliminate interference, the optical sensors 2920 may selectively control one or more of the timing, modulation, or frequency of the light emitted. For example, a first optical sensor 2920 may emit light modulated at 290 kHz while a second optical sensor 2920 emits light modulated at 293 kHz.

A lidar 2922 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 2852 may be generated that is indicative of the presence of objects and the relative positions, shapes, and so forth is visible to the lidar 2922. Data from the lidar 2922 may be used by various modules. For example, the autonomous navigation module 2834 may utilize point cloud data generated by the lidar 2922 for localization of the device 100 within the physical environment.

A mast position sensor 2924 provides information indicative of a position of the mast 108. For example, the mast position sensor 2924 may comprise limit switches associated with the mast extension mechanism that indicate whether the mast 108 is in an extended or retracted position. In other implementations, the mast position sensor 2924 may comprise an optical code on at least a portion of the mast 108 that is then interrogated by an optical emitter and a photodetector 2942 to determine the distance to which the mast 108 is extended. In another implementation, the mast position sensor 2924 may comprise an encoder wheel that is attached to a mast motor that is used to raise or lower the mast 108. The mast position sensor 2924 may provide data to the safety module 2828. For example, if the device 100 is preparing to move, data from the mast position sensor 2924 may be checked to determine if the mast 108 is retracted, and if not, the mast 108 may be retracted prior to beginning movement.

A mast strain sensor 2926 provides information indicative of a strain on the mast 108 with respect to the remainder of the device 100. For example, the mast strain sensor 2926 may comprise a strain gauge or load cell that measures a side-load applied to the mast 108 or a weight on the mast 108 or downward pressure on the mast 108. The safety module 2828 may utilize sensor data 2852 obtained by the mast strain sensor 2926. For example, if the strain applied to the mast 108 exceeds a threshold amount, the safety module 2828 may direct an audible and visible alarm to be presented by the device 100.

A payload weight sensor 2928 provides information indicative of the weight associated with the modular payload bay 104. The payload weight sensor 2928 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 2928 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 2928 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 2828 may utilize the payload weight sensor 2928 to determine if the modular payload bay 104 has been overloaded. If so, an alert or notification may be issued.

One or more device temperature sensors 2930 may be utilized by the device 100. The device temperature sensors 2930 provide temperature data of one or more components within the device 100. For example, a device temperature sensor 2930 may indicate a temperature of one or more of the batteries 2802, one or more motors 2980, and so forth. In the event the temperature exceeds a threshold value, the component associated with that device temperature sensor 2930 may be shut down.

One or more interlock sensors 2932 may provide data to the safety module 2828 or other circuitry that prevents the device 100 from operating in an unsafe condition. For example, the interlock sensors 2932 may comprise switches that indicate whether an access panel is open. The interlock sensors 2932 may be configured to inhibit operation of the device 100 until the interlock switch indicates a safe condition is present.

A gyroscope 2934 may provide information indicative of rotation of an object affixed thereto. For example, the gyroscope 2934 may generate sensor data 2852 that is indicative of a change in orientation of the device 100 or portion thereof.

An accelerometer 2936 provides information indicative of a direction and magnitude of an imposed acceleration. Data such as rate of change, determination of changes in direction, speed, and so forth may be determined using the accelerometer 2936. The accelerometer 2936 may comprise mechanical, optical, micro-electromechanical, or other devices. For example, the gyroscope 2934 in the accelerometer 2936 may comprise a prepackaged solid-state inertial measurement unit (IMU) that provides multiple axis gyroscopes 2934 and accelerometers 2936.

A magnetometer 2938 may be used to determine an orientation by measuring ambient magnetic fields, such as the terrestrial magnetic field. For example, the magnetometer 2938 may comprise a Hall effect transistor that provides output compass data indicative of a magnetic heading.

The device 100 may include one or more location sensors 2940. The location sensors 2940 may comprise an optical, radio, or other navigational system such as a global positioning system (GPS) receiver. For indoor operation, the location sensors 2940 may comprise indoor position systems, such as using Wi-Fi Positioning Systems (WPS). The location sensors 2940 may provide information indicative of a relative location, such as "living room" or an absolute location such as particular coordinates indicative of latitude and longitude, or displacement with respect to a predefined origin.

A photodetector 2942 provides sensor data 2852 indicative of impinging light. For example, the photodetector 2942 may provide data indicative of a color, intensity, duration, and so forth.

A camera 2944 generates sensor data 2852 indicative of one or more images. The camera 2944 may be configured to detect light in one or more wavelengths including, but not limited to, terahertz, infrared, visible, ultraviolet, and so forth. For example, an infrared camera 2944 may be sensitive to wavelengths between approximately 700 nanometers and 1 millimeter. The camera 2944 may comprise charge coupled devices (CCD), complementary metal oxide semiconductor (CMOS) devices, microbolometers, and so forth. The device 100 may use image data acquired by the camera 2944 for object recognition, navigation, collision avoidance, user communication, and so forth. For example, a pair of cameras 2944 sensitive to infrared light may be mounted on the front of the device 100 to provide binocular stereo vision, with the sensor data 2852 comprising images being sent to the autonomous navigation module 2834. In another example, the camera 2944 may comprise a 10 megapixel or greater camera that is used for videoconferencing or for acquiring pictures for the user.

The camera 2944 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 2944, particularly those associated with navigation or autonomous operation, may utilize a global shutter. In other implementations, the camera(s) 2944 providing images for use by the autonomous navigation module 2834 may be acquired using a rolling shutter and subsequently may be processed to mitigate image artifacts.

One or more microphones 2946 may be configured to acquire information indicative of sound present in the physical environment. In some implementations, arrays of microphones 2946 may be used. These arrays may implement beamforming techniques to provide for directionality of gain. The device 100 may use the one or more microphones 2946 to acquire information from acoustic tags, accept voice input from users, determine ambient noise level, for voice communication with another user or system, and so forth.

An air pressure sensor 2948 may provide information indicative of an ambient atmospheric pressure or changes in ambient atmospheric pressure. For example, the air pressure sensor 2948 may provide information indicative of changes in air pressure due to opening and closing of doors, weather events, and so forth.

An air quality sensor 2950 may provide information indicative of one or more attributes of the ambient atmosphere. For example, the air quality sensor 2950 may include one or more chemical sensing elements to detect the presence of carbon monoxide, carbon dioxide, ozone, and so forth. In another example, the air quality sensor 2950 may comprise one or more elements to detect particulate matter in the air, such as the photoelectric detector, ionization chamber, and so forth. In another example, the air quality sensor 2950 may include a hygrometer that provides information indicative of relative humidity.

An ambient light sensor 2952 may comprise one or more photodetectors 2942 or other light-sensitive elements that are used to determine one or more of the color, intensity, or duration of ambient lighting around the device 100.

An ambient temperature sensor 2954 provides information indicative of the temperature of the ambient environment proximate to the device 100. In some implementations, an infrared temperature sensor may be utilized to determine the temperature of another object at a distance.

A floor analysis sensor 2956 may include one or more components that are used to generate at least a portion of the floor characterization data. In one implementation, the floor analysis sensor 2956 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 2956 may be used by one or more of the safety module 2828, the autonomous navigation module 2834, the task module 2836, and so forth. For example, if the floor analysis sensor 2956 determines that the floor is wet, the safety module 2828 may decrease the speed of the device 100 and generate a notification alerting the user.

The floor analysis sensor 2956 may include other components as well. For example, a coefficient of friction sensor may comprise a probe that comes into contact with the surface of the floor and determines the coefficient of friction between the probe and the floor.

A caster rotation sensor 2958 provides data indicative of one or more of a direction of orientation, angular velocity, linear speed of the caster wheel 406, and so forth. For example, the caster rotation sensor 2958 may comprise an optical encoder and corresponding target that is able to determine that the caster assembly 402 transitioned from an angle of 0° at a first time to 49° at a second time.

The sensors 2816 may include a radar 2960. The radar 2960 may be used to provide information as to a distance, lateral position, and so forth, to an object.

The sensors 2816 may include a passive infrared (PIR) sensor 2962. The PIR sensor 2962 may be used to detect the presence of people, pets, hotspots, and so forth. For example, the PIR sensor 2962 may be configured to detect infrared radiation with wavelengths between 8 and 14 micrometers.

The device 100 may include other sensors 2964 as well. For example, a capacitive proximity sensor may be used to provide proximity data to adjacent objects. Other sensors 2964 may include radio frequency identification (RFID) readers, near field communication (NFC) systems, a coded aperture camera, and so forth. For example, NFC tags may be placed at various points within the physical environment to provide landmarks for the autonomous navigation module 2834. One or more touch sensors may be utilized to determine contact with a user or other objects.

The device 100 may include one or more output devices 2818. A motor 2980 may be used to provide linear or rotary motion. A light 2982 may be used to emit photons. A speaker 2984 may be used to emit sound. A display 2986 may comprise one or more of a liquid crystal display, light emitting diode display, electrophoretic display, cholesterol display, interferometric display, and so forth. The display 2986 may be used to present visible information such as graphics, pictures, text, and so forth. In some implementations, the display 2986 may comprise a touchscreen that combines a touch sensor and a display 2986.

In some implementations, the device 100 may be equipped with a projector 2988. The projector 2988 may be able to project an image on a surface, such as the floor, wall, ceiling, and so forth.

One or more mast actuators 2990 may comprise one or more of a motor, linear actuator, pneumatic device, hydraulic device, and so forth. An actuator controller may be used to provide a signal or other input that operates one or more of the mast actuators 2990 to produce movement of the mast 108. For example, the lift assembly 508 may include the mast actuators 2990 that are used to raise or lower at least a portion of the mast 108.

A scent dispenser 2992 may be used to emit one or more smells. For example, the scent dispenser 2992 may comprise a plurality of different scented liquids that may be evaporated or vaporized in a controlled fashion to release predetermined amounts of each.

One or more moveable component actuators 2994 may comprise an electrically operated mechanism such as one or more of a motor 2980, solenoid, piezoelectric material, electroactive polymer, shape-memory alloy, and so forth. An actuator controller may be used to provide a signal or other input that operates one or more of the moveable component actuators 2994 to produce movement of the moveable component.

In other implementations, other 2996 output devices may be utilized. For example, the device 100 may include a haptic output device that provides output that produces particular touch sensations to the user. Continuing the example, a motor 2980 with an eccentric weight may be used to create a buzz or vibration to allow the device 100 to simulate the purr of a cat.

Mechanism for Sequenced Deployment of the Mast

Figure 30A:
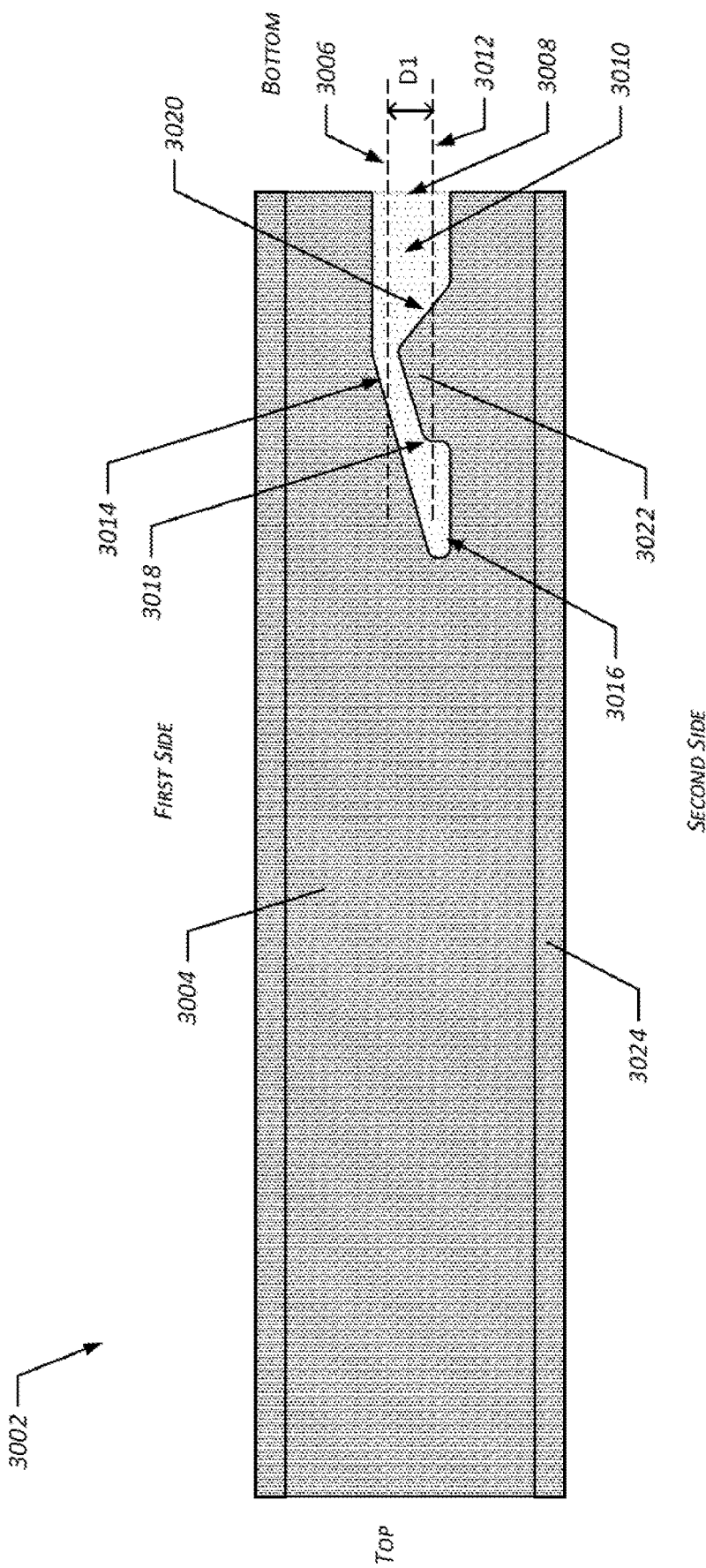
FIGS. 30A-30C depict portions of a mechanism for a sequenced deployment of a mast, according to some implementations.
Figure 30B:
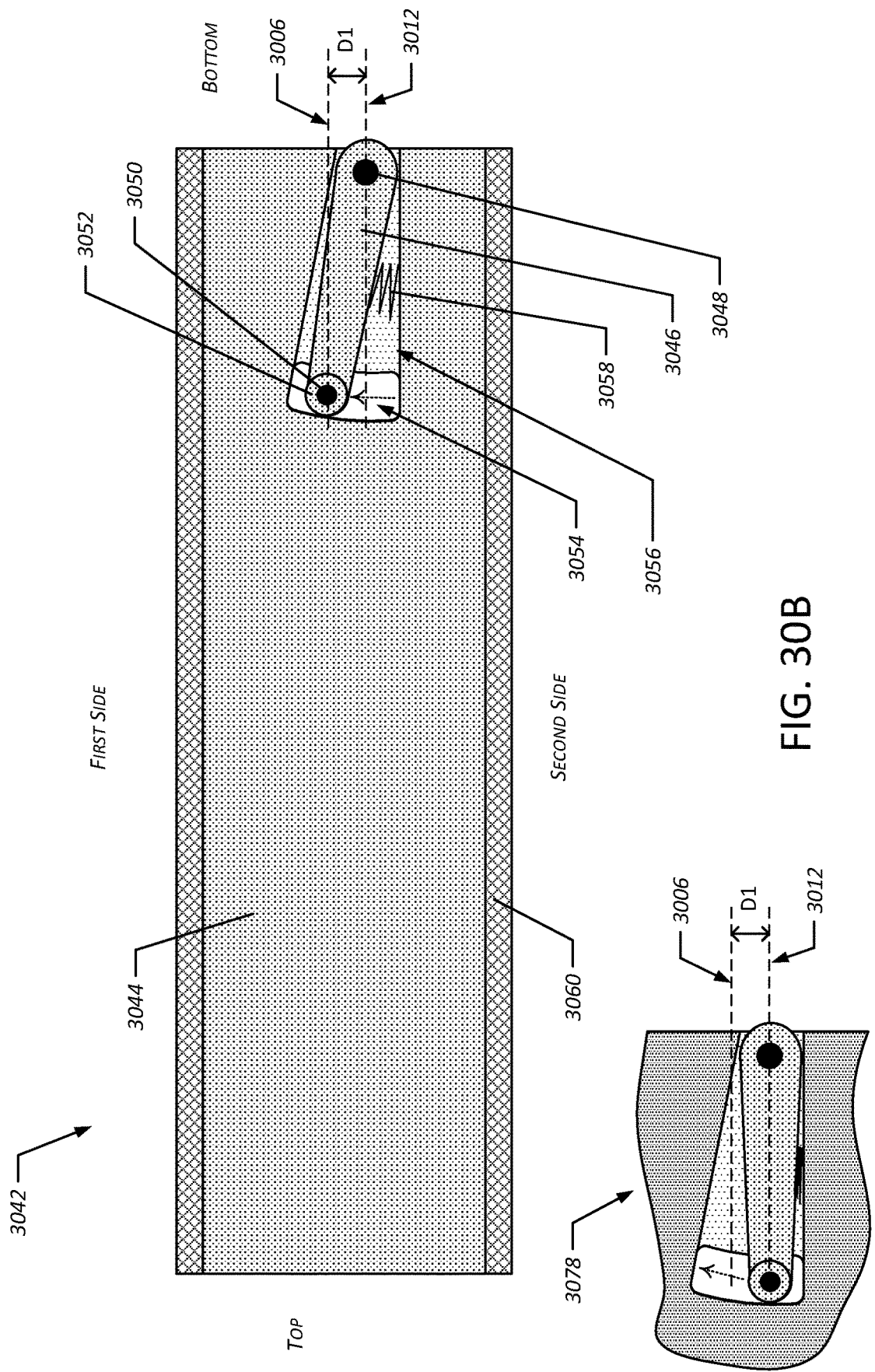
Figure 30C:
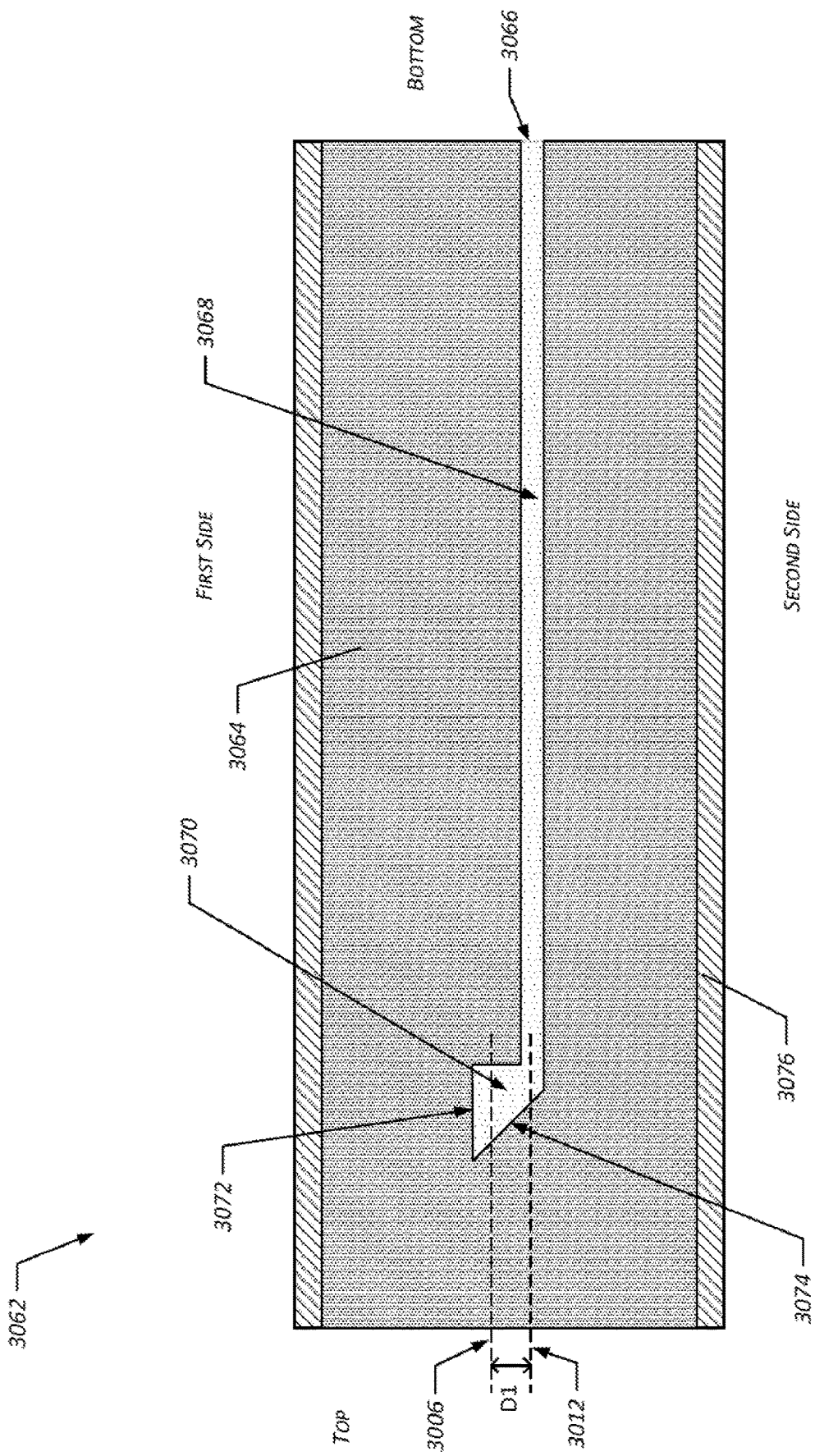

FIGS. 30A-30C depict portions of a mechanism for a sequenced deployment of the telescoping sections 506 of the mast 108, according to some implementations. To provide a uniform customer experience, it may be desirable to control the sequencing or order of deployment of the mast 108. For example, it may be desirable for the innermost telescoping section 506 to rise first, followed by the next innermost telescoping section 506, and so forth. Additionally, once deployed the mast 108 should resist wobbling or other unintended motions. The sequencing may also minimize potential paths by which debris would enter between the telescoping sections 506 of the mast 108.

The resistance to wobbling may be affected by physical tolerances of the alignment features, such as the inner guide features 572, external guide features 574, and so forth. Close or "tight" tolerances minimize the excess space between the features and may require more exacting and potentially costly manufacturing processes. Misalignment, warping, or variances during manufacture may result in excess friction between adjacent telescoping sections 506, binding, and so forth.

By using the mechanism for sequenced deployment described herein, the tolerances for manufacture may be limited to a relatively small portion of the overall telescoping sections 506, minimizing manufacturing cost. By controlling the sequence of deployment, wobble or other undesired lateral motions of the mast 108 are minimized. For example, the telescoping section 506 of the mast 108 that is extended first is supported by those telescoping sections 506 that remain fully retracted.

The mechanism for sequenced deployment comprises three elements. For ease of illustration and not necessarily as a limitation, the three elements may be described as a "lock control element", a "moveable engagement element", and an "L channel element". A different one of these three elements may be present on each telescoping section 506. For example, if the mast 108 comprises three telescoping sections 506, then each of the telescoping sections 506 may have a different element. In another example, a given telescoping section 506 may include two different kinds of elements, allowing the mechanism to be used in conjunction with more than three telescoping sections 506. Continuing this example, one telescoping section 506 may include a lock control element, a moveable engagement element, and the L channel element, each at a different location with respect to that telescoping section 506.

FIG. 30A depicts a lock control element 3002. The lock control element 3002 comprises a body 3004 or structure. For example, the body 3004 may comprise the walls of the telescoping section 506. Indicated in this figure with a broken line is a first position 3006. In one implementation, the first position 3006 is located at a first distance from a centerline extending along a long axis of the body 3004. A first entrance 3008 of a first channel 3010 in the body 3004 is shown proximate to a bottom end of the telescoping section 506. In other implementations, a hole or cut in the body 3004 may be used instead of a channel.

A second position 3012 is indicated with another broken line. The second position 3012 is located at a second distance from the centerline, at a distance D1 from the first position 3006. The first entrance 3008 may be arranged as shown here to accommodate the first position 3006 and the second position 3012. In another implementation, the first entrance 3008 may be arranged to accommodate the first position 3006.

Within the first channel 3010 a first ramp 3014 provides a transition within the first channel 3010 from the first position 3006 to the second position 3012. The first channel 3010 ends at a distal end 3016. The distal end 3016 is proximate to the top of the telescoping section 506. In the implementation depicted here, the first channel 3010 tapers to the distal end 3016. The distal end 3016 is positioned along the line indicated by the second position 3012.

In some implementations, such as shown here, the first channel 3010 may include additional features. For example, a first lip 3018 extends from a wall of the first channel 3010 proximate to the second position 3012 towards the wall of the first channel 3010 that is proximate to the first position 3006. A second ramp 3020 may be arranged within the first channel 3010. The second ramp 3020 may extend from the wall of the first channel 3010 that is proximate to the second position 3012, towards the wall of the first channel 3010 that is proximate to the first position 3006, forming a ridge 3022. The second ramp 3020 may provide a transition within the first channel 3010 from the second position 3012 to the first position 3006. The second ramp 3020 may be located closer to the first entrance 3008 than the first ramp 3014. In another implementation the second ramp 3020 and the ridge 3022 may be omitted. In yet another implementation, instead of the ridge 3022, the body 3004 may extend from the location of the ridge 3022 to proximate to the bottom end of the telescoping section 506.

The body 3004 may include one or more alignment features 3024. For example, the alignment features 3024 may include the inner guide features 572, external guide features 574, and so forth. The alignment features 3024 may maintain alignment between adjacent telescoping sections 506.

FIG. 30B depicts a moveable engagement element 3042. The moveable engagement element 3042 comprises a body 3044 or structure. For example, the body 3044 may comprise the walls of the telescoping section 506. Indicated in this figure with broken lines are the first position 3006 and the second position 3012.

The moveable engagement element 3042 may comprise a lever arm 3046. The lever arm 3046 has a first lever end and a second lever end. A pivot pin 3048 or other structure attaches the first lever end of the lever arm 3046 to the body 3044. In the implementation shown, the pivot pin 3048 is proximate to the bottom end of the body 3044. For example, the pivot pin 3048 may be proximate to the bottom of the telescoping section 506. The lever arm 3046 may move with respect to the pivot pin 3048. In other implementations, the pivot pin 3048 may be located elsewhere with respect to the body 3044. For example, the pivot pin 3048 may be proximate to the top of the telescoping section 506.

An engagement pin 3050 is present at the second lever end of the lever arm 3046. In this view, the engagement pin 3050 is aligned with respect to the first position 3006.

The engagement pin 3050 has a first end and a second end, each of which extends away from the body 3044. For example, the engagement pin 3050 may extend perpendicular to an exterior surface of the telescoping section 506. In some implementations, the engagement pin 3050 may include one or more bushings 3052 that are mounted to the ends of the engagement pin 3050. For example, the bushing 3052 may have a greater diameter than the engagement pin 3050.

The first end of the engagement pin 3050 engages at least a portion of the first channel 3010 in some situations, as described below. The second end of the engagement pin 3050 may extend through an aperture 3054 in the body 3044. The second end of the engagement pin 3050 engages a second channel 3068, as described below.

In some implementations, the lever arm 3046 may be arranged within a lever recess 3056. The lever recess 3056 may constrain movement of the lever arm 3046. A spring 3058 provides a biasing force on the lever arm 3046. This biasing force pushes the second end of the lever arm 3046 that includes the engagement pin 3050 towards the first position 3006. For example, the spring 3058 may push the engagement pin 3050 towards the first ramp 3014.

In other implementations other mechanisms may be used to move the engagement pin 3050. For example, instead of the lever mechanism involving the lever arm 3046, the engagement pin 3050 may be retained within a piece that slides within one or more grooves. Instead of or in addition to the spring 3058, the biasing force may be applied using magnets, elastomeric materials, and so forth.

The body 3044 may include one or more alignment features 3060. For example, the alignment features 3060 may include the inner guide features 572, external guide features 574, and so forth. The alignment features 3060 may maintain alignment between adjacent telescoping sections 506.

Also shown is another view 3078 of the lever arm 3046 and the engagement pin 3050 in another position. In this view, the engagement pin 3050 is aligned with respect the second position 3012.

FIG. 30C depicts an L channel element 3062. The L channel element 3062 comprises a body 3064 or structure. For example, the body 3064 may comprise the walls of the telescoping section 506. Also shown in this figure with a broken line is the first position 3006 and the second position 3012.

A second entrance 3066 of a second channel 3068 in the body 3064 is shown proximate to a bottom end of the telescoping section 506. The second entrance 3066 and a portion of the second channel 3068 is aligned with the second position 3012. In other implementations, a hole or cut in the body 3064 may be used instead of a channel.

An engagement feature 3070 is present at a distal end of the second channel 3068, proximate to the top of the body 3064. The engagement feature 3070 may include a volume that is bounded by a retention surface 3072. For example, the engagement feature 3070 may comprise a notch which extends perpendicularly from a long axis of the second channel 3068. At least a portion of the engagement feature 3070 is aligned with the first position 3006 and the second position 3012. In some implementations the engagement feature 3070 may extend closer to the top of the body 3064. For example, the length of the retention surface 3072 may be longer than illustrated in FIG. 30C.

In some implementations, a third ramp 3074 as shown here provides a transition from the first position 3006 to the second position 3012 with respect to the long axis of the second channel 3068. In other implementations the third ramp 3074 may be omitted.

The body 3064 may include one or more alignment features 3076. For example, the alignment features 3076 may include the inner guide features 572, external guide features 574, and so forth. The alignment features 3076 may maintain alignment between adjacent telescoping sections 506. In some implementations the second channel 3068 may also be used to maintain alignment with an adjacent telescoping section 506. For example, an adjacent telescoping section 506 may include a feature which extends into at least a portion of the second channel 3068.

Figure 31A:
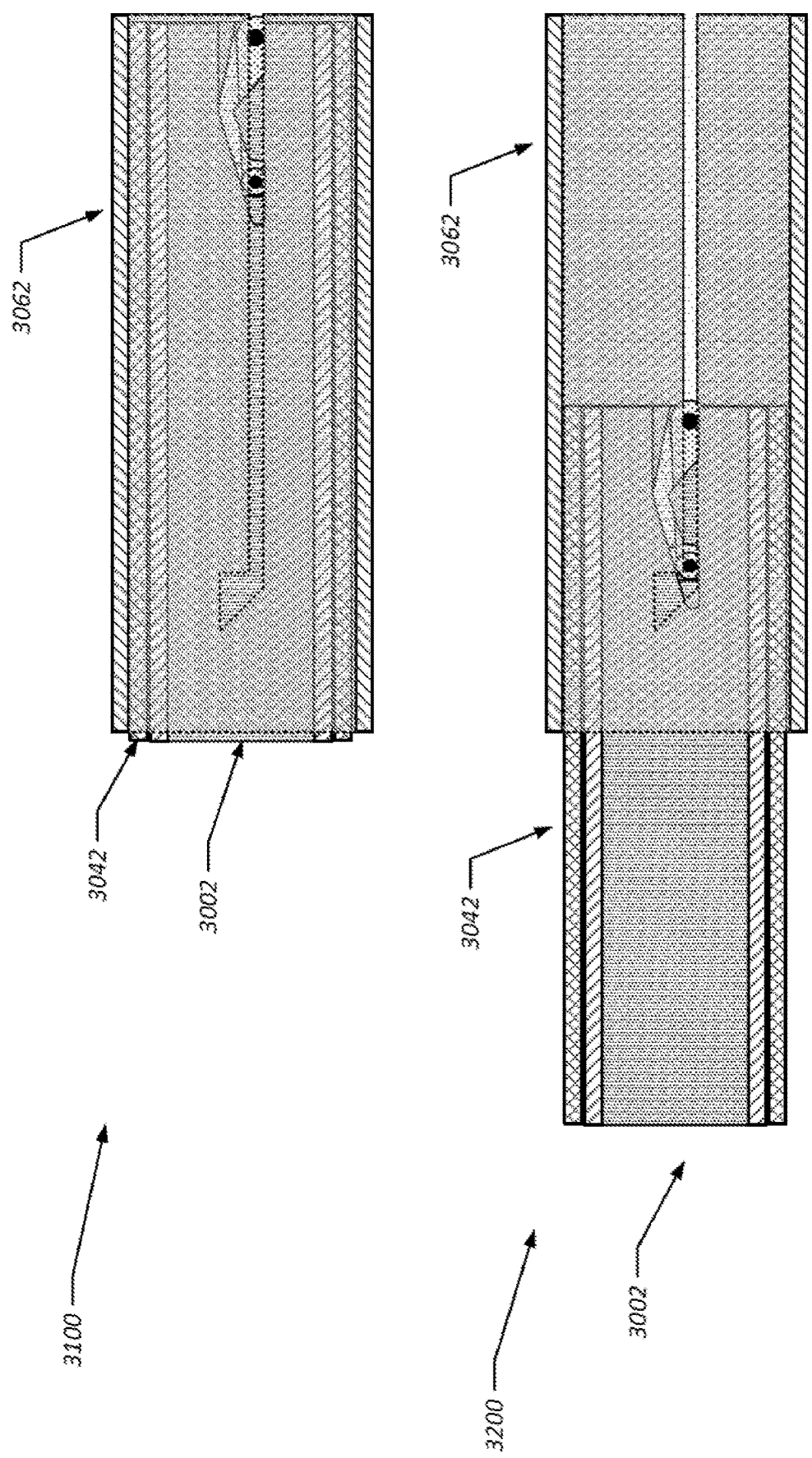
FIGS. 31A-31B depict the mechanism at various stages during deployment, according to some implementations.
Figure 31B:
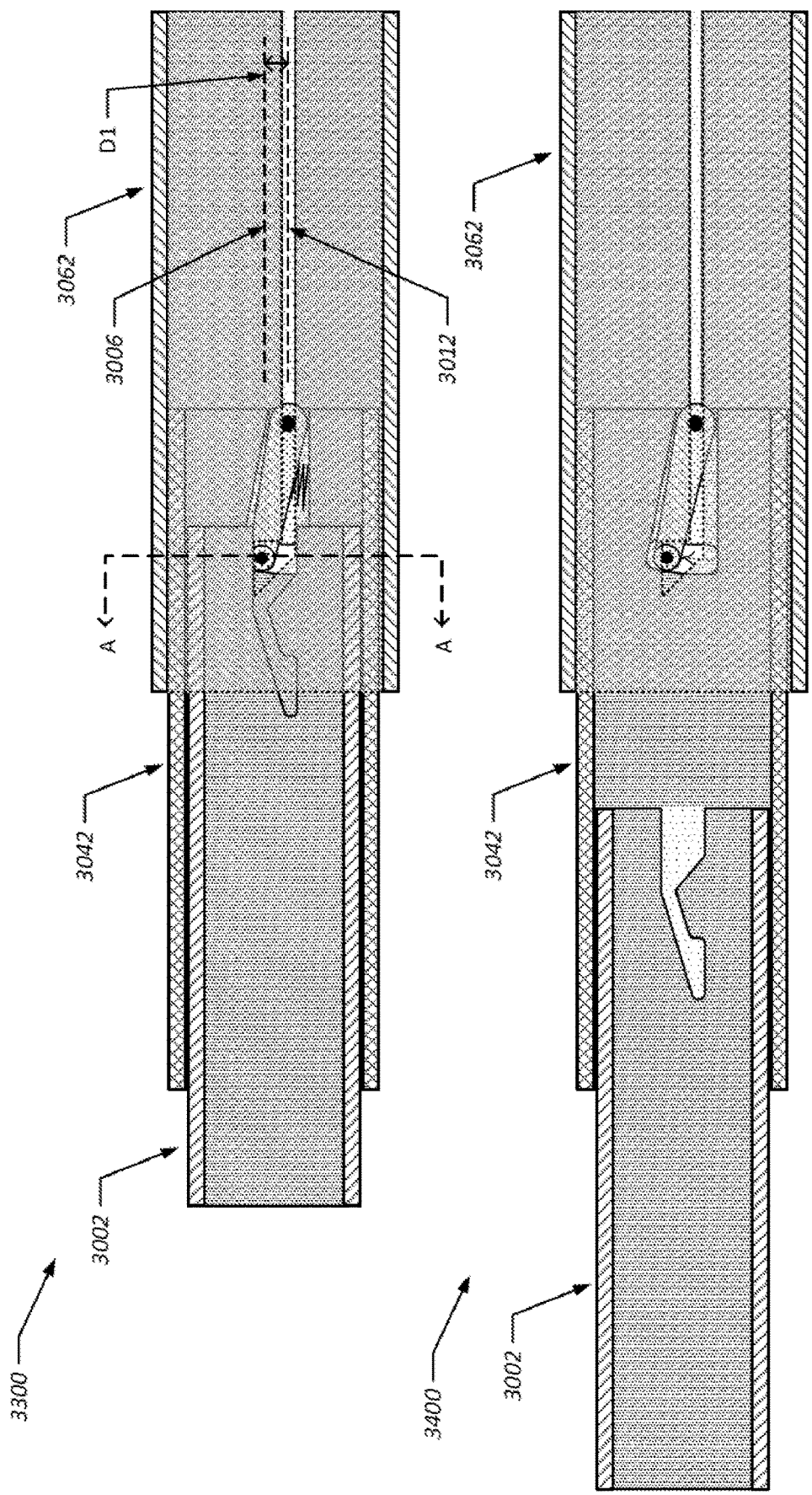

FIGS. 31A-31B depict the mechanism at various stages during deployment, according to some implementations.

A first stage 3100 depicts a mast 108 comprising three telescoping sections 506 in a fully retracted configuration, at minimum extension. In this configuration the first end of the engagement pin 3050 is located within the distal end 3016 of the first channel 3010 while the second end of the engagement pin 3050 is located in the second channel 3068, and both are aligned with respect to the second position 3012.

A second stage 3200 depicts the mast 108 as extension progresses. The section comprising the lock control element 3002 remains within the section comprising the moveable engagement element 3042. The section comprising the moveable engagement element 3042 is extended with respect to the section comprising the L channel element 3062. At this stage, the engagement pin 3050 remains aligned with the second position 3012.

In FIG. 31B, a third stage 3300 depicts the ongoing extension. The section comprising the lock control element 3002 has been extended, freeing up the engagement pin 3050 to move from the second position 3012 to the first position 3006, allowing the engagement pin 3050 to move into the engagement feature 3070. The section comprising the moveable engagement element 3042 is now locked in respect to the section comprising the L channel element 3062.

A fourth stage 3400 depicts the ongoing extension, with the mast 108 in this example at maximum extension. The section comprising the lock control element 3002 has been fully extended. The engagement pin 3050 remains within the engagement feature 3070. The section comprising the moveable engagement element 3042 remains locked with respect to the section comprising the L channel element 3062.

To retract the mast 108, the stages are reversed. The section comprising the lock control element 3002 is retracted. As the section comprising the lock control element 3002 retracts, the first ramp 3014 engages and displaces the engagement pin 3050 from the first position 3006 to the second position 3012. This removes the engagement pin 3050 from the engagement feature 3070. The section comprising the moveable engagement element 3042 is now free to move with respect to the section comprising the L channel element 3062.

Figure 32:
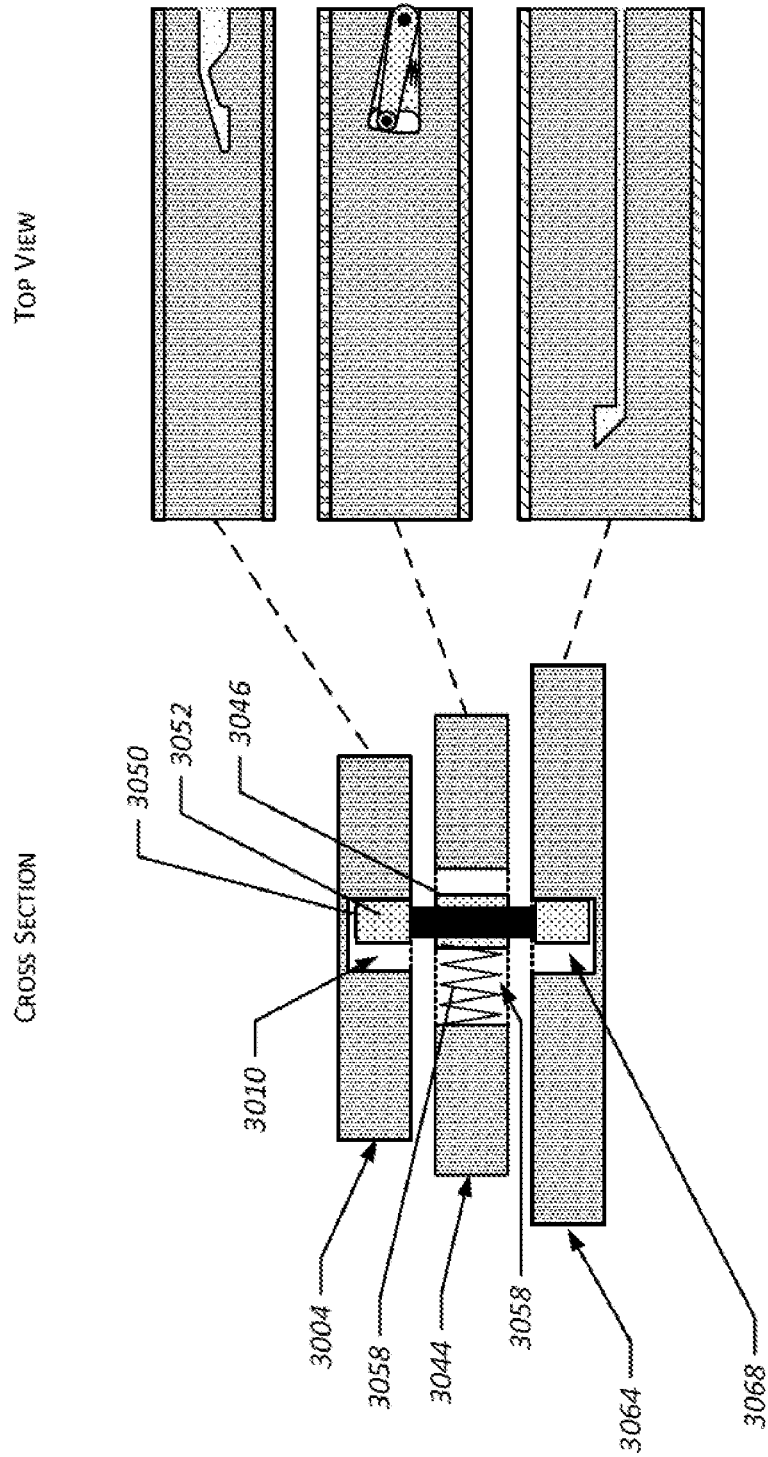
FIG. 32 depicts a cross section of the mechanism at one stage during deployment, according to some implementations.

FIG. 32 depicts a cross section of the mechanism at one stage during deployment and a top view of the corresponding elements, according to some implementations. The cross section is that indicated along line A-A as shown in FIG. 31B.

In this illustration, the body 3004 including the first channel 3010 is shown. A first end of the engagement pin 3050 with a bushing 3052 is within the first channel 3010. The body 3044 with the spring 3058 applying the biasing force is also shown.

Also shown is the body 3064 with the second channel 3068. The second end of the engagement pin 3050 that includes a bushing 3052 is within the second channel 3068.

The apparatus described in this disclosure may be used in other situations. For example, a stationary device may use the mast 108, pan and tilt assembly 602 to pan and tilt a component such as a display 2986, camera 2944, and so forth.

Extensible Mast with Lock Control and Bobbin

Figure 33:
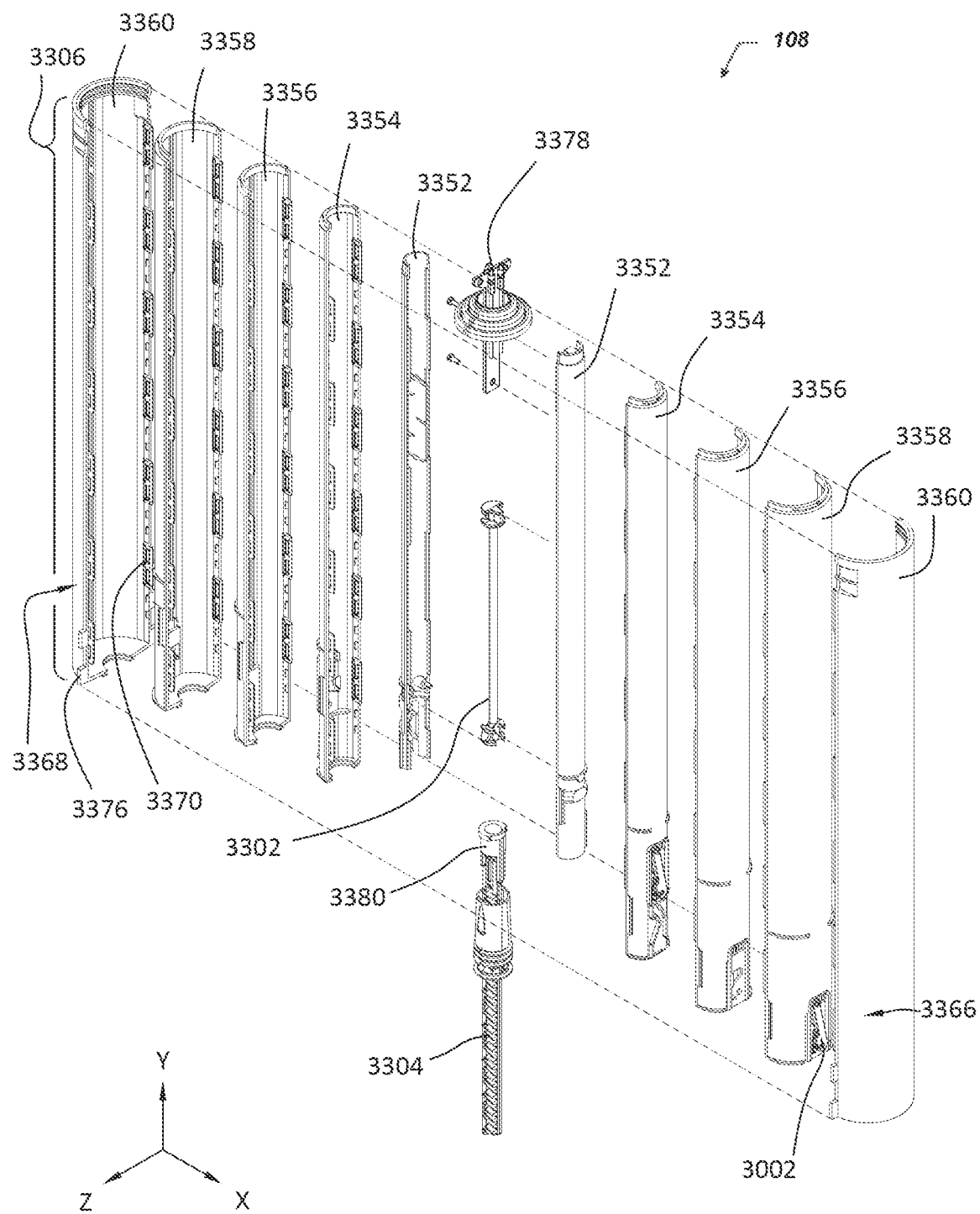
FIG. 33 illustrates an exploded view of the mast including lock control features for sequencing and a bobbin to maintain a helical wind of one or more cables within the mast, according to some implementations.

FIG. 33 illustrates an exploded view of another implementation of the mast 108 that includes the lock control features for sequencing and a first structure, such as a bobbin 3302, to maintain a helical wind of one or more cables within the mast 108, according to some implementations. For clarity of illustration, the cable 3404 is omitted from this figure.

The mast 108 depicted in FIG. 33 may comprise a series of telescoping sections 3306 that are nested at least partially within one another. In this illustration, the mast 108 has five sections: a first mast section 3352 that is innermost, a second mast section 3354, a third mast section 3356, a fourth mast section 3358, and a fifth mast section 3360 that is outermost.

Each of the mast sections comprises two or more pieces. For example, as shown here each mast section comprises a first piece 3366 and a second piece 3368, each forming half of a mast section. The pieces may be joined together by one or more engagement features 3370. For example, the first piece 3366 may have tabs and the second piece 3368 may have slots into which the tabs fit to join the two pieces. In other implementations, other techniques may be used to join the pieces of the mast sections. For example, pieces may be joined using adhesive, ultrasonic welding, mechanical fasteners, and so forth.

The mast sections may include one or more of the lock control elements 3002. For example, the body 3004 may comprise the walls of the telescoping section 3306.

The pieces of the mast sections may be produced inexpensively. For example, the pieces may be injection molded. In some implementations the first piece 3366 and the second piece 3368 may be identical. For example, the first piece 3366 and the second piece 3368 of the second section 3354 may be formed using the same injection mold.

The multi-piece construction facilitates assembly of the device 100. For example, during assembly the first piece 3366 of all the mast sections may be laid out in nested order, and the cable 3404 routed through the center. The mast sections may then be assembled, starting with assembling the innermost first mast section 3352, then the second mast section 3354, then the third mast section 3356, then the fourth mast section 3358, and then the fifth mast section 3360. This assembly process is significantly simpler and less expensive than threading the cable 3404 through the mast 108 if the mast sections were of single piece construction or previously assembled.

One or more of the mast sections may include inner guide features. These inner guide features may be positioned on an interior surface of the mast sections. The inner guide features may include ridges, grooves, and so forth. The inner guide features mechanically engage corresponding external guide features that are present on the exterior surface of a nested mast section. The external guide features may comprise ridges, grooves, and so forth. For example, the inner guide features on the second mast section 3354 may mechanically engage the external guide features on the first mast section 3352. The inner guide features and the external guide features operate in conjunction to maintain alignment of the mast sections during operation.

The outermost mast section 3360 may omit the external guide features, but may include one or more rotation tabs 3376 or other features. The rotation tab 3376 engages at least a portion of the pan and tilt assembly 602. For example, as a portion of the pan and tilt assembly 602 rotates, a force may be applied to the rotation tab 3376, rotating the mast 108 and all of the telescoping sections 3306 in unison.

Also shown is a payload bracket 3378. The payload bracket 3378 provides a rigid interface between the innermost section 3352 and a portion of the payload 502.

An anchor 3380 is shown. The anchor 3380 may comprise two pieces, as illustrated, or a single piece. The anchor 3380 mechanically engages one end of each of the flexible racks 3304 used by the mast 108, with the other ends of the one or more flexible racks 3304 within respective spools 3510 and 3512. The cable 3404 may pass through the anchor 3380, past the bobbin 3302, and up to the payload atop the innermost section 3352. The anchor 3380 is mounted to a bottom portion of the innermost section 3352 and is able to rotate with respect to the innermost section 3352. As force is applied to the flexible racks 3304 by the motor in the lift motor assembly 3514 (see FIG. 35), the force is transferred to the anchor 3380 which in turn transfers the force to the innermost section 3352. The force transferred to the innermost section 3352 displaces the portions of the extensible mast 108 that are free to move based on the action of the lock control elements 3002.

As depicted, a first side of a first flexible rack 3304(1) of the one or more flexible racks 3304 is shown. The first side comprises teeth and a second side, opposite the first side, does not comprise teeth. Not depicted is a second flexible rack 3304(2) that comprises a third side and a fourth side. The second flexible rack 3304(2) mirrors the first flexible rack 3304(1). The third side of the second flexible rack 3304(2) may comprise teeth and the fourth side of the second flexible rack 3304(2) does not comprise teeth. The second side of the first flexible rack 3304(1) and the fourth side of the second flexible rack 3304(2) are pressed together as the first flexible rack 3304(1) and the second flexible rack 3304(2) are uncoiled from their respective spools to move the mast 108 upward. The second side of the first flexible rack 3304(1) and the fourth side of the second flexible rack 3304(2) are separated as the first flexible rack 3304(1) and the second flexible rack 3304(2) are coiled into their respective spools to move the mast 108 downward. For example, a pair of rack drive gears 540(1) and 540(2) may be used, each gear comprising a plurality of teeth that engage the teeth of a respective flexible rack 3304. For example, teeth of a first rack drive gear 540(1) engage the first flexible rack 3304(1) while teeth of a second rack drive gear 540(2) engage the second flexible rack 3304(2). In some implementations, as the rack drive gears 540 rotate within the lift motor assembly 3514, a force is exerted that presses the first flexible rack 3304(1) and the second flexible rack 3304(2) together while moving them upward or downward.

The bobbin 3302 directs the one or more cables 3404 within the innermost section 3352 to describe a helical or spiral path from the bottom portion of the innermost section 3352 to an uppermost portion of the innermost section 3352. The bobbin 3302 may be disposed within the inner mast section, such as the innermost section 3352. The bobbin 3302 is described in more detail with regard to FIG. 34.

The helical winding imposed by the bobbin 3302 on the one or more cables 3404 provides additional length within the innermost section 3352. The additional length of the one or more cables 3404 wound around the bobbin 3302 reduces undesirable mechanical strain on the one or more cables 3404. As the mast 108 extends or retracts, strain along a longitudinal axis of the mast 108 may extend or compress the helical wind of the cables 3404 around the bobbin 3302. The extension or compression of the helical wind assists in reducing the strain on the one or more cables 3404 along the longitudinal axis of the mast 108. The helical winding also prevents the cable(s) 3404 from becoming kinked, which could damage the one or more cables 3404.

The bobbin 3302 may be mounted to permit rotation about a longitudinal axis of the mast 108. For example, the bobbin 3302 may rotate within the innermost section 3352. One or more features within the innermost section 3352 may prevent the bobbin 3302 from moving longitudinally up or down while permitting rotation with respect to a longitudinal axis. During operation, the helical winding imposed by the bobbin 3302 results in the cable 3404 acting like a spring, reducing slack in the cable 3404 and improving deployment and retraction of the mast 108.

In another implementation the bobbin 3302 may be affixed to the innermost section 3352. For example, the bobbin 3302 may be joined to the innermost section 3352 using one or more mechanical engagement features, screws, and so forth. In another implementation the bobbin 3302 may comprise one or more portions of the innermost section 3352. For example, the bobbin 3302 may comprise one or more features that are molded into or part of one or both of the first piece 3366 and the second piece 3368 of the innermost section 3352.

One or more aperture guides may be positioned at a lower aperture of one or more of the mast sections. The aperture guides may maintain the flexible rack 3304 centered within the mast 108 as the mast 108 extends and retracts. The aperture guides are able to rotate about a longitudinal axis of the mast 108.

Figure 34:
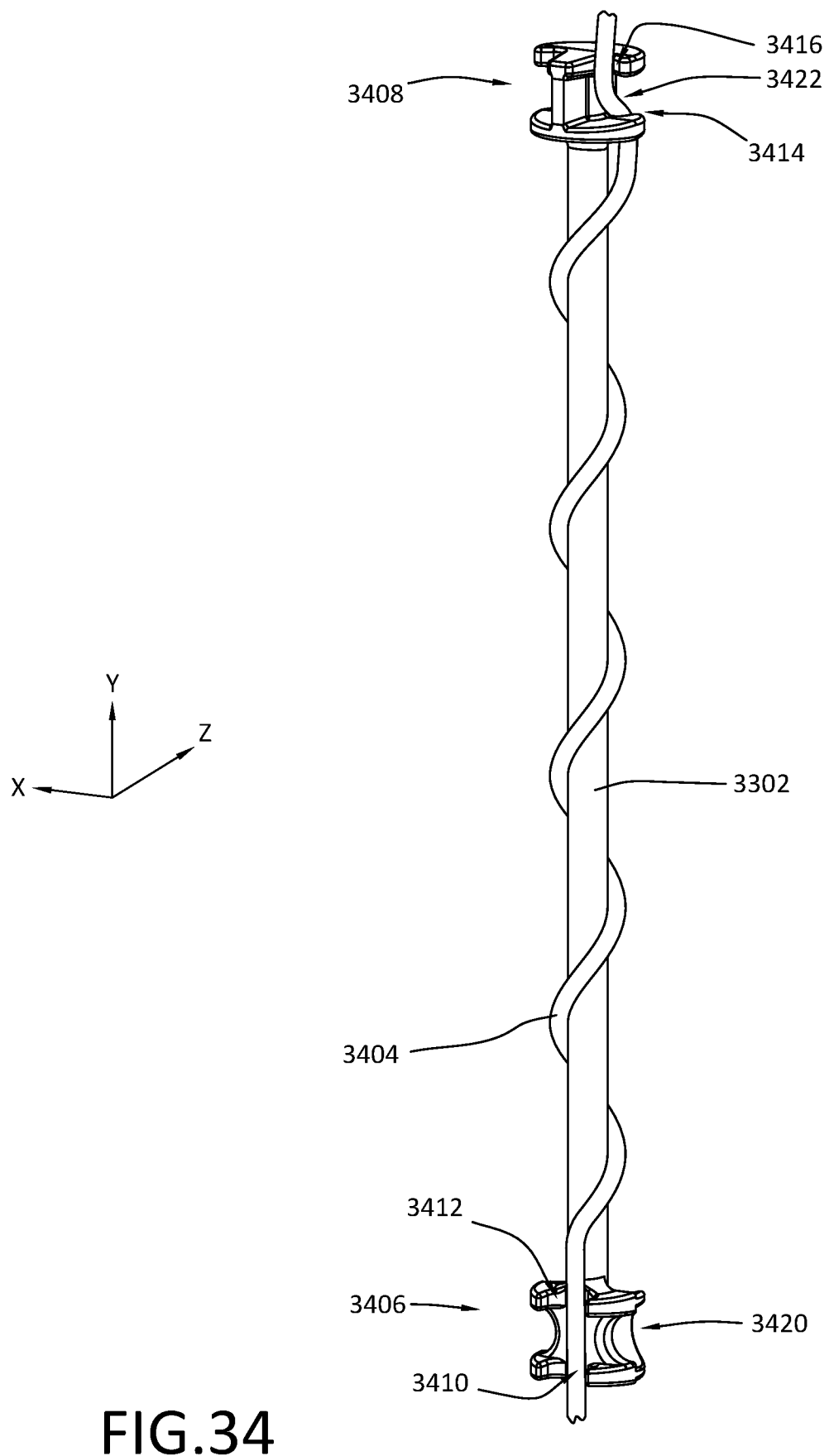
FIG. 34 illustrates a view of the bobbin of FIG. 33, according to some implementations.

FIG. 34 illustrates a view of the bobbin 3302 of FIG. 33, according to some implementations. In this view, the cable 3404 is also shown. The bobbin 3302 is a structure that comprises a first end 3406 and a second end 3408 joined by a shaft. In one implementation, the first end 3406 may be proximate to a lower end of the innermost section 3352 while the second end 3408 is proximate to an upper end of the innermost section 3352 and the payload bracket 3378.

The first end 3406 may comprise a first feature 3410 and a second feature 3412. The first feature 3410 and the second feature 3412 may comprise apertures through which the cable 3404 may pass. The aperture may be open, as shown here, or closed. The open implementation shown here facilitates assembly by providing easy installation of the cable 3404. In the closed implementation, the cable 3404 would be routed through the aperture during assembly. In this implementation, orientations of the first feature 3410 and the second feature 3412 are aligned. This alignment provides a relatively straight path for the cable 3404 to pass from the anchor 3380 towards the payload bracket 3378.

The bobbin 3302 may include an engagement feature 3420. The engagement feature 3420 may engage the one or more features within the innermost section 3352 to prevent the bobbin 3302 from moving longitudinally up or down while permitting rotation with respect to a longitudinal axis of the bobbin 3302.

The second end 3408 may comprise a third feature 3414 and a fourth feature 3416. The third feature 3414 and the fourth feature 3416 may comprise apertures through which the cable 3404 may pass. The apertures may be open, as shown here, or closed. The first feature 3410 may comprise a first aperture, the second feature 3412 may comprise a second aperture, the third feature 3414 may comprise a third aperture, and the fourth feature 3416 may comprise a fourth aperture. In this implementation, the orientation of the third feature 3414 and the fourth feature 3416 may be offset. For example, the aperture of the third feature 3414 is on a side opposite the aperture of the fourth feature 3416. This difference in orientation between the third feature 3414 and the fourth feature 3416 introduces a bend 3422 in the cable 3404. The bend 3422 may restrict movement of the cable 3404 with respect to the bobbin 3302. The bend 3422 may also facilitate a helical disposition of the cable 3404. In implementations where the second end 3408 is proximate to an uppermost portion of the innermost section 3352, the bend 3422 may support the cable 3404 that is suspended below, reducing mechanical strain on the electronics in the payload to which the cable 3404 is attached.

The relative orientation between the second feature 3412 and the third feature 3414 may be opposite one another. For example, the aperture of the second feature 3412 may be on a side opposite the aperture of the third feature 3414. This difference in orientation may facilitate the introduction of a helical path in the cable 3404, spiraling around the shaft of the bobbin 3302. As depicted, the cable 3404 helically winds around the shaft of the bobbin 3302 four times. In other examples, the cable 3404 may wind around the shaft more or fewer times. The helical wind of the cable 3404 reduces stress on the cable 3404 that may otherwise be introduced due to rotation of the flexible rack(s) 3304 and anchor 3380 during extension or retraction of the mast 108, rotation of the mast 108, and so forth. For example, a rotation tab of the mast 108 may engage at least a portion of the pan and tilt assembly 602. A portion of the pan and tilt assembly 602 may rotate, applying a force to the rotation tab that in turn rotates the mast 108, all of the telescoping sections 3306, and the flexible rack(s) 3304 therein. The helical wind provides additional length of cable 3404 to facilitate this rotation.

While a single cable 3404 is depicted, a plurality of cables 3404 may be present. In one implementation a single set of features may be used to route a plurality of cables 3404. For example, two cables 3404 may be routed through the same features 3410, 3412, 3414, and 3416. In another implementation additional features may be provided to provide individual paths for individual cables 3404. With this implementation, a plurality of cables 3404 may be routed, each forming a helix with a different position relative to the bobbin 3302.

Flexible Rack with Integrated Cable Management

Figure 35:
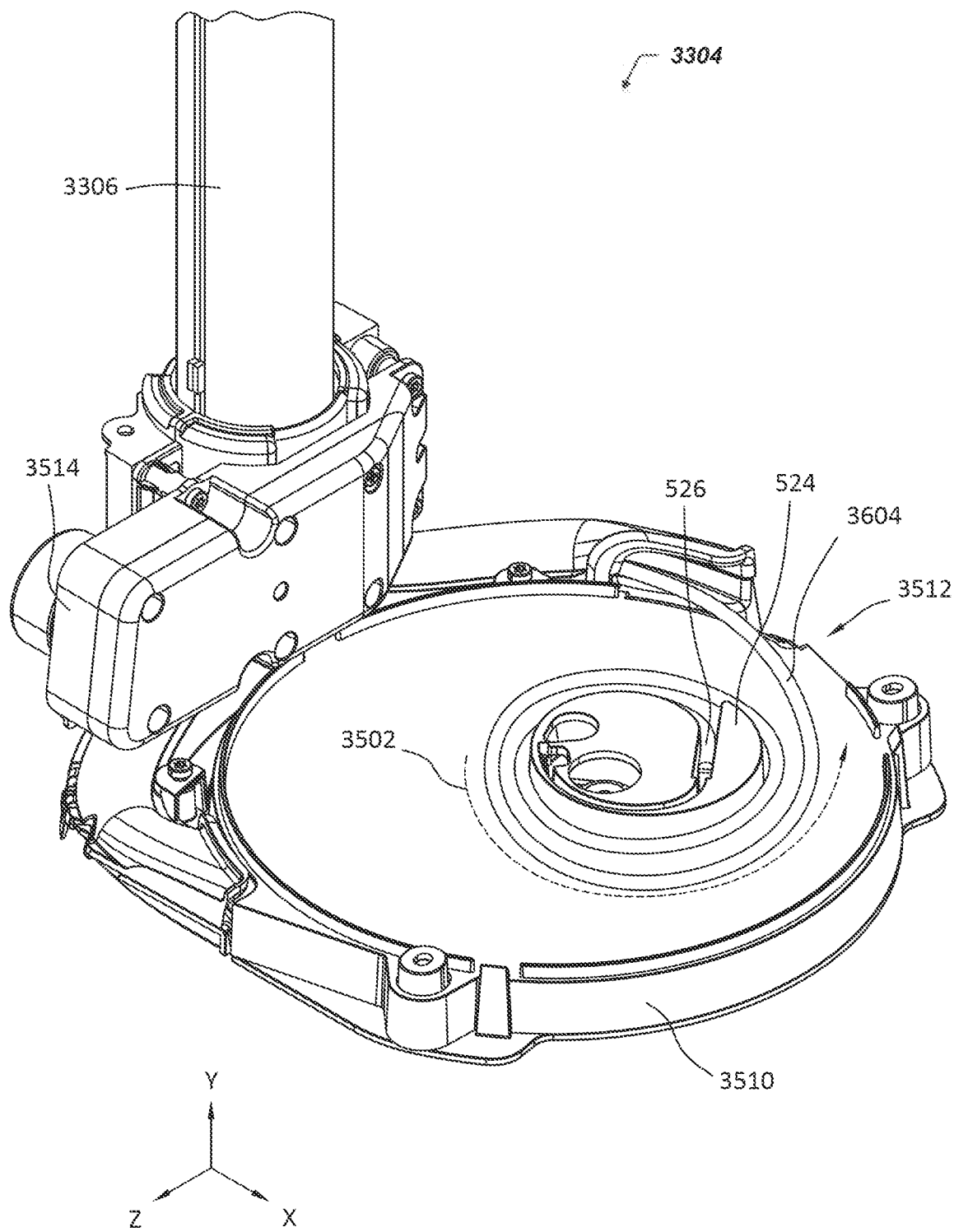
FIG. 35 illustrates a view of the mast and the lift assembly a spool showing arrangement of a portion of a flexible rack that has no teeth, according to some implementations.

FIG. 35 illustrates a spool showing arrangement of a portion of a flexible rack 3304 that has no teeth, according to some implementations. The extensible mast 108 may be raised and lowered using one or more flexible racks 3304. For example, the extensible mast 108 may comprise the mast 108 described with regard to FIG. 33.

In one implementation, each of the flexible racks 3304 may include an associated cable 3404 that is retained using one or more engagement features. The cable 3404 may be retained with respect to the flexible rack 3304 as described below with regard to FIG. 37. In other implementations, one or more of the flexible racks 3304 may not be associated with a cable 3404 and may omit one or more engagement features for the cable 3404.

This illustration shows an implementation of a lift assembly in which a cover of an upper spool 3512 has been removed to show the interior of the upper spool 3512. In this implementation, two flexible racks 3304 are used in combination to raise and lower the mast 108. The upper spool 3512 may be used to stow a first flexible rack 3304(1) with an associated first cable 3404(1). A lower spool 3510 may be used to stow a second flexible rack 3304(2) with an associated second cable 3404(2).

In this example, the second piece of a first flexible rack 3304(1) is shown in the upper spool 3512. The first piece of the first flexible rack 3304(1), not shown, comprises teeth. The first piece is discussed in more detail with regard to FIG. 37. The first piece comprises a first side comprising teeth and a second side, opposite the first side, that does not comprise teeth. Not depicted is a second flexible rack 3304(2) that is stowed in the lower spool 3510. The second flexible rack 3304(2) comprises a third side and a fourth side. The second flexible rack 3304(2) mirrors the first flexible rack 3304(1). The third side of the second flexible rack 3304(2) may comprise teeth and the fourth side of the second flexible rack 3304(2) does not comprise teeth. The second side of the first flexible rack 3304(1) and the fourth side of the second flexible rack 3304(2) are pressed together as the first flexible rack 3304(1) and the second flexible rack 3304(2) are uncoiled from their respective spools to move the mast 108 upward. The second side of the first flexible rack 3304(1) and the fourth side of the second flexible rack 3304(2) are separated as the first flexible rack 3304(1) and the second flexible rack 3304(2) are coiled into their respective spools to move the mast 108 downward. For example, a rack drive gear 540 may comprise a plurality of teeth that engage the teeth of both the first flexible rack 3304(1) and the second flexible rack 3304(2). In some implementations, as the rack drive gear 540 rotates within the lift motor assembly 3514, a force is exerted that presses the first flexible rack 3304(1) and the second flexible rack 3304(2) together and moves them upward or downward.

Each of the spools includes a mandrel 524. The mandrel 524 may be fixed with regard to the structure of the spool, remaining stationary during operation. In some implementations, the mandrel 524 may be formed into or from a portion of the structure of the spool.

In the implementation shown here, the upper spool 3512 has a mandrel 524 that is off center with respect to the interior of the upper spool 3512. The lower spool 3510 may also have a mandrel 524 that is off center with respect to the interior of the lower spool 3510. The mandrel 524 may be circular, elliptical, or irregular in cross section. The mandrel 524 for the upper spool 3512 may have a first width while the mandrel 524 for the lower spool 3510 may have a second width. In some implementations the first width and the second width may be the same. The mandrel 524 within each spool prevents the flexible rack 3304 stowed within the spool from fouling during deployment or retrieval of the flexible rack 3304.

The size of the mandrel 524 may be selected to maintain a minimum bend radius. The minimum bend radius may be selected to minimize or avoid damage to the flexible rack 3304 or cable 3404 due to bending.

Within each spool, one end of the flexible rack 3304 may be held, affixed, or joined to a portion of the mandrel 524 in the lower spool 3510. For example, the end of the flexible rack 3304 that is inside the lower spool 3510 may be retained by a feature of the mandrel 524. As discussed with regard to FIG. 36A, the flexible rack 3304 may comprise a first piece 3602 (shown in FIG. 36A) and a second piece 3604. The first piece 3602 may comprise various features such as teeth, engagement features to retain the cable 3404, and so forth. The teeth may be used with helical gears. The teeth may have leading edges that are not parallel to an axis of gear rotation and an individual tooth shape may be shaped similar to a segment of a helix. The second piece 3604 omits teeth. The second piece 3604 of the flexible rack 3304 may follow a mandrel path 3502 along a face of the mandrel 524, resulting in the second piece 3604 being proximate to the mandrel 524. This mandrel path 3502 may comprise at least a portion of the perimeter of a face of the mandrel 524 that the flexible rack 3304 may be in contact with during operation.

The second piece 3604 of the flexible rack 3304 is the portion of the flexible rack 3304 that is closest to, and may come in contact with, the mandrel 524. Relative to other portions of the flexible rack 3304, this second piece 3604 may be subject to significant mechanical strain due to the curvature imposed by the mandrel 524. During deployment and retention cycles of the flexible rack 3304 during use as the mast 108 is raised and lowered, the mechanical strain could result in breakage of the flexible rack 3304. By omitting the teeth from this second piece 3604 of the flexible rack 3304, concentration of mechanical strain is substantially reduced within the second piece 3604. Such a reduction results in a significant reduction in breakage, increasing the number of times the mast 108 may be raised and lowered before the flexible rack 3304 breaks. For example, compared to a flexible rack 3304 that has teeth present along the mandrel path 3502, the inclusion of the second piece 3604 increases by at least 100 times the count of extension and retraction cycles that the flexible rack 3304 can perform before failure by breakage. This results in a substantial increase in operational life of the flexible rack 3304.

The second piece 3604 of the flexible rack 3304 may be of different lengths relative to the first piece 3602. For example, the second piece 3604 may have a length equal to a length of the first piece 3602. In other examples, the second piece 3604 may be shorter or longer relative to the first piece 3602. The first piece 3602 may also be of a length that allows for one or more loops of the first piece 3602 around the mandrel 524 at different amounts of extension of the mast 108. For example, as the mast 108 extends, each side of the flexible rack 3304 unwinds from a respective spool. At full extension of the mast 108, the second piece 3604 may be looped around the mandrel 524 at least once. The one or more loops of the second piece 3604 resulting from the length of the second piece 3604 allow for the first piece 3602 to wind around the mandrel 524 at a larger radius. The larger radius for the first piece 3602 results in less strain on a portion of a cable 3404 that is retained by the first piece 3602.

For example, a cable 3404 may extend from the top of the mast 108 to electronics beneath the mandrel 524. The cable 3404 may be retained within the mast 108 by the bobbin 3302. The cable 3404 may extend from the bobbin 3302 and along a first longitudinal axis associated with one or more engagement features 3712 (shown in FIG. 37) of the first piece 3602. The cable 3404 may extend from the one or more engagement features 3712 into a first end of a retention feature 3634 (shown in FIG. 36B) of the second piece 3604. The cable 3404 may extend along a second longitudinal axis associated with the retention feature 3634. The cable may extend from a second end of the retention feature 3634 to one or more processors 2804 within the AMD 104.

Continuing this example, when the second piece 3604 is coiled around the mandrel 524, the cable 3404 may have a third longitudinal axis over the length of the second piece 3604 and a fourth longitudinal axis over the length of the first piece 3602. Over the length of the second piece 3604, the second longitudinal axis of the second piece 3604 and the third longitudinal axis of the cable 3404 are at a same radius with respect to the mandrel 524.

In contrast, over the length of the first piece 3602, the first longitudinal axis of the first piece 3602 and the fourth longitudinal axis of the cable 3404 may be at different radii with respect to the mandrel 524. For example, when coiled, the first longitudinal axis of the first piece 3602 may be smaller than the fourth longitudinal axis of the cable 3404 because the cable 3404 runs along a side of the first piece 3602 that faces away from the mandrel 524. Because the fourth longitudinal axis of the cable 3404 is greater than the first longitudinal axis of the first piece 3602, when the first piece 3602 is coiled, there is a strain on the cable 3404 at each location along the length of the first piece 3602 where the first piece 3602 bends to spool around the mandrel 524. By having the radius of the first piece 3602 be larger based on the length of the second piece 3604 that is coiled around the mandrel 524, the strain on the portion of the cable 3404 retained by the first piece 3602 is reduced.

The flexible rack 3304 may comprise a semi-rigid member which comprises a rack having a plurality of teeth on one side of the member. The teeth may be cut to correspond to a helical gear or pinion in a lift motor assembly 3514. For example, the flexible rack 3304 may comprise plastic having a first piece 3602 and a second piece 3604 as discussed in FIG. 36A. In some implementations at least a portion of the flexible rack 3304 may comprise a compliant material, such as an elastomeric material. During operation, this compliance reduces noise due to interaction between the teeth and the corresponding teeth of a pinion in the lift motor assembly 3514 that engage the flexible rack 3304. The teeth may be arranged on a first side of the flexible rack 3304. A second side, opposite the first, may be shaped to correspond to a second side of a second flexible rack 3304.

The first flexible rack 3304(1) is stowed in the lower spool 3510, and a portion passes from within the lower spool 3510, out a lower spool egress, through a rack guide 518, and into the lift motor assembly 3514. Similarly, the second flexible rack 3304(2) is stowed in the upper spool 3512, and a portion passes from within the upper spool 3512, out an upper spool egress, through a rack guide 518, and into the lift motor assembly 3514.

To raise the mast 108, the lift motor assembly 3514 pulls the first flexible rack 3304(1) from the lower spool 3510 and the second flexible rack 3304(2) from the upper spool 3512. Each flexible rack 3304 is pushed by the motor in the lift motor assembly 3514, applying a force along the respective flexible racks 3304 that extends the telescoping sections 3306. To lower the mast 108, the lift motor assembly 3514 pulls the first and second flexible racks 3304 from the mast 108 and pushes the flexible racks 3304 back into their respective spools.

When stowed, the walls of each spool contain the respective flexible rack 3304 and may serve as a hard stop when the mast 108 is retracted. The walls may also prevent rattling within the spool of the flexible rack 3304 when the mast 108 is retracted.

As described above, a rack sensor 520 may be present along some portion of the path traversed by one of the flexible racks 3304(1)-(2). For example, the rack sensor 520 may be mounted to the rack guide 518. The rack sensor 520 generates data that is indicative of one or more of how much flexible rack 3304 has passed the rack sensor 520, an absolute value as to the position on the flexible rack 3304, and so forth. For example, the rack sensor 520 may comprise an optoelectronic sensor that acquires successive images of the flexible rack 3304 that are within a field of view. Features on the flexible rack 3304 may be detected by the rack sensor 520 and used to provide information indicative of the movement of the flexible rack 3304. These features may be inherent, such as a result of production, or may be applied. For example, applied markings may be embossed, etched, printed, and so forth onto the flexible rack 3304. In another example, the markings on the flexible rack 3304 may be used to provide an absolute position, such as the portion at the rack sensor 520 is at distance 25.3 centimeters (cm) from a first end of the flexible rack 3304. Data from the rack sensor 520 may be used to determine height of the mast 108, whether there is a malfunction such as a broken or jammed flexible rack 3304, and so forth. In other implementations, other types of rack sensors 520 may be used.

In some implementations, the motor within the lift motor assembly 3514 may provide output data indicative of rotation of the motor. For example, the motor may include a rotation encoder. This output data may be used to determine a length of flexible rack 3304 that has been raised or lowered. Data from the motor encoder 2910 may be used to determine height of the mast 108, whether there is a malfunction such as a broken or jammed flexible rack 3304, and so forth. For example, a discrepancy between the motor encoder 2910 and the rack sensor 520 may indicate a failure.

The cable 3404 may include conductors that provide power from the main body 102 to the payload 502. The cable 3404 may include conductors, optical fibers, or other components that may be used to transfer signals between the payload 502 and the main body 102. For example, the cable 3404 may comprise one or more coaxial cables that provide power to operate a camera 2944 in the payload 502, convey control signals to the camera 2944, and convey data back to circuitry within the main body 102.

Figure 36A:
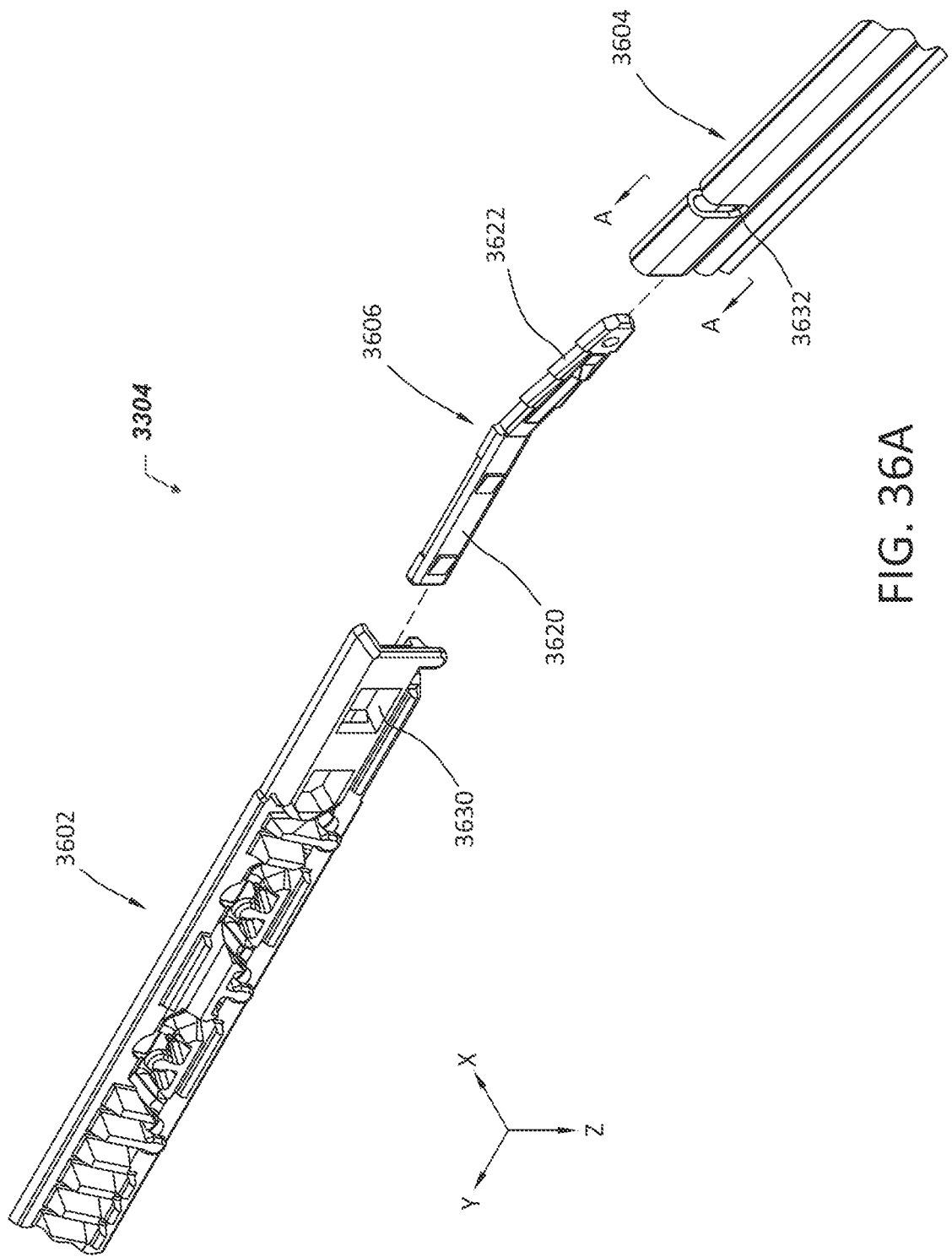
FIG. 36A illustrates a first portion of the flexible rack that includes teeth and a second portion of the flexible rack that has no teeth, according to some implementations.

FIG. 36A illustrates a portion of the flexible rack 3304 including a first portion of the rack that includes teeth and a second portion of the rack that has no teeth, according to some implementations.

The first piece 3602 of the flexible rack 3304 may comprise one or more features including teeth to engage a pinion in the lift motor assembly 3514, engagement features to retain the cable 3404, and so forth. The features of the first piece 3602 are discussed in more detail with regard to FIG. 37.

The second piece 3604 omits the teeth that are shown in the first piece 3602. The second piece 3604 may have one or more features, such as an engagement feature 3632. The second piece 3604 may comprise the portion of the flexible rack 3304 that remains within the spool while the mast 108 is retracted and does not reach a drive pinion of the lift motor assembly 3514 during extension of the mast 108. In one implementation, the second piece 3604 may comprise only the portion of the flexible rack 3304 that is in contact with the mandrel 524. In another implementation, the second piece 3604 may comprise a portion of the flexible rack 3304 that would extend, during extension of the mast 108, outside the spool.

In some implementations the first piece 3602 and the second piece 3604 may comprise the same material. The first piece 3602 and the second piece 3604 may be joined using one or more techniques. For example, the first piece 3602 and the second piece 3604 may be joined using welding, adhesive, mechanical engagement features, or a fastener 3606 as shown in FIG. 36A. The fastener 3606 may comprise one or more engagement features to engage a corresponding portion of engagement features within the respective piece of the flexible rack 3304 to be engaged. For example, the fastener 3606 may have a first engagement feature 3620 that engages with a corresponding engagement feature 3630 of the first piece 3602. Continuing the example, the fastener 3606 may have a second engagement feature 3622 that engages with a corresponding engagement feature 3632 of the second piece 3604. The fastener 3606 may include a bend or curve, introducing a change in direction in the assembled flexible rack 3304.

In one implementation, the second piece 3604 may include one or more engagement features 3634 to retain the cable 3404. In another implementation the cable 3404 may be molded into the second piece 3604. In still another implementation the second piece 3604 may not retain the cable 3404.

In other implementations, the flexible rack 3304 may comprise a unitary piece of material having two portions. The first portion may include the features as described with regard to the first piece 3602 while the second portion may omit these features as described with regard to the second piece 3604.

Figure 36B:
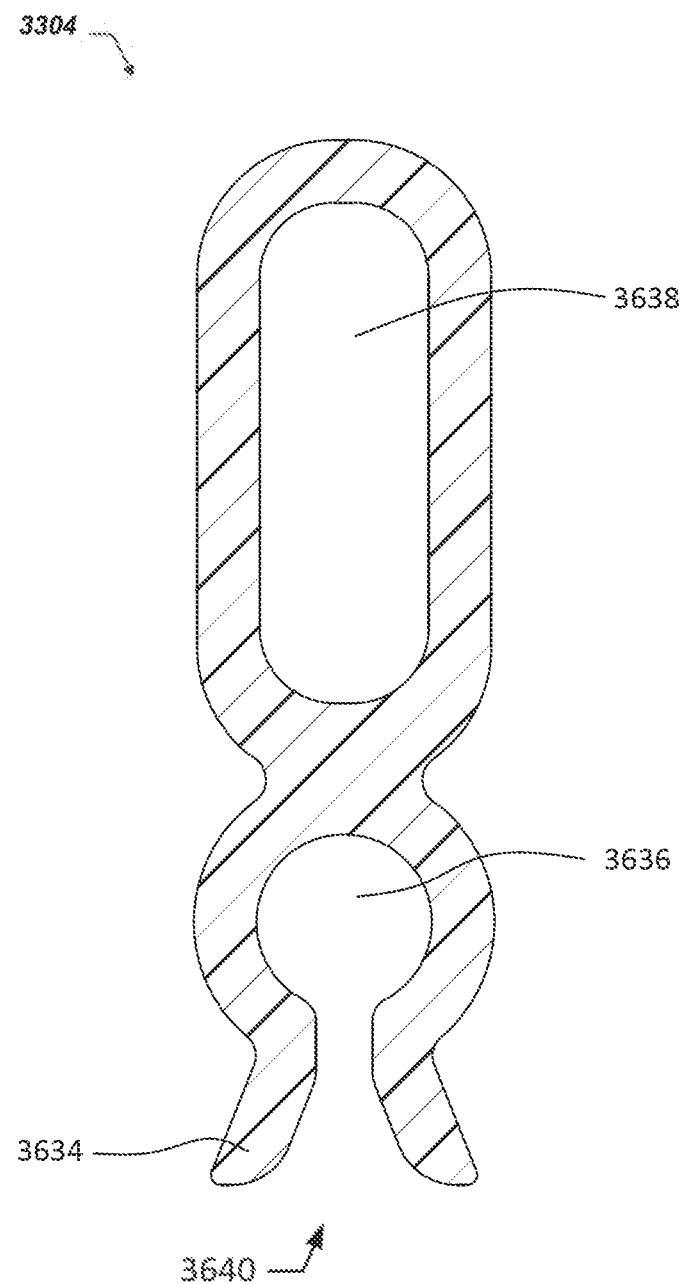
FIG. 36B illustrates a cross section of the second portion of the rack that has no teeth, according to some implementations.

FIG. 36B illustrates a cross section of a portion of the rack that has no teeth, according to some implementations.

As depicted, the second piece 3604 includes a retention feature 3634 comprising a flared opening 3640 into which the cable 3404 may be pressed to be inserted within retention channel 3636. Because the second piece 3604 is made of a flexible material, the flared opening 3640 of the second piece 3604 flexes outward as the cable 3404 is pushed and inserted into the retention channel 3636 of the retention feature 3634. When the cable 3404 is inserted into the retention channel 3636, the flared portion of the retention feature 3634 flexes inward to retain the cable 3404. The cable 3404 may extend from the one or more engagement features 3712 (shown in FIG. 37) of the first piece 3602 into the retention feature 3634 of the second piece 3604. The second piece 3604 also includes a hollow space 3638. The hollow space 3638 results from extrusion of the second piece 3604 during manufacture.

In this implementation, the second piece 3604 may comprise a first end having a first engagement feature 3632 that engages with the engagement feature 3620 of the fastener 3606. The second piece 3604 also comprises a second end (not depicted) with a second engagement feature similar to the first engagement feature 3632. The second engagement feature may engage with an engagement feature at an end of the mandrel path 3502. In this example, the second end of the second piece 3604 is where the cable 3404 extends out of the retention feature 3634 to other components of the AMD 104, such as the processors 2804.

Figure 37:
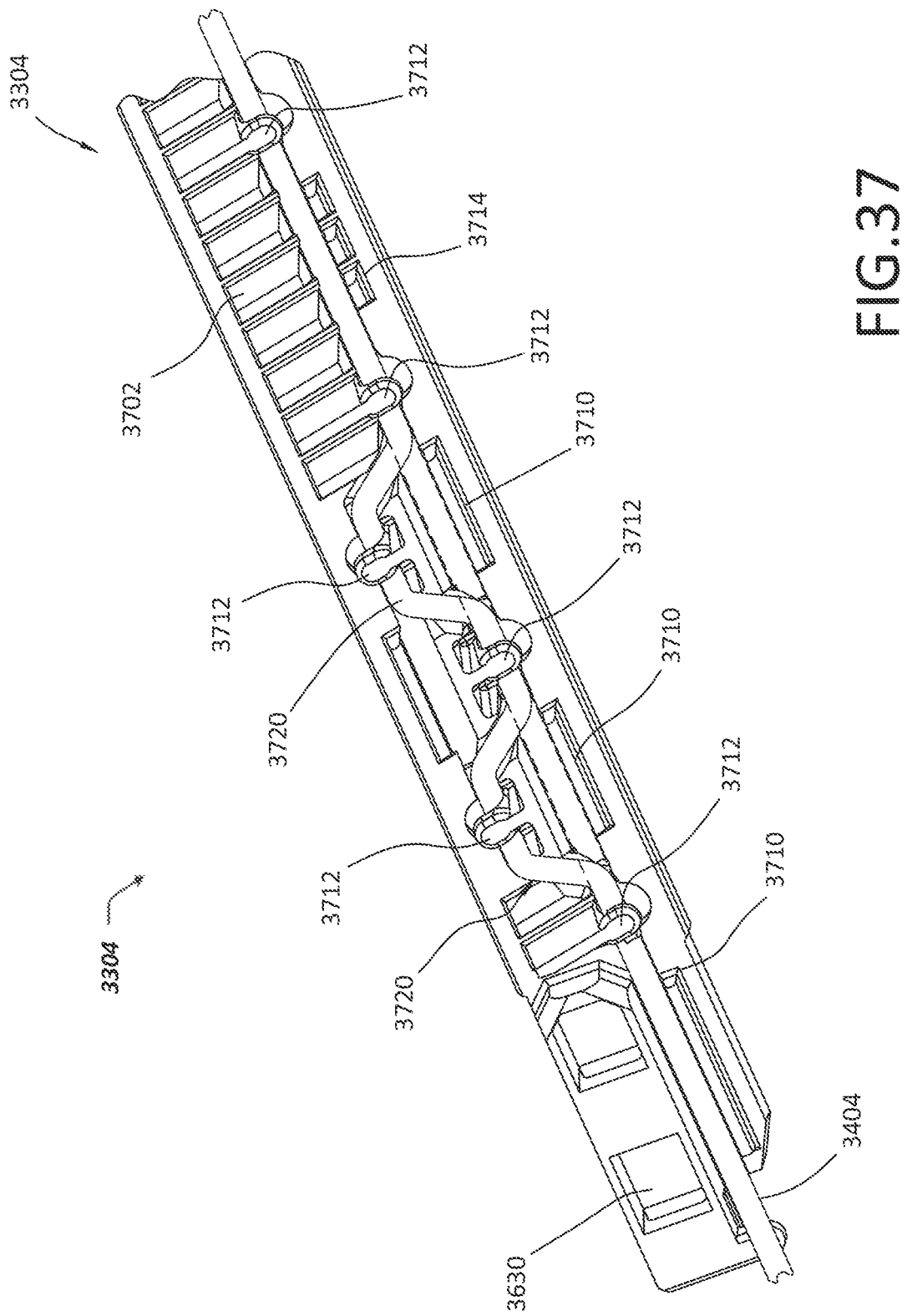
FIG. 37 illustrates a flexible rack with a plurality of engagement features to retain a cable, according to one implementation.

FIG. 37 illustrates the flexible rack 3304 with a plurality of engagement features to retain a cable 3404, according to one implementation. These engagement features may use mechanical interference fits, friction, and so forth to retain the cable 3404 with respect to the flexible rack 3304.

In this illustration, a part of the first piece 3602 is shown. The first piece 3602 includes a plurality of teeth 3702. The teeth 3702 may be shaped to mate with a helical pinion of the lift motor assembly 3514.

The cable 3404 is shown, routed along a cable path that is constrained by one or more features of the flexible rack 3304. First engagement features 3710 extend proximate to a first edge of the flexible rack 3304, and retain the cable 3404 along a first cable path that is parallel to a long axis of the rack and proximate to the first edge, extending along a length of the flexible rack 3304. The engagement features may also include one or more protrusions 3712 to retain the cable 3404. The protrusions 3712 may prevent the cable 3404 from separating from the flexible rack 3304.

One or more of the protrusions 3712 may be offset relative to one another within a plane of the flexible rack 3304. These offsets introduce a second cable path that is out of linear alignment with the first cable path. As a result, the second cable path produced by the protrusions 3712 introduces a bend 3720 in the cable 3404. The protrusions 3712 may be present in series, introducing a plurality of bends 3720 adjacent to one another. In some implementations, the plurality of bends 3720 may be placed proximate to a first end of the first piece 3602 and a second end of the first piece 3602. The plurality of bends 3720 may be omitted for the portions of the first piece 3602 that are expected to have teeth 3702 that engage with a pinion of the lift motor assembly 3514.

A gap 3714 in the teeth 3702 may be present to allow passage of the cable 3404. For example, during fabrication of the flexible rack 3304, the teeth 3702 may be formed to provide the gap 3714. The remaining portion of the teeth 3702 on the portion of the gap 3714 that is proximate to the first edge may retain the cable 3404.

The engagement features 3710, protrusions 3712, or other engagement features may be arranged along the length of the flexible rack 3304 to retain the cable 3404.

Push Nut with Retention Groove

FIGS. 38A and 38B illustrate using a push nut retained in a groove that is cut by the push nut to retain parts to a shaft, according to one implementation. FIG. 38A shows the assembly while FIG. 38B shows an exploded view of the assembly.

Push nuts provide a convenient way to retain parts to a shaft having a circular cross section. However, push nuts may slide longitudinally along the shaft. This sliding may result in parts moving into positions that are not suitable for operation of an overall device. As shown in FIGS. 38A and 38B, the push nut may be used to cut a retaining groove in the shaft, preventing this undesired motion.

A shaft 3802 is shown. The shaft 3802 comprises a material having a first hardness. In some implementations the shaft 3802 may be one implementation of the display assembly shaft 708. Emplaced on the shaft 3802 is a hinge 3804. For example, the hinge 3804 may be affixed to a frame of the display assembly 110. A coupling 3806 is shown at an end of the shaft 3802. The coupling 3806 may be used to engage a corresponding coupling on a motor or to rotate the shaft 3802 during operation.

A push nut 3808 comprises a plurality of teeth. The teeth of the push nut 3808, or at least the portion that comes into contact with the shaft 3802, has a second hardness that is greater than the first hardness. For example, the shaft 3802 may comprise brass while the push nut 3808 comprises steel.

A washer 3820, washer 3822, and bushing 3824 are also shown at a first end of the hinge 3804. On a second end of the hinge 3804 a washer 3826 is shown, proximate to a bushing (not labeled).

During manufacture, the coupling 3806 or other component may be emplaced on the shaft 3802. The washer 3826, bushing and the hinge 3804 may be emplaced. The bushing 3824 is placed on the shaft 3802, followed by the washer 3822, the washer 3820, and the push nut 3808. A press, vice, or other fixture may be used to apply longitudinal pressure (compression along the long axis of the shaft 3802) to press the parts together, pushing the bushings into the hinge 3804, push nut(s) 3808 against the washer 3820, and so forth. While the parts are pressed together, the shaft 3802 is rotated. This rotation causes the teeth of the push nut 3808 to cut a retention groove in the (relatively) softer material of the shaft 3802. A vacuum, compressed gas, vibration, or other techniques may be used to remove at least a portion of the cuttings from the assembly. Once the retention groove has been cut, the fixture may release the longitudinal pressure. The teeth of the push nut 3808 are now arranged within the retention groove cut by those teeth. The mechanical interaction of the teeth of the push nut 3808 with the retention groove helps maintain the push nut 3808 in the desired position with respect to the shaft 3802, securing the parts in the desired location with respect to a longitudinal axis of the shaft 3802.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
a telescoping mast comprising:
an outer mast section,
an inner mast section arranged at least in part within the outer mast section, and
a first structure disposed within the inner mast section, the first structure comprising:
a shaft comprising a first end and a second end,
a first feature proximate to the first end, wherein the first feature comprises a first aperture, and a second feature proximate to the second end, wherein the second feature comprises a second aperture;

wherein, based on a relative orientation between the first aperture and the second aperture, a cable passing through the first aperture and the second aperture helically winds around the shaft.

2. The apparatus of claim 1, wherein the first structure further comprises:
a third feature between the second feature and the second end;
wherein the third feature comprises a third aperture, and
wherein, based on a relative orientation between the second aperture and the third aperture, the second feature and the third feature retain the cable passing through the second aperture and the third aperture.

3. The apparatus of claim 1, further comprising:
a flexible rack comprising:
a first piece comprising a plurality of teeth, wherein the first piece comprises a third end and a fourth end, and wherein the third end is attached to a retention feature on the telescoping mast, and
a second piece comprising a fifth end and a sixth end, wherein the fifth end is attached to the fourth end of the first piece; and
a spool comprising a mandrel, wherein a first portion of the second piece is coiled around the mandrel.

4. The apparatus of claim 3, wherein the second piece comprises a retention channel having a flared opening and the cable is retained within the retention channel.

5. The apparatus of claim 3, wherein the flexible rack further comprises:
one or more engagement features that retain the cable along a first cable path that extends along a length of the flexible rack;
wherein at least one engagement feature of the one or more engagement features provides a second cable path that extends from the first cable path at a first juncture and connects to the first cable path at a second juncture.

6. The apparatus of claim 1, further comprising:
a unitary flexible rack comprising:
a first piece comprising a plurality of teeth, wherein the first piece is attached to a retention feature on the telescoping mast, and
a second piece without teeth; and
a spool comprising a mandrel, wherein the second piece is proximate to the mandrel.

7. The apparatus of claim 1, further comprising:
a display assembly comprising:
a display,
a shaft comprising a material of a first hardness,
a hinge that is attached to the display and that is mounted on the shaft,
a push nut that retains the hinge at a first location on the shaft, wherein the push nut is of a second hardness and comprises a plurality of teeth, the second hardness being greater than the first hardness, and
a groove in the shaft, wherein the groove maintains a second location of the push nut with respect to a longitudinal axis of the shaft.

8. An apparatus comprising:
a telescoping mast comprising:
a first mast section,
a second mast section arranged at least in part within the first mast section, and
a first structure disposed within the second mast section, the first structure comprising:
a shaft comprising a first end and a second end,
a first feature proximate to the first end, wherein the first feature comprises a first aperture, and
a second feature proximate to the second end, wherein the second feature comprises a second aperture; and
wherein, based on a relative orientation between the first aperture and the second aperture directs a cable that passes through the first aperture and the second aperture to helically wind around the shaft; and
a flexible rack comprising:
a first piece comprising a plurality of teeth, wherein the first piece comprises a first end that is attached to a retention feature arranged within the second mast section and a second end that is attached to a second piece, and
the second piece comprising a third end that is attached to the first piece and a fourth end that is attached to a spool.

9. The apparatus of claim 8, wherein the second piece comprises a retention channel.

10. The apparatus of claim 8, wherein the flexible rack further comprises:
one or more engagement features that retain the cable along a first cable path that extends along a length of the flexible rack;
wherein the one or more engagement features provide a second cable path that extends from the first cable path at a first juncture and connects to the first cable path at a second juncture.

11. The apparatus of claim 8, wherein the spool comprises:
a mandrel that comprises an attachment feature that is attached to the fourth end of the second piece;
wherein the second piece comprises the retention feature that retains the cable along a longitudinal axis of the second piece, and
wherein the longitudinal axis of the second piece has a same radius around the mandrel as a longitudinal axis of the cable.

12. The apparatus of claim 8, wherein the first structure further comprises:
a third feature between the second feature and the second end of the shaft;
wherein the third feature comprises a third aperture, and
wherein, based on a relative orientation between the second aperture and the third aperture, the second feature and the third feature retain the cable passing through the second aperture and the third aperture.

13. The apparatus of claim 8, further comprising:
a display assembly comprising:
a display,
a shaft comprising a material of a first hardness,
a hinge that is attached to the display and that is mounted on the shaft,
a push nut that retains the hinge at a first location on the shaft, wherein the push nut comprises a plurality of teeth of a second hardness that is greater than the first hardness, and
a groove in the shaft, wherein the groove maintains a second location of the push nut with respect to a longitudinal axis of the shaft.

14. The apparatus of claim 8, wherein the second piece comprises a retention channel having a flared opening and the cable is retained within the retention channel.

15. An autonomous mobile device (AMD) comprising:
one or more memories storing computer-executable instructions;
one or more processors to execute the computer-executable instructions; and
a telescoping mast comprising:
  a first mast section,
  a second mast section arranged at least in part within the first mast section, and
  a first structure disposed within the second mast section, the first structure comprising:
    a shaft comprising a first end and a second end,
    a first feature proximate to the first end, wherein the first feature comprises a first aperture, and
    a second feature proximate to the second end, wherein the second feature comprises a second aperture;
  wherein, based on a relative orientation between the first aperture and the second aperture, a cable passing through the first aperture and the second aperture helically winds around the shaft.

16. The AMD of claim 15, wherein the first structure further comprises:
a third feature between the second feature and the second end;
wherein the third feature comprises a third aperture, and
wherein, based on a relative orientation between the second aperture and the third aperture, the second feature and the third feature retain the cable passing through the second aperture and the third aperture.

17. The AMD of claim 15, further comprising:
a flexible rack comprising:
  a first piece comprising a plurality of teeth, wherein the first piece comprises a third end and a fourth end, and wherein the third end is attached to a retention feature on the telescoping mast, and
  a second piece comprising a fifth end and a sixth end, wherein the fifth end is attached to the fourth end of the first piece; and
a spool comprising a mandrel, wherein a first portion of the second piece is coiled around the mandrel.

18. The AMD of claim 17, the flexible rack further comprising:
one or more engagement features that retain the cable along a first cable path that extends along a length of the flexible rack; and
wherein at least one engagement feature of the one or more engagement features provides a second cable path that extends from the first cable path at a first juncture and connects to the first cable path at a second juncture.

19. The AMD of claim 17, wherein the second piece comprises a retention channel having a flared opening and the cable is retained within the retention channel.

20. The AMD of claim 15, further comprising:
a display assembly comprising:
  a display,
  a shaft comprising a material of a first hardness,
  a hinge that is attached to the display and that is mounted on the shaft,
  a push nut that retains the hinge at a first location on the shaft, wherein the push nut comprises a plurality of teeth of a second hardness that is greater than the first hardness, and
  a groove in the shaft, wherein the groove maintains a second location of the push nut with respect to a longitudinal axis of the shaft.

* * * * *